(12) United States Patent
Zetterberg

(10) Patent No.: US 12,441,755 B2
(45) Date of Patent: Oct. 14, 2025

(54) GALACTOSIDE INHIBITOR OF GALECTINS

(71) Applicant: GALECTO BIOTECH AB, Copenhagen (DK)

(72) Inventor: Fredrik Zetterberg, Askim (SE)

(73) Assignee: GALECTO BIOTECH AB, Copenhagen (DK)

( * ) Notice: Subject to any disclaimer, the term of this patent is extended or adjusted under 35 U.S.C. 154(b) by 827 days.

(21) Appl. No.: 17/624,730

(22) PCT Filed: Jul. 3, 2020

(86) PCT No.: PCT/EP2020/068834
§ 371 (c)(1),
(2) Date: Jan. 4, 2022

(87) PCT Pub. No.: WO2021/004940
PCT Pub. Date: Jan. 14, 2021

(65) Prior Publication Data
US 2022/0259251 A1    Aug. 18, 2022

(30) Foreign Application Priority Data

Jul. 5, 2019 (EP) ..................................... 19184577

(51) Int. Cl.
*C07H 19/056* (2006.01)
(52) U.S. Cl.
CPC ................... *C07H 19/056* (2013.01)
(58) Field of Classification Search
None
See application file for complete search history.

(56) References Cited

FOREIGN PATENT DOCUMENTS

WO    WO-2019067702 A1 *  4/2019 .............. A61P 29/00

OTHER PUBLICATIONS

International Search Report and Written Opinion issued on Oct. 23, 2020 in corresponding International Application No. PCT/EP2020/068834; 7 pages.

* cited by examiner

*Primary Examiner* — Traviss C McIntosh, III
(74) *Attorney, Agent, or Firm* — Maier & Maier, PLLC

(57) ABSTRACT

A D-galactopyranose compound of formula (1)

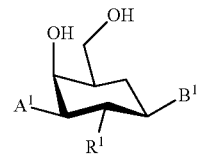

wherein, the pyranose ring is beta-D-galactopyranose, and pharmaceutical composition including these compounds. These are high affinity galectin-1 and/or 3 inhibitors. Also, methods for treating a disorder relating to the binding of a galectin-1 and/or -3 to a ligand in which these compounds or pharmaceutical compositions are administered.

11 Claims, No Drawings

GALACTOSIDE INHIBITOR OF GALECTINS

FIELD

The present invention relates to novel compounds, the use of said compounds as medicament and for the manufacture of a medicament for the treatment of cancers; fibrosis; scarring; keloid formation; aberrant scar formation; surgical adhesions; pathological angiogenesis; eye diseases; HIV-1 diseases; inflammation or transplant rejection in mammals. The invention also relates to pharmaceutical compositions comprising said novel compounds.

BACKGROUND

Galectins are proteins with a characteristic carbohydrate recognition domain (CRD) (Leffler et al., 2004). This is a tightly folded β-sandwich of about 130 amino acids (about 15 kDa) with the two defining features 1) a β-galactose binding site and 2) sufficient similarity in a sequence motif of about seven amino acids, most of which (about six residues) make up the β-galactose binding site. However, sites adjacent to the β-galactose site are required for tight binding of natural saccharides and different preferences of these give galectins different fine specificity for natural saccharides.

The recent completion of the human, mouse and rat genome sequences reveal about 15 galectins and galectin-like proteins in one mammalian genome with slight variation between species (Leffler et al., 2004).

Galectin subunits can contain either one or two CRDs within a single peptide chain. The first category, mono-CRDs galectins, can occur as monomers or dimers (two types) in vertebrates. The by far best studied galectins are the dimeric galectin-1, and galectin-3 that is a monomer in solution but may aggregate and become multimeric upon encounter with ligands (Lepur et al., 2012). These were the first discovered galectins and are abundant in many tissues.

There are now over 5700 publications on galectins in PubMed, with most, as mentioned above, about galectins-1 (>1400) and -3 (>2800). Strong evidence suggests roles for galectins in e.g. inflammation and cancer, and development (Blidner et al., 2015, Ebrahim et al., 2014).

Galectins are synthesized as cytosolic proteins, without a signal peptide on free ribosomes. Their N-terminus is acetylated, a typical modification of cytosolic proteins, and they reside in the cytosol for a long time (not typical of secreted proteins). From there they can be targeted to the nucleus, specific cytososlic sites, or secreted (induced or constitutively) by a non-classical (non-ER-Golgi) pathway (as first shown for galectin-1 (Cooper and Barondes, 1991)), with as yet unknown mechanism, but possibly similar to the export of e.g. IL-1 (Leffler et al., 2004; Arthur et al., 2015). Galectins can also function in all these compartments; for galectin-1, solid evidence published in well respected journals support roles in RNA splicing in the nucleus, activation of H-RAS in the cytosol, accumulation around disrupted vesicles, and a variety of extracellular effects on cell signaling and adhesion (Elola et al. 2015, Aits et al., 2015, Blanchard et al., 2016). Other galectins also may act in the cytosol by enhancing apoptosis and regulating the cell cycle and differentiation in certain cells. Most galectins act also extracellularly by cross-linking glycoproteins (e.g. laminin, integrins, and IgE receptors) possibly forming supramolecular ordered arrays (Elola et al., 2015) and may thereby modulate cell adhesion and induce intracellular signals. Related to this, recent years have seen the emergence of a molecular mechanism of these galectin functions involving a formation of microdomains (lattices) within membranes, (Elola et al., 2015) which in turn affects intracellular trafficking and cell surface presentation of glycoprotein receptors. This has been documented in cell culture, in null mutant mice, and animals treated with galectinor galectin inhibitors.

Galectin-1, the first discovered and second most studied galectin, is expressed in all tissues with a certain preference but not exclusive for cells of mesenchymal orgin like fibroblasts and lymphocytes. It is involved in the regulation of cell growth, adhesion, signaling, differentiation, development, immune system and host-pathogen interactions (Blanchard et al., 2016). Expression profiles of galectin-1 in the various stages of cancer progression and its role in the tumor microenvironment have been thoroughly reviewed.

Galectin-1 has been implicated in diverse phenomena and, hence, inhibitors may have multiple uses. It is easy to perceive this as a lack of specificity or lack of scientific focus. Therefore, the analogy with aspirin and the cyclooxygenases (COX-I and II) is useful. The COXs produce the precursor of a wide variety of prostaglandins and, hence, are involved in a diverse array of biological mechanisms. Their inhibitors, aspirin and other NSAIDs (non-steroid anti-inflammatory drugs), also have broad and diverse effects. Despite this, these inhibitors are very useful medically, and they have several different specific utilities.

So if galectins, like COXs, are part of some basic biological regulatory mechanism (as yet unknown), they are likely to be 'used by nature' for different purpose in different contexts. Galectin inhibitors, like NSAIDs, are not expected to wipe out the whole system, but to tilt the balance a bit.

Galectin-1 in Immunity and Inflammation

Galectin-1 has been found mainly to have an immunosuppressive and anti-inflammatory role (Elola et al., 2015), although in some cases it may also be proinflammatory. Galectin-1 binds specific glycosylation pattern on T-helper cells to selectively induce apoptosis in activated Th1 and Th17 cells. (Perillo et. al., 1995) (Toscano, M. A. et al., 2007). The immunosuppressive effect of galectin-1 has suggested that galectin-1 itself, might be a potential treatment for autoimmune and other inflammatory conditions. Conversely, inhibiting its immunosuppressive effect in e.g. cancer has also been proposed as a treatment, as described below.

Galectin-1 in Angiogenesis.

Like galectin-3, galectin-1 has been shown promote angiogenesis under certain circumstances (Hockl et al., 2016) in a way involving its carbohydrate bining-activity. Particularly interesting is the observation that it might promote tumor angiogenesis by a pathway parallel to VEGF. Hence, inhibiting galectin-1 may be anti-angiogenic when inhibition based on anti-VEGF fails. The discovery that the anti-angiogenic peptide Anginex (and related compounds) binds to galectin-1 suggested another mechanism for galectin-1 in angiogenesis, but the details remain unclear; Anginex is described as inhibiting galectin-1 activity in some reports, but as enhancing its carbohydrate binding-activities in another.

Galectin-1 in Fibrosis-Related Conditions

The idea of a possible role of galectin-3 in fibrosis comes from cell and ex vivo studies on macrophage differentiation (Mackinnon et al., 2008), as well as from in vivo studies on macrophage differentiation and myofibroblast activation (Mackinnon et al., 2012). Briefly, the hypothesis is as follows: Galectin-3 has been shown to prolong cell surface residence and thus enhance responsiveness of the TGF-β receptor (Partridge et al., 2004), which in turn regulates alternative macrophage differentiation into M2 macrophages and myofibroblast activation. Galectin-1 has also been suggested to a play a role in fibrosis, including by TGF-β related mechanism, but the evidence is less clear than for galectin-3.

Hence, also galectin-1 is a good candidate for being an endogenous enhancer of TGF-β signaling and myofibroblast activation (Kathiriya et al), and galectin-1 inhibitors may be also be useful in treating fibrosis and adverse tissue remodeling.

Galectin-1 in Cancer.

A large number of immunohistochemical studies show changed expression of certain galectins in cancer (van den Brule et. al. and Bidon et al. in Leffler (editor), 2004b) and for example galectin-3 is now an established histochemical marker of thyroid cancer. The direct evidence for a role of galectin-3 in cancer comes from mouse models, mainly by Raz et al, but also others (in Leffler (editor), 2004b). In paired tumor cell lines (with decreased or increased expression of galectin-3), the induction of galectin-3 gives more tumors and metastasis and suppression of galectin-3 gives less tumors and metastasis. Galectin-3 has been proposed to enhance tumor growth by being anti-apoptotic, promote angiogenesis, or to promote metastasis by affecting cell adhesion. Further, recent evidence have shown that galectin-3 plays a critical role in the tumor microenvironment—reviewed in (Ruvolo, 2015). Galectin-3 is also believed to regulate the interaction between the tumor cells and immune cells, such as T-lymphocytes (T-cells), and inhibition of galectin-3 has been shown to restore T-cell activity (Demotte et al. 2010, Kouo et al. 2015, Melero et al. 2015). From the above it is clear that inhibitors of galectin-3 might have valuable anti-cancer effects. Indeed, saccharides claimed but not proven to inhibit galectin-3 have been reported to have anti-cancer effects. In our own study a fragment of galectin-3 containing the CRD inhibited breast cancer in a mouse model by acting as a dominant negative inhibitor (John et al., 2003). More recently, inhibition of galectin-3 with small molecules have been demonstrated to indeed greatly enhance tumor cell sensitivity towards radiation and standard pro-apoptotic drugs in cell assays and ex vivo (Lin et al., 2009), as well as in vivo (Glinsky et al., 2009).

Also galectin-1 is frequently over-expressed in low differentiated cancer cells, and galectin-9 or its relatives galectin-4 and galectin-8 may be induced in specific cancer types (Huflejt and Leffler, 2004; Leffler (editor), 2004b). Galectin-1 induces apoptosis in activated T-cells and has a remarkable immunosuppressive effect on autoimmune disease in vivo (Rabinovich et al; and Pace et al. in Leffler (editor), 2004b). Therefore, the over-expression of these galectins in cancers might help the tumor to defend itself against the T-cell response raised by the host.

Null mutant mice for galectins-1 and -3 have been established many years ago (Poirier, 2002). These are healthy and reproduce apparently normally in animal house conditions. However, recent studies have revealed subtle phenotypes in function of neutrophils and macrophages (as described above) and in bone formation for galectin-3 null mutants, and in nerve and muscle cell regeneration/differentiation for the galectin-1 null mutants (Leffler et al., 2004; Poirier, 2002; Watt in Leffler (editor), 2004b). Recently galectin-7 and galectin-9 null mutant mice have been generated and are also grossly healthy in animal house conditions, but have not yet been analyzed in detail. The differences in site of expression, specificity and other properties make it unlikely that different galectins can replace each other functionally. The observations in the null mutant mice would indicate that galectins are not essential for basic life supporting functions as can be observed in normal animal house conditions. Instead they may be optimizers of normal function and/or essential in stress conditions not found in animal house conditions. The lack of strong effect in null mutant mice may make galectin inhibitors more favorable as drugs. If galectin activity contributes to pathological conditions as suggested above but less to normal conditions, then inhibition of them will have less unwanted side effects.

Thus drugs targeting galectin-1 activities in cancer such as suppressing immunity or enhancing angiogenesis may become useful anti-cancer treatments.

Known Inhibitors

Natural Ligands

Solid phase binding assays and inhibition assays have identified a number of saccharides and glycoconjugates with the ability to bind galectins (reviewed by Leffler, 2001, Leffler et al., 2004). All galectins bind lactose with a $K_d$ of about 0.1-1 mM. The affinity of D-galactose is 50-100 times lower. N-Acetyllactosamine and related disaccharides bind about as well as lactose, but for certain galectins, they can bind either worse or up to 10 times better. Galactose (10 mM) (Tejler et. al. 2009) and Lactose (190 µM) (van Hattum, 2013) both have low affinity to Galectin-1.

The above-described natural saccharides that have been identified as galectin-1 ligands are not suitable for use as active components in pharmaceutical compositions, because they are susceptible to acidic hydrolysis in the stomach and to enzymatic degradation. In addition, natural saccharides are hydrophilic in nature, and are not readily absorbed from the gastrointestinal tract following oral administration.

Galectin Specificity

The studies of galectin specificity using inhibition by small natural saccharides mentioned above indicated that all galectins bound lactose, LacNAc and related disaccharides, but that galectin-3 bound certain longer saccharides much better (Leffler and Barondes, 1986). These longer saccharides were characterized by having an additional sugar residue added to the C-3 position of galactose (in e.g. lactose or LacNAc) that bound an extended binding groove. The shape of this groove varies between galectins, suggesting that the same extensions would not be bound equally by the different galectins.

Synthetic Inhibitors

A patent review covering galectin-1 inhibitors and their potential as therapeutics were recently published. (Blanchard 2016). The small molecule monosacharides covered in this review have been reported as having galectin-1 affinity which is at best similar to lactose. Disaccharides on the other hand, in particular thiodigalactosides (TDG), has been reported to have high affinity towards galectin-1. (T. Delaine, 2016, ChemBioChem 10.1002/cbic.201600285) Saccharides coupled to amino acids with anti-cancer activity were first identified as natural compounds in serum, but subsequently, synthetic analogues have been made (Glinsky et al., 1996). Among them, those with lactose or galactose coupled to the amino acid inhibit galectins, but only with about the same potency as the corresponding underivatized sugar. Chlorinconjugated lactose have been reported to have high affinity (0.54 µM) as measured in an Elisa assay. (Pandey et. al. 2002, in EP1256586 (A1)). A chemically modified form of citrus pectin (Platt and Raz, 1992) that inhibits galectin-3 shows anti-tumor activity in vivo (Pienta et al., 1995; Nangia-Makker et al., 2002). Cluster molecules having up to four lactose moieties showed a strong multivalency effect when binding to galectin-3, but not to galectin-1 and galectin-5 (Vrasidas et al., 2003). Cyclodextrin-based glycoclusters with seven galactose, lactose, or N-acetyllactosamine residues also showed a strong multivalency effect against galectin-3, but less so against galectins-1 and -7 (André et al., 2004). Starburst dendrimers (André et al., 1999) and glycopolymers (Pohl et al., 1999; David et al., 2004), made polyvalent in lactose-residues, have been described as galectin-3 inhibitors with marginally improved potency as compared to lactose. Multivalent lactose derivatives have been shown to have a pronounced cluster effect towards galectin-1(Tejler et. al., 2006). In addition, these compounds were selective over other galectins. Peptide based compounds such as Anginex and non-peptidic topomimetics (Dings et. al. 2012) have been reported to be allosteric galectin-1 inhibitors. The aforementioned synthetic compounds that have been identified as galectin-1 ligands are not suitable for use as active components in pharmaceutical compositions, because they are hydrophilic in nature and are not readily absorbed from the gastrointestinal tract following oral administration. In addition the aforementioned compounds have moderate affinity and selectivity.

Natural oligosaccharides, glycoclusters, glycodendrimers, peptides, non-peptidic topomimetics and glycopolymers described above are too polar and too large to be absorbed and in some cases are large enough to produce immune responses in patients. Furthermore, they are susceptible to acidic hydrolysis in the stomach and to enzymatic hydrolysis. Thus, there is a need for small synthetic molecules.

Thiodigalactoside is known to be a synthetic and hydrolytically stable, yet polar inhibitor, approximately as efficient as N-acetyllactosamine (Leffler and Barondes, 1986). N-Acetyllactosamine derivatives carrying aromatic amides or substituted benzyl ethers at C-3' have been demonstrated to be highly efficient inhibitors of galectin-3, with unprecedented $IC_{50}$ values as low as 4.8 µM, which is a 20-fold improvement in comparison with the natural N-acetyllactosamine disaccharide (Sörme et al., 2002; Sörme et al., 2003b, 2005). These derivatives are less polar overall, due to the presence of the aromatic amido moieties and are thus more suitable as agents for the inhibition of galectins in vivo. Furthermore, C3-triazolyl galactosides have been demonstrated to be as potent inhibitors as the corresponding C3-amides of some galectins. Hence, any properly structured galactose C3-substituent may confer enhanced galectin affinity.

However, the C3-amido- and C3-triazolyl-derivatised compounds are still susceptible to hydrolytic degradation in vivo, due to the presence of a glycosidic bond in the galactose and N-acetyllactosamine saccharide moiety and, although they are potent small molecule inhibitors of galectin-3, even further improved affinity and stability is desirable. Accordingly, inhibitors based on 3,3'-diamido- or 3,3'-ditriazolyl-derivatization of thiodigalactoside have been developed, (Cumpstey et al., 2005b; Cumpstey et al., 2008; Salameh et al., 2010; WO/2005/113569 and US2007185041; WO/2005/113568, U.S. Pat. No. 7,638,623 B2; T. Delaine, 2016, ChemBioChem 10.1002/cbic.201600285) which lack O-glycosidic hydrolytically and enzymatically labile linkages. These inhibitors also displayed superior affinity for several galectins (down to Kd in the low nM range). Nevertheless, although displaying high affinity for galectins, the 3,3'-derivatized thiodigalactosides still comprise a disadvantage in their multistep synthesis involving double inversion reaction to reach at 3-N-derivatized galactose building blocks. Furthermore, cyclohexane replacement of one galactose ring in thiodigalactoside has been evidenced to mimic the galactose ring and hence to provide galectin-1 and -3 inhibitors with efficiency approaching those of the diamido- and ditriazolyl-thiodigalactoside derivatives (WO/2010/126435). Replacement of a D-galactopyranose unit with a substituted cyclohexane decreases polarity and most likely also metabolic susceptibility, thus improving drug-like properties.

Some earlier described compounds have the following general formulas

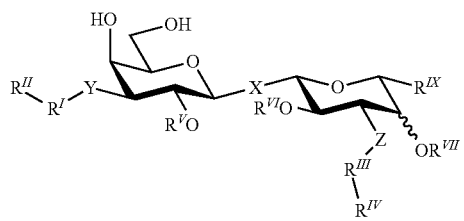

as described in WO/2005/113568, and

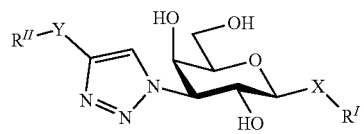

as described in WO/2005/113569, in which $R^1$ can be a D-galactose.

In recently published (T. Delaine, 2016, ChemBioChem 10.1002/cbic.201600285) is disclosed a

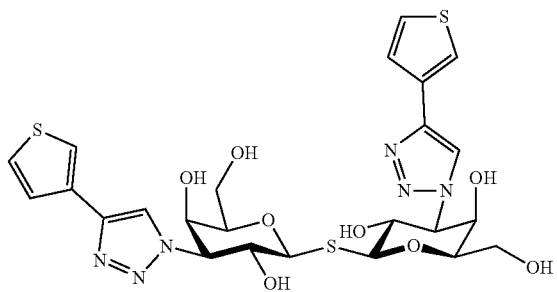

TDG substituted with a thiophene triazole substituent in the C3 and C3' positions with high affinity (<10 nM) to Galectin-1.

In recently published US20140099319, WO2014067986 and T. Delaine, 2016, ChemBioChem 10.1002/cbic.201600285, is disclosed a compound

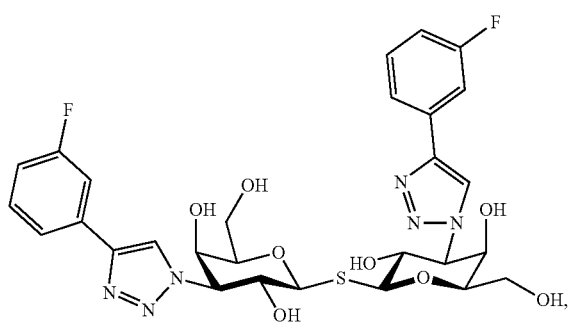

having fluorine (F) in the meta position on both the phenyl rings in relation to the triazole rings. This compound has been shown to be a promising drug candidate for lung fibrosis, and in particular is very selective on galectin-3 with high affinity.

A series of small C1 or C1 and C3-substituted galactopyranosides have been disclosed showing affinity towards galectin-3 and 1. The beta-D-galactopyranosides were reported as having affinity in the same range or less than lactose, which has a Kd of about 91 μM towards galectin 3 and 190 μM towards galectin 1. (Giguere, D et. al. 2011, 2008, 2006).

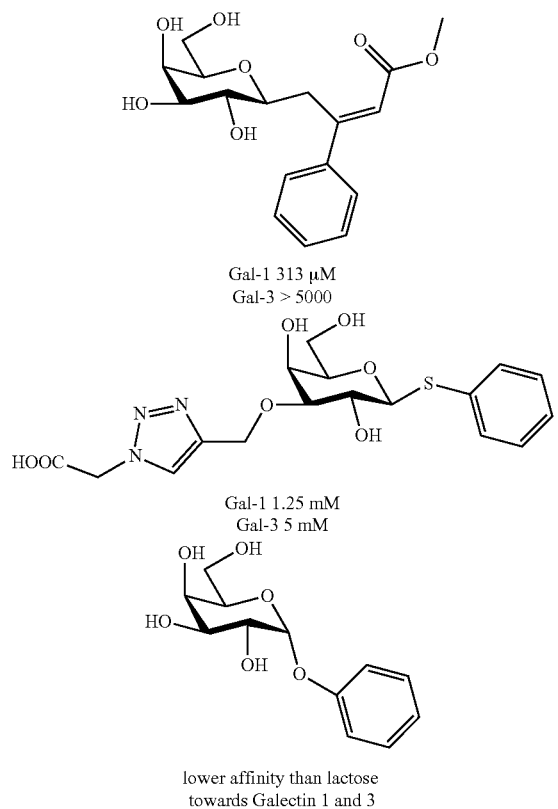

There is no disclosure or mentioning of corresponding alpha-anomers having affinity towards galectin-1 or galectin-3 better than lactose.

SUMMARY

The compounds of the present invention are novel β-D-galactopyranose compounds that unexpectedly have shown high affinity for galectin-1 and/or -3 and are considered novel potent drug candidates.

In broad first aspect the present invention concerns a β-D-galactopyranose compound of formula (1)

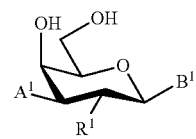

wherein
the pyranose ring is β-D-galactopyranose,
A1 is

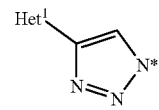

wherein the asterix * indicates the nitrogen atom of the triazole ring that is covalently attached to the galactopyranose;
wherein $Het^1$ is a five or six membered heteroaromatic ring selected from the group consisting of formulas 2 to 10, wherein the asterix * indicates the carbon atom of the heteroaromatic ring that is covalently attached to the triazole group in formula $A^1$:

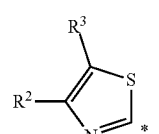

2

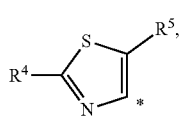

3

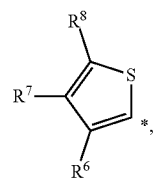

4

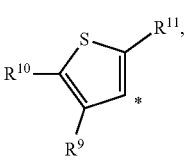

5

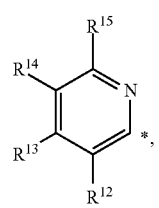

6

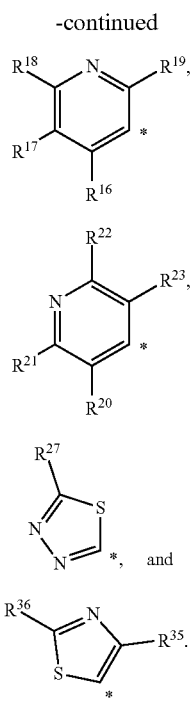

wherein R² to R²³, R²⁷, R³⁵ and R³⁶ are independently selected from H; halogen; OH; CN; SH; S—C₁₋₆ alkyl; C₁₋₆ alkyl, optionally substituted with a F; cyclopropyl, optionally substituted with a F; iso-propyl, optionally substituted with a F; O-cyclopropyl optionally substituted with a F; O-isopropyl optionally substituted with a F; OC₁₋₆ alkyl optionally substituted with a F; NR²⁴R²⁵, wherein R²⁴ is selected from H and C₁₋₆ alkyl, and R² is selected from H, C1-3 alkyl, and COR²⁶, wherein R²⁶ is selected from H, and C₁₋₆ alkyl;

wherein B1 is selected from the group consisting of a heteroaryl, an aryl and a heterocycloalkyl, optionally substituted with one or more groups selected from a) C₁₋₆ alkyl optionally substituted with one or more of C₁₋₆ alkyl, amino, CN, halogen, hydroxy, C₁₋₆ alkoxy, carboxy, alkoxycarbonyl, H₂NCO, b) R²⁸—C₁₋₆ alkyl, c) C₃₋₆ cycloalkyl optionally substituted with one or more of C₁₋₆ alkyl, amino, CN, halogen, or hydroxy, c) C₁₋₆ alkenyl, d) C₁₋₆ alkoxy, e) C₁₋₆ alkylthio, f) C₁₋₆ alkylsulfonyl, g) carbonyl substituted with any one of hydroxy, C₁₋₆ alkoxy, C₁₋₆ alkylNH, ((R²⁹)(R³⁰)N)C₁₋₆ alkylNH, or (pyridinyl)C₁₋₆ alkylNH, h) (R³¹)(R³²)N, i) C₂-alkynyl, and j) R²⁸;

wherein R² is selected from any one of a) phenyl, naphthalinyl, biphenyl, pyridinyl, pyridazinyl, pyrimidinyl, pyrazinyl, quinolinyl, isoquinolinyl, quinoxainyl, indolyl, indazolyl, benzimidazolyl, benzisoxazolyl, benzisothiazolyl, benzoxazolyl, benzothiazolyl, benzodioxolyl, dihydrobenzodioxinyl, dihydroquinolinonyl, dihydrobenzothiophene-2,2-dioxide, pyrrolyl, furanyl, thienyl, pyrazolyl, isoxazolyl, isothiazolyl, imidazolyl, oxazolyl, thiazolyl, triazolyl, oxadiazolyl, or thiadiazolyl; optionally substituted with one or more substituents selected from the group consisting of cyano, nitro, OH, C₂-alkynyl, halogen, C₁₋₆ alkyl, halo-C₁₋₆ alkyl, C₃₋₆ cycloalkyl, C₁₋₆ alkoxy, halo-C₁₋₆ alkoxy, C₁₋₆ alkylthio, carboxy, C₁₋₆ alkoxycarbonyl, CONH₂, and (R³³)(R³)N; or b) (C₁₋₆ alkyl-SO₂)phenyl, (C₁₋₆ alkyl SO₂)(halo)phenyl, (aminoSO₂)phenyl, (di-C₁₋₆ alkylaminoSO₂)phenyl, ((C₁₋₆ alkyl-NHSO₂)—C₁₋₆ alkyl) phenyl, (pyrrolyl)phenyl, (imidazolyl)phenyl, (oxazolyl)phenyl, (tetrazolyl)phenyl, ((pyridinyl)methyl) phenyl, phenoxyphenyl, (benzyloxy)phenyl, ((methyl) thiazolyl)-phenyl, (thiazolyl)-benzenesulfamido, ((methyl)thiadiazolyl)benzenesulfamido, (methyl)-benzothiazolonyl, or fluoropyrazolopyrimidinyl;

wherein

R² is hydrogen or C₁₋₆ alkyl;

R₃₀ is hydrogen or C₁₋₆ alkyl; or (R²)(R³⁰)N taken together is any one of azetidinyl, pyrrolidinyl, piperidinyl, piperazinyl, or morpholinyl, optionally substituted with one or more substituents selected from halogen, C₁₋₆ alkyl, and hydroxy;

R³¹ is hydrogen, C₁₋₆-alkyl, C₁₋₆-alkylcarbonyl, or C₁₋₆-alkylsulfonyl;

R³² is hydrogen or C₁₋₆ alkyl; or (R³¹)(R³²)N taken together is any one of azetidinyl, pyrrolidinyl, piperidinyl, piperazinyl, or morpholinyl, optionally substituted with one or more substituents selected from halogen, C₁₋₆ alkyl, and C₁₋₆ alkylcarbonyl;

R³³ is hydrogen, C₁₋₆ alkyl, C₁₋₆ alkylcarbonyl, or C₁₋₆ alkylsulfonyl;

R³⁴ is hydrogen or C₁₋₆ alkyl; or (R³)(R³)N taken together is any one of azetidinyl, pyrrolidinyl, piperidinyl, piperazinyl, or morpholinyl, optionally substituted with one or more substituents selected from halogen, C₁₋₆ alkyl, and C₁₋₆ alkylcarbonyl;

R¹ is selected from the group consisting of a) H, b) OH, c) OC₁₋₆ alkyl optionally substituted with one or more halogen, phenyl, phenyl substituted with one or more groups selected form OH and halogen, CN, OR¹⁷, NR¹⁸R¹⁹, and CONH₂, wherein R¹⁷ is selected from the group consisting of H, CN, a halogen, methyl optionally substituted with a F, OCH₃ optionally substituted with a F, OCH₂CH₃ optionally substituted with a F, OH, and R²⁰—CONH— wherein R²⁰ is selected from C₁₋₃ alkyl and cyclopropyl, R¹⁸ is selected from the group consisting of H, CN, a halogen, methyl optionally substituted with a F, OCH₃ optionally substituted with a F, OCH₂CH₃ optionally substituted with a F, OH, and R²¹—CONH— wherein R²¹ is selected from C₁₋₃ alkyl and cyclopropyl, and R¹⁹ is selected from the group consisting of H, CN, a halogen, methyl optionally substituted with a F, OCH₃ optionally substituted with a F, OCH₂CH₃ optionally substituted with a F, OH, and R²²—CONH— wherein R²² is selected from C₁₋₃ alkyl and cyclopropyl, d) branched OC₃₋₆ alkyl optionally substituted with one or more halogen, CN, OR²³, NR²⁴R²⁵, and CONH₂, wherein R²³ is selected from the group consisting of H, CN, a halogen, methyl optionally substituted with a F, OCH₃ optionally substituted with a F, OCH₂CH₃ optionally substituted with a F, OH, and R²⁶—CONH— wherein R²⁶ is selected from C₁₋₃ alkyl and cyclopropyl, R²⁴ is selected from the group consisting of H, CN, a halogen, methyl optionally substituted with a F, OCH₃ optionally substituted with a F, OCH₂CH₃ optionally substituted with a F, OH, and R²⁷—CONH— wherein R²⁷ is selected from C₁₋₃ alkyl and cyclopropyl, and R² is selected from the group consisting of H, CN, a halogen, methyl optionally substituted with a F, OCH₃ optionally substituted with a F, OCH₂CH₃ optionally substituted with a F, OH, and R²⁸—CONH— wherein R²⁸ is selected from $C_{1-3}$ alkyl and cyclopropyl, e) cyclic $OC_{3-6}$ alkyl optionally substituted with one or more halogen, CN, $OR^{29}$, $NR^{30}R^{31}$, and $CONH_2$, wherein $R^9$ is selected from the group consisting of H, CN, a halogen, methyl optionally substituted with a F, $OCH_3$ optionally substituted with a F, $OCH_2CH_3$ optionally substituted with a F, OH, and $R^{32}$—CONH— wherein $R^{32}$ is selected from $C_{1-3}$ alkyl and cyclopropyl, $R^{30}$ is selected from the group consisting of H, CN, a halogen, methyl optionally substituted with a F, $OCH_3$ optionally substituted with a F, $OCH_2CH_3$ optionally substituted with a F, OH, and $R^{33}$—CONH— wherein $R^{33}$ is selected from $C_{1-3}$ alkyl and cyclopropyl, and $R^{31}$ is selected from the group consisting of H, CN, a halogen, methyl optionally substituted with a F, $OCH_3$ optionally substituted with a F, $OCH_2CH_3$ optionally substituted with a F, OH, and $R^{34}$—CONH— wherein $R^{34}$ is selected from $C_{1-3}$ alkyl and cyclopropyl, and f) a fluorine (F); or a pharmaceutically acceptable salt or solvate thereof.

In a further aspect the present invention concerns a β-D-galactopyranose compound of formula (1)

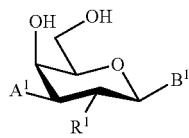

wherein
the pyranose ring is β-D-galactopyranose,
A1 is

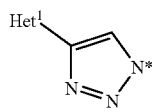

wherein the asterix * indicates the nitrogen atom of the triazole ring that is covalently attached to the galactopyranose;

wherein Het¹ is a five or six membered heteroaromatic ring selected from the group consisting of formulas 2 to 9, wherein the asterix * indicates the carbon atom of the heteroaromatic ring that is covalently attached to the triazole group in formula A¹:

2

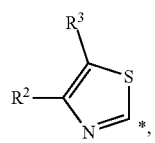

3

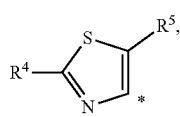

4

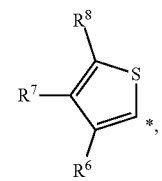

5

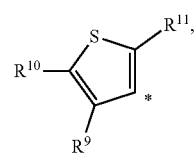

6

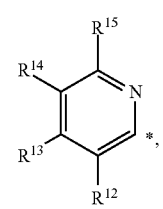

7

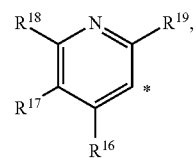

8

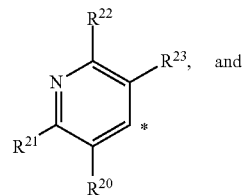

and

9

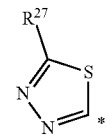

wherein $R^2$ to $R^{23}$ and $R^{27}$ are independently selected from H; halogen; OH; CN; SH; S—$C_{1-6}$ alkyl; $C_{1-6}$ alkyl, optionally substituted with a F; cyclopropyl, optionally substituted with a F; iso-propyl, optionally substituted with a F; O-cyclopropyl optionally substituted with a F; O-isopropyl optionally substituted with a F; $OC_{1-6}$ alkyl optionally substituted with a F; $NR^{24}R^{25}$, wherein $R^{24}$ is selected from H and $C_{1-6}$ alkyl, and $R^{25}$ is selected from H, $C_{1-3}$ alkyl, and $COR^{26}$, wherein $R^{26}$ is selected from H, and $C_{1-6}$ alkyl;

wherein B1 is selected from the group consisting of a heteroaryl, an aryl and a heterocycloalkyl, optionally substituted with one or more groups selected from a) $C_{1-6}$ alkyl optionally substituted with one or more of $C_{1-6}$ alkyl, amino, CN, halogen, hydroxy, $C_{1-6}$ alkoxy, carboxy, alkoxycarbonyl, $H_2NCO$, b) $R^{28}$—$C_{1-6}$ alkyl, c) $C_{3-6}$ cycloalkyl optionally substituted with one or more of $C_{1-6}$ alkyl, amino, CN, halogen, or hydroxy, c) $C_{1-6}$ alkenyl, d) $C_{1-6}$ alkoxy, e) $C_{1-6}$ alkylthio, f) $C_{1-6}$ alkylsulfonyl, g) carbonyl substituted with any one of hydroxy, $C_{1-6}$ alkoxy, $C_{1-6}$ alkylNH, $((R^{29})(R^{30})N)C_{1-6}$ alkylNH, or (pyridinyl)$C_{1-6}$ alkylNH, h) $(R^{31})(R^{32})N$, i) $C_2$-alkynyl, and j) $R^{28}$;

wherein $R^{28}$ is selected from any one of a) phenyl, naphthalinyl, biphenyl, pyridinyl, pyridazinyl, pyrimidinyl, pyrazinyl, quinolinyl, isoquinolinyl, quinoxainyl, indolyl, indazolyl, benzimidazolyl, benzisoxazolyl, benzisothiazolyl, benzoxazolyl, benzothiazolyl, benzodioxolyl, dihydrobenzodioxinyl, dihydroquinolinonyl, dihydrobenzothiophene-2,2-dioxide, pyrrolyl, furanyl, thienyl, pyrazolyl, isoxazolyl, isothiazolyl, imidazolyl, oxazolyl, thiazolyl, triazolyl, oxadiazolyl, or thiadiazolyl; optionally substituted with one or more substituents selected from the group consisting of cyano, nitro, OH, $C_2$-alkynyl, halogen, $C_{1-6}$ alkyl, halo-$C_{1-6}$ alkyl, $C_{3-6}$ cycloalkyl, $C_{1-6}$ alkoxy, halo-$C_{1-6}$ alkoxy, $C_{1-6}$ alkylthio, carboxy, $C_{1-6}$ alkoxycarbonyl, $CONH_2$, and $(R^{33})(R^3)N$; or b) ($C_{1-6}$ alkyl-$SO_2$)phenyl, ($C_{1-6}$ alkyl $SO_2$)(halo)phenyl, (amino$SO_2$)phenyl, (di-$C_{1-6}$ alkylamino$SO_2$)phenyl, (($C_{1-6}$-alkyl-$NHSO_2$)—$C_{1-6}$ alkyl)phenyl, (pyrrolyl)phenyl, (imidazolyl)phenyl, (oxazolyl)phenyl, (tetrazolyl)phenyl, ((pyridinyl)methyl)phenyl, phenoxyphenyl, (benzyloxy)phenyl, ((methyl)thiazolyl)-phenyl, (thiazolyl)-benzenesulfamido, ((methyl)thiadiazolyl) benzenesulfamido, (methyl)-benzothiazolonyl, or fluoropyrazolopyrimidinyl;

wherein $R^{29}$ is hydrogen or $C_{1-6}$ alkyl;

$R_{30}$ is hydrogen or $C_{1-6}$ alkyl; or $(R^{29})(R^{30})N$ taken together is any one of azetidinyl, pyrrolidinyl, piperidinyl, piperazinyl, or morpholinyl, optionally substituted with one or more substituents selected from halogen, $C_{1-6}$ alkyl, and hydroxy;

$R^{31}$ is hydrogen, $C_{1-6}$ alkyl, $C_{1-6}$-alkylcarbonyl, or $C_{1-6}$-alkylsulfonyl;

$R^{32}$ is hydrogen or $C_{1-6}$ alkyl; or $(R^{31})(R^{32})N$ taken together is any one of azetidinyl, pyrrolidinyl, piperidinyl, piperazinyl, or morpholinyl, optionally substituted with one or more substituents selected from halogen, $C_{1-6}$ alkyl, and $C_{1-6}$ alkylcarbonyl;

$R^{33}$ is hydrogen, $C_{1-6}$-alkyl, $C_{1-6}$-alkylcarbonyl, or $C_{1-6}$-alkylsulfonyl;

$R^{34}$ is hydrogen or $C_{1-6}$ alkyl; or $(R^{33})(R^{34})N$ taken together is any one of azetidinyl, pyrrolidinyl, piperidinyl, piperazinyl, or morpholinyl, optionally substituted with one or more substituents selected from halogen, $C_{1-6}$ alkyl, and $C_{1-6}$ alkylcarbonyl;

$R^1$ is selected from the group consisting of a) H, b) OH, c) $OC_{1-6}$ alkyl optionally substituted with one or more halogen, phenyl, phenyl substituted with one or more groups selected form OH and halogen, CN, $OR^{17}$, $NR^{18}R^{19}$, and $CONH_2$, wherein $R^{17}$ is selected from the group consisting of H, CN, a halogen, methyl optionally substituted with a F, $OCH_3$ optionally substituted with a F, $OCH_2CH_3$ optionally substituted with a F, OH, and $R^{20}$—CONH— wherein $R^{20}$ is selected from $C_{1-3}$ alkyl and cyclopropyl, $R^{18}$ is selected from the group consisting of H, CN, a halogen, methyl optionally substituted with a F, $OCH_3$ optionally substituted with a F, $OCH_2CH_3$ optionally substituted with a F, OH, and $R^{21}$—CONH— wherein $R^{21}$ is selected from $C_{1-3}$ alkyl and cyclopropyl, and $R^{19}$ is selected from the group consisting of H, CN, a halogen, methyl optionally substituted with a F, $OCH_3$ optionally substituted with a F, $OCH_2CH_3$ optionally substituted with a F, OH, and $R^{22}$—CONH— wherein $R^{22}$ is selected from $C_{1-3}$ alkyl and cyclopropyl, d) branched $OC_{3-6}$ alkyl optionally substituted with one or more halogen, CN, $OR^{23}$, $NR^{24}R^{25}$, and $CONH_2$, wherein $R^{23}$ is selected from the group consisting of H, CN, a halogen, methyl optionally substituted with a F, $OCH_3$ optionally substituted with a F, $OCH_2CH_3$ optionally substituted with a F, OH, and $R^{26}$—CONH— wherein $R^{26}$ is selected from $C_{1-3}$ alkyl and cyclopropyl, $R^{24}$ is selected from the group consisting of H, CN, a halogen, methyl optionally substituted with a F, $OCH_3$ optionally substituted with a F, $OCH_2CH_3$ optionally substituted with a F, OH, and $R^{27}$—CONH— wherein $R^{27}$ is selected from $C_{1-3}$ alkyl and cyclopropyl, and $R^2$ is selected from the group consisting of H, CN, a halogen, methyl optionally substituted with a F, $OCH_3$ optionally substituted with a F, $OCH_2CH_3$ optionally substituted with a F, OH, and $R^{28}$—CONH— wherein $R^{28}$ is selected from $C_{1-3}$ alkyl and cyclopropyl, e) cyclic $OC_{3-6}$ alkyl optionally substituted with one or more halogen, CN, $OR^{29}$, $NR^{30}R^{31}$, and $CONH_2$, wherein $R^9$ is selected from the group consisting of H, CN, a halogen, methyl optionally substituted with a F, $OCH_3$ optionally substituted with a F, $OCH_2CH_3$ optionally substituted with a F, OH, and $R^{32}$—CONH— wherein $R^{32}$ is selected from $C_{1-3}$ alkyl and cyclopropyl, $R^{30}$ is selected from the group consisting of H, CN, a halogen, methyl optionally substituted with a F, $OCH_3$ optionally substituted with a F, $OCH_2CH_3$ optionally substituted with a F, OH, and $R^{33}$—CONH— wherein $R^{33}$ is selected from $C_{1-3}$ alkyl and cyclopropyl, and $R^{31}$ is selected from the group consisting of H, CN, a halogen, methyl optionally substituted with a F, $OCH_3$ optionally substituted with a F, $OCH_2CH_3$ optionally substituted with a F, OH, and $R^{34}$—CONH— wherein $R^{34}$ is selected from $C_{1-3}$ alkyl and cyclopropyl, and f) a fluorine (F); or a pharmaceutically acceptable salt or solvate thereof.

In an embodiment Het1 is selected from the group consisting of

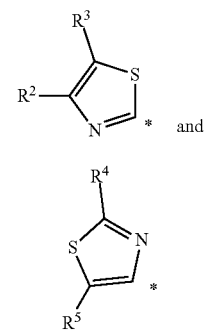

wherein $R^2$ is selected from the group consisting of hydrogen, $C_{1-3}$ alkyl, OH and halogen;

$R^3$ is selected from the group consisting of hydrogen, $C_{1-3}$ alkyl and halogen;

$R^4$ is selected from the group consisting of OH, halogen and amino;

$R^5$ is selected from the group consisting of hydrogen, $C_{1-3}$ alkyl and halogen.

In a further embodiment Het1 is selected from the group consisting of

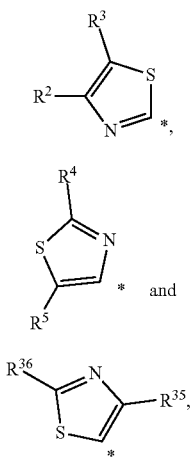

wherein R² is selected from the group consisting of hydrogen, methyl, OH and halogen;
R³ is selected from the group consisting of hydrogen, $C_{1-6}$ alkyl and halogen;
R⁴ is selected from the group consisting of OH, $C_{1-6}$alkyl, halogen and amino;
R⁵ is selected from the group consisting of hydrogen, $C_{1-6}$ alkyl and halogen;
R³⁵ is selected from the group consisting of hydrogen, OH, $C_{1-6}$ alkyl, halogen and amino,
R³⁶ is selected from the group consisting of hydrogen, OH, $C_{1-6}$ alkyl, halogen and amino.

Preferably Het1 is selected from the group consisting of

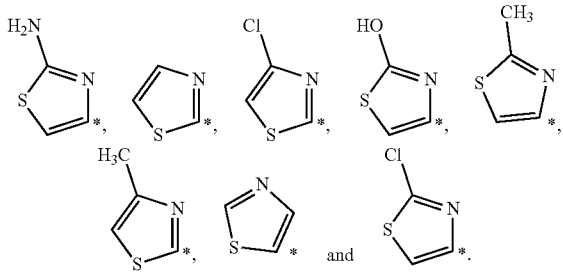

In another embodiment Het1 is selected from the group consisting of

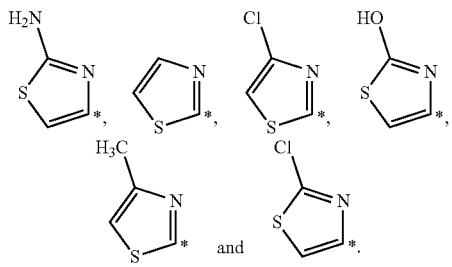

In a further embodiment B¹ is selected from the group consisting of pyrrolyl, furanyl, thienyl, pyrazolyl, isoxazolyl, isothiazolyl, imidazolyl, oxazolyl, thiazolyl, triazolyl, oxadiazolyl, thiadiazolyl, phenyl, or indolyl; optionally substituted with a group selected from a) $C_{1-6}$ alkyl optionally substituted with one or more of $C_{1-6}$ alkyl, halogen, hydroxy, $C_{1-6}$ alkoxy, carboxy, alkoxycarbonyl, $H_2NCO$, b) $R^{28}$—$C_{1-6}$ alkyl, c) $C_{3-6}$ cycloalkyl optionally substituted with one or more of $C_{1-6}$ alkyl, halogen, or hydroxy, c) $C_{1-6}$ alkenyl, d) $C_{1-6}$ alkoxy, e) $C_{1-6}$ alkylthio, f) $C_{1-6}$ alkylsulfonyl, g) carbonyl substituted with any one of hydroxy, $C_{1-6}$ alkoxy, $C_{1-6}$ alkylNH, (($R^{29}$)($R^{30}$)N)$C_{1-6}$ alkylNH, or (pyridinyl)$C_{1-6}$ alkylNH, h) ($R^{31}$)($R^{32}$)N, and i) $R^{28}$; wherein $R^{28}$, $R^{29}$, $R^{30}$, $R^{31}$ and $R^{32}$ are as defined above in the first aspect.

In a still further embodiment B1 is selected from the group consisting of pyrrolyl, furanyl, thienyl, pyrazolyl, isoxazolyl, isothiazolyl, imidazolyl, oxazolyl, thiazolyl, triazolyl, oxadiazolyl, thiadiazolyl, phenyl, or indolyl; optionally substituted with a group selected from a) $C_{1-6}$ alkyl optionally substituted with one or more of halogen, and j) $R^{28}$; wherein $R^{28}$ is selected from the group consisting of phenyl, naphthalinyl, biphenyl, pyridinyl, pyridazinyl, pyrimidinyl, pyrazinyl, quinolinyl, isoquinolinyl, quinoxainyl, indolyl, indazolyl, benzimidazolyl, benzisoxazolyl, benzisothiazolyl, benzoxazolyl, benzothiazolyl, benzodioxolyl, dihydrobenzodioxinyl, dihydroquinolinonyl, dihydrobenzothiophene-2,2-dioxide, pyrrolyl, furanyl, thienyl, pyrazolyl, isoxazolyl, isothiazolyl, imidazolyl, oxazolyl, thiazolyl, triazolyl, oxadiazolyl, or thiadiazolyl; optionally substituted with one or more substituents selected from the group consisting of cyano, nitro, OH, $C_2$-alkynyl, halogen, $C_{1-6}$ alkyl, halo-$C_{1-6}$ alkyl, $C_{3-6}$ cycloalkyl, $C_{1-6}$ alkoxy, halo-$C_{1-6}$ alkoxy, $C_{1-6}$ alkylthio, carboxy, $C_{1-6}$ alkoxycarbonyl, and $CONH_2$.

In a further embodiment B1 is selected from pyrazolyl or triazolyl; optionally substituted with a group selected from methyl, $CF_3$, and $R^{28}$; wherein $R^{28}$ is selected from the group consisting of phenyl, benzimidazolyl, and benzothiazolyl, optionally substituted with one or more substituents selected from the group consisting of halogen, $C_{1-6}$ alkyl, halo-$C_{1-6}$ alkyl, and $C_{3-6}$ cycloalkyl.

In a still further embodiment B1 is selected from pyrazolyl or triazolyl; optionally substituted with a group selected from methyl, $CF_3$, and $R^{28}$; wherein $R^{28}$ is selected form the group consisting of phenyl, pyridyl, benzimidazolyl, and benzothiazolyl, optionally substituted with one or more substituents selected from the group consisting of halogen, $C_{1-6}$ alkyl, halo-$C_{1-6}$ alkyl, and $C_{3-6}$cycloalkyl.

In a still further embodiment R¹ is selected from H, OH, $OC_{1-4}$ alkyl, such as O-methyl, O-ethyl, or O-isopropyl, or $OC_{1-4}$ alkyl substituted with at least one from the group consisting of phenyl and phenyl substituted with one or more groups selected form OH and halogen. Typically, R¹ is selected from H, OH, $OC_{1-4}$ alkyl, Such as OH and O-methyl.

In a further embodiment the compound of formula (1) is selected from any one of:
3-[4-(4-chlorothiazol-2-yl)-1H-1,2,3-triazol-1-yl]-1,3-dideoxy-1-[4-(2-methylbenzo[d]thiazol-6-yl)-4H-1,2,4-triazole-3-yl]-β-D-galactopyranoside,
1-[4-(3-chlorophenyl)-4H-1,2,4-triazole-3-yl]-1,3-dideoxy-3-[4-(2-hydroxythiazol-4-yl)-1H-1,2,3-triazol-1-yl]-β-D-galactopyranoside,
1-[4-(5-chloro-2-methylphenyl)-5-(trifluoromethyl)-4H-1,2,4-triazole-3-yl]-1,3-dideoxy-3-[4-(2-hydroxythiazol-4-yl)-1H-1,2,3-triazol-1-yl]-2-O-methyl-β-D-galactopyranoside,
1-[4-(2,5-dichlorophenyl)-4H-1,2,4-triazole-3-yl]-1,3-dideoxy-3-[4-(4-methylthiazol-2-yl)-1H-1,2,3-triazol-1-yl]-β-D-galactopyranoside, 1-[1-(2-bromo-5-chlorophenyl)-3-methyl-1H-1,2,4-triazole-5-yl]-1,3-dideoxy-3-[4-(thiazol-2-yl)-1H-1,2,3-triazol-1-yl]-β-D-galactopyranoside, 3-[4-(2-aminothiazol-4-yl)-1H-1,2,3-triazol-1-yl]-1,3-dideoxy-1-[4-(2-methylbenzo[d]thiazol-6-yl)-4H-1,2,4-triazole-3-yl]-β-D-galactopyranoside, and 1-[1-(2-bromo-5-chlorophenyl)-3-methyl-1H-1,2,4-triazole-5-yl]-1,2,3-trideoxy-3-[4-(thiazol-4-yl)-1H-1,2,3-triazol-1-yl]-β-D-galactopyranoside; or a pharmaceutically acceptable salt or solvate thereof.

In a still further embodiment the compound of formula (1) is selected from any one of:

6-{3-{3-[4-(4-Chlorothiazol-2-yl)-1H-1,2,3-triazol-1-yl]-3-deoxy-β-D-galactopyranosyl}-4H-1,2,4-triazol-4-yl}-2-methylbenzothiazole, 3-Chloro-1-{3-{3-deoxy-3-[4-(2-hydroxythiazol-4-yl)-1H-1,2,3-triazol-1-yl]-β-D-galactopyranosyl}-4H-1,2,4-triazol-4-yl}benzene, 5-Chloro-1-{3-{3-deoxy-3-[4-(2-hydroxythiazol-4-yl)-1H-1,2,3-triazol-1-yl]-2-O-methyl-β-D-galactopyranosyl}-5-trifluoromethyl-4H-1,2,4-triazol-4-yl}-2-methylbenzene, 2,5-Dichloro-1-{3-{3-deoxy-3-[4-(4-methylthiazol-2-yl)-1H-1,2,3-triazol-1-yl]-β-D-galactopyranosyl}-4H-1,2,4-triazol-4-yl}benzene, 2-Bromo-5-chloro-1-{3-{3-Deoxy-3-[4-(2-thiazolyl)-1H-1,2,3-triazol-1-yl]-β-D-galactopyranosyl}-5-methyl-1H-1,2,4-triazol-4-yl}benzene, 6-{3-{3-[4-(2-Aminothiazol-4-yl)-1H-1,2,3-triazol-1-yl]-3-deoxy-β-D-galactopyranosyl}-4H-1,2,4-triazol-4-yl}-2-methylbenzothiazole, 2-Bromo-5-chloro-1-{3-{3-Deoxy-3-[4-(4-thiazolyl)-1H-1,2,3-triazol-1-yl]-β-D-galactopyranosyl}-5-methyl-1H-1,2,4-triazol-4-yl}benzene, 6-{3-{3-Deoxy-3-[4-(2-hydroxythiazol-4-yl)-1H-1,2,3-triazol-1-yl]-β-D-galactopyranosyl}-4H-1,2,4-triazol-4-yl}-2-methylbenzothiazole, 1-{3-{3-[4-(4-Chlorothiazol-2-yl)-1H-1,2,3-triazol-1-yl]-3-deoxy-β-D-galactopyranosyl}-5-methyl-4H-1,2,4-triazol-4-yl}-5-chloro-2-(trifluoromethyl)benzene, 6-{5-{3-Deoxy-3-[4-(2-thiazolyl)-1H-1,2,3-triazol-1-yl]-β-D-galactopyranosyl}-3-methyl-1H-1,2,4-triazol-1-yl}-2-methylbenzothiazole, 5-Chloro-1-{3-{3-deoxy-3-[4-(4-methylthiazol-2-yl)-1H-1,2,3-triazol-1-yl]-β-D-galactopyranosyl}-5-methyl-4H-1,2,4-triazol-4-yl}-2-(trifluoromethyl)benzene, 5-Chloro-1-{3-{3-deoxy-3-[4-(2-hydroxythiazol-4-yl)-1H-1,2,3-triazol-1-yl]β-D-galactopyranosyl}-5-methyl-4H-1,2,4-triazol-4-yl}-2-(trifluoromethyl)benzene, 6-{5-{3-Deoxy-3-[4-(2-methylthiazol-4-yl)-1H-1,2,3-triazol-1-yl]-β-D-galactopyranosyl}-3-methyl-1H-1,2,4-triazol-1-yl}-2-methylbenzothiazole, 6-{5-{3-Deoxy-3-[4-(5-thiazolyl)-1H-1,2,3-triazol-1-yl]-β-D-galactopyranosyl}-3-methyl-1H-1,2,4-triazol-1-yl}-2-methylbenzothiazole, 1-{3-{3-[4-(2-Aminothiazol-4-yl)-1H-1,2,3-triazol-1-yl]-3-deoxy-β-D-galactopyranosyl}-5-methyl-1H-1,2,4-triazol-4-yl}-5-chloro-2-(trifluoromethyl)benzene, 1-{3-{3-[4-(4-Chlorothiazol-2-yl)-1H-1,2,3-triazol-1-yl]-3-deoxy-β-D-galactopyranosyl}-5-methyl-1H-1,2,4-triazol-4-yl}-5-chloro-2-(trifluoromethyl)benzene, 1-{3-{3-[4-(4-Chlorothiazol-2-yl)-1H-1,2,3-triazol-1-yl]-3-deoxy-2-O-methyl-β-D-galactopyranosyl}-5-methyl-4H-1,2,4-triazol-4-yl}-5-chloro-2-(trifluoromethyl)benzene, 3-{5-{3-[4-(4-Chlorothiazol-2-yl)-1H-1,2,3-triazol-1-yl]-3-deoxy-β-D-galactopyranosyl}-3-methyl-1H-1,2,4-triazol-1-yl}-5-chloro-2-cyclopropylpyridine, 1-{3-{3-[4-(2-Aminothiazol-4-yl)-1H-1,2,3-triazol-1-yl]-3-deoxy-β-D-galactopyranosyl}-5-methyl-4H-1,2,4-triazol-4-yl}-5-chloro-2-(trifluoromethyl)benzene, 5-Chloro-1-{3-{3-deoxy-3-[4-(2-thiazolyl)-1H-1,2,3-triazol-1-yl]-β-D-galactopyranosyl}-5-methyl-4H-1,2,4-triazol-4-yl}-2-(trifluoromethyl)benzene, 6-{3-{3-Deoxy-3-[4-(2-thiazolyl)-1H-1,2,3-triazol-1-yl]-β-D-galactopyranosyl}-4H-1,2,4-triazol-4-yl}-2-methylbenzothiazole, 6-{3-{3-Deoxy-3-[4-(4-methylthiazol-2-yl)-1H-1,2,3-triazol-1-yl]-β-D-galactopyranosyl}-4H-1,2,4-triazol-4-yl}-2-methylbenzothiazole, 6-{5-{3-[4-(4-Chlorothiazol-2-yl)-1H-1,2,3-triazol-1-yl]-3-deoxy-β-D-galactopyranosyl}-3-methyl-1H-1,2,4-triazol-1-yl}-2-methylbenzothiazole, 6-{5-{3-[4-(2-Aminothiazol-4-yl)-1H-1,2,3-triazol-1-yl]-3-deoxy-β-D-galactopyranosyl}-3-methyl-1H-1,2,4-triazol-1-yl}-2-methylbenzothiazole, 6-{3-{3-[4-(4-Chlorothiazol-2-yl)-1H-1,2,3-triazol-1-yl]-3-deoxy-2-O-methyl-β-D-galactopyranosyl}-5-methyl-4H-1,2,4-triazol-4-yl}-2-methylbenzothiazole, 6-{3-{3-[4-(4-Chlorothiazol-2-yl)-1H-1,2,3-triazol-1-yl]-3-deoxy-β-D-galactopyranosyl}-5-methyl-4H-1,2,4-triazol-4-yl}-2-methylbenzothiazole, 5-{3-{3-[4-(4-Chlorothiazol-2-yl)-1H-1,2,3-triazol-1-yl]-3-deoxy-β-D-galactopyranosyl}-5-methyl-4H-1,2,4-triazol-4-yl}-N-3-methylbenzimidazole, 1-{5-{3-[4-(4-Chlorothiazol-2-yl)-1H-1,2,3-triazol-1-yl]-3-deoxy-β-D-galactopyranosyl}-1H-1,2-pyrazol-1-yl}-5-chloro-2-(trifluoromethyl)benzene, and 6-{3-{3-[4-(4-Chlorothiazol-2-yl)-1H-1,2,3-triazol-1-yl]-3-deoxy-β-D-galactopyranosyl}-1H-1,2-pyrazol-1-yl}-2-methylbenzothiazole; or a pharmaceutically acceptable salt or solvat thereof.

In a further aspect the present invention relates to a compound of formula (1) for use as a medicine.

In a still further aspect, the present invention relates to a pharmaceutical composition comprising the compound of any one of the previous claims and optionally a pharmaceutically acceptable additive, such as a carrier and/or excipient.

In a further aspect the present invention relates to a compound of formula (1) of the present invention for use in a method for treating a disorder relating to the binding of a galectin-1 and/or -3 to a ligand in a mammal, such as a human. In a further embodiment the disorder is selected from the group consisting of inflammation; Inflammation induced thrombosis; Atopic dermatitis; Acute coronary syndrome; fibrosis, such as pulmonary fibrosis, liver fibrosis, kidney fibrosis, ophthalmological fibrosis and fibrosis of the skin and heart; local fibrosis such as Dupuytren's disease and Peyronie's disease; fibrotic complications of other therapies such as coronary stents, bile duct stents, cerebral artery stents, ureter stents; scleroderma; scarring; keloid formation; covid-19; acute lung injury; ARDS; viral pneumonitis, aberrant scar formation; surgical adhesions; septic shock; cancer, such as colorectal cancer, other gastrointestinal carcinomas such as pancreatic cancer, gastric cancer, biliary tract cancer, lung cancers, mesothelioma, female cancers like breast cancer, ovarian cancer, uterine cancer, cancer of the cervix uteri, cancer of the salpingx, cerebral cancers such as medulloblastomao, glioma, meningioma, sarcomas of the bones and muscles and other sarcomas, leukemias and lymphomas, such as T-cell lymphomas; transplant rejection; metastasising cancers; ageing; Dementia; Alzheimers; TGF-beta driven bone disease such as osteogenesis imperfecta; Pulmonary hypertension; autoimmune diseases, such as psoriasis, rheumatoid arthritis, Rheumatoid lung; Crohn's disease, ulcerative colitis, ankylosing spondylitis, systemic lupus erythematosus; viral infections such as influenza virus, HIV, Herpes virus, Coronaviruses, Hepatitis C; metabolic disorders; heart disease; heart failure; pathological angiogenesis, such as ocular angiogenesis or a disease or condition associated with ocular angiogenesis, e.g. neovascularization related to cancer, and eye diseases, such as age-related macular degeneration and corneal neovascularization; atherosclerosis; metabolic diseases; diabetes; type I diabetes; type 2 diabetes; insulin resistens; obesity; Marfans syndrome; Loeys-Dietz syndrome; nephropathy; Diastolic HF; fibrotic lung complications of aPD1 and other CPI therapies; asthma and other interstitial lung diseases, including Hermansky-Pudlak syndrome, liver disorders, such as non-alcoholic steatohepatitis or non-alcoholic fatty liver disease; uterine disease such as uterine fibroids and uterine or cervical fibrosis.

In a still further aspect the present invention relates to a method for treatment of a disorder relating to the binding of a galectin-1 and/or -3 to a ligand in a mammal, such as a human, wherein a therapeutically effective amount of at least one compound of formula (1) of the present invention is administered to a mammal in need of said treatment. In a further embodiment the disorder is selected from the group consisting of inflammation; Inflammation induced thrombosis; Atopic dermatitis; Acute coronary syndrome; fibrosis, such as pulmonary fibrosis, liver fibrosis, kidney fibrosis, ophthalmological fibrosis and fibrosis of the skin and heart; local fibrosis such as Dupuytren's disease and Peyronie's disease; fibrotic complications of other therapies such as coronary stents, bile duct stents, cerebral artery stents, ureter stents; scleroderma; scarring; keloid formation; covid-19; acute lung injury; ARDS; viral pneumonitis, aberrant scar formation; surgical adhesions; septic shock; cancer, such as colorectal cancer, other gastrointestinal carcinomas such as pancreatic cancer, gastric cancer, biliary tract cancer, lung cancers, mesothelioma, female cancers like breast cancer, ovarian cancer, uterine cancer, cancer of the cervix uteri, cancer of the salpingx, cerebral cancers such as medulloblastomao, glioma, meningioma, sarcomas of the bones and muscles and other sarcomas, leukemias and lymphomas, such as T-cell lymphomas; transplant rejection; metastasising cancers; ageing; Dementia; Alzheimers; TGFbeta driven bone disease such as osteogenesis imperfecta; Pulmonary hypertension; autoimmune diseases, such as psoriasis, rheumatoid arthritis, Rheumatoid lung; Crohn's disease, ulcerative colitis, ankylosing spondylitis, systemic lupus erythematosus; viral infections such as influenza virus, HIV, Herpes virus, Coronaviruses, Hepatitis C; metabolic disorders; heart disease; heart failure; pathological angiogenesis, such as ocular angiogenesis or a disease or condition associated with ocular angiogenesis, e.g. neovascularization related to cancer, and eye diseases, such as age-related macular degeneration and corneal neovascularization; atherosclerosis; metabolic diseases; diabetes; type I diabetes; type 2 diabetes; insulin resistens; obesity; Marfans syndrome; Loeys-Dietz syndrome; nephropathy; Diastolic HF; fibrotic lung complications of aPD1 and other CPI therapies; asthma and other interstitial lung diseases, including Hermansky-Pudlak syndrome, liver disorders, such as non-alcoholic steatohepatitis or non-alcoholic fatty liver disease; uterine disease such as uterine fibroids and uterine or cervical fibrosis.

Another aspect of the present invention concerns combination therapy involving administering a compound of formula (I) of the present invention together with a therapeutically active compound different from the compound of formula (I) (interchangeable with "a different therapeutically active compound"). In one embodiment the present invention relates to a combination of a compound of formula (I) and a different therapeutically active compound for use in treatment of a disorder relating to the binding of a galectin-1 and/or -3 to a ligand in a mammal. Such disorders are disclosed below.

In an embodiment of the present invention, a therapeutically effective amount of at least one compound of formula (I) of the present invention is administered to a mammal in need thereof in combination with a different therapeutically active compound. In a further embodiment, said combination of a compound of formula (I) together with a different therapeutically active compound is administered to a mammal suffering from a disorder selected from the group consisting of inflammation; fibrosis, such as pulmonary fibrosis, liver fibrosis, kidney fibrosis, ophthalmological fibrosis and fibrosis of the skin and heart; scarring; keloid formation; aberrant scar formation; surgical adhesions; septic shock; cancer, such as carcinomas, sarcomas, leukemias and lymphomas, such as T-cell lymphomas; metastasising cancers; autoimmune diseases, such as psoriasis, rheumatoid arthritis, Crohn's disease, ulcerative colitis, ankylosing spondylitis, systemic lupus erythematosus; metabolic disorders; heart disease; heart failure; pathological angiogenesis, such as ocular angiogenesis or a disease or condition associated with ocular angiogenesis, e.g. neovascularization related to cancer; and eye diseases, such as age-related macular degeneration and corneal neovascularization; atherosclerosis; metabolic diseases such as diabetes; type 2 diabetes; insulin resistens; obesity; Diastolic HF; asthma and other interstitial lung diseases, including Hermansky-Pudlak syndrome, mesothelioma; liver disorders, such as non-alcoholic steatohepatitis or non-alcoholic fatty liver disease.

A non-limiting group of cancers given as examples of cancers that may be treated, managed and/or prevented by administration of a compound of formula (I) in combination with a different therapeutically active compound is selected from: colon carcinoma, breast cancer, pancreatic cancer, ovarian cancer, prostate cancer, fibrosarcoma, myxosarcoma, liposarcoma, chondrosarcoma, osteogenic sarcoma, chordoma, angiosarcoma, endotheliosarcoma, lymphangeosarcoma, lymphangeoendothelia sarcoma, synovioma, mesothelioma, Ewing's sarcoma, leiomyosarcoma, rhabdomyosarcoma, squamous cell carcinoma, basal cell carcinoma, adenocarcinoma, sweat gland carcinoma, sebaceous gland carcinoma, papillary carcinoma, papillary adenocarcinomas, cystandeocarcinoma, medullary carcinoma, bronchogenic carcinoma, renal cell carcinoma, hepatoma, bile duct carcinoma, choriocarcinoma, seminoma, embryonal carcinoma, Wilms' tumor, cervical cancer, testicular tumor, lung carcinoma, small cell lung carcinoma, bladder carcinoma, epithelial carcinoma, glioblastomas, neuronomas, craniopharingiomas, schwannomas, glioma, astrocytoma, medulloblastoma, craniopharyngioma, ependymoma, pinealoma, hemangioblastoma, acoustic neuroama, oligodendroglioma, meningioma, melanoma, neuroblastoma, retinoblastoma, leukemias and lymphomas, acute lymphocytic leukemia and acute myelocytic polycythemia vera, multiple myeloma, Waldenstrom's macroglobulinemia, and heavy chain disease, acute nonlymphocytic leukemias, chronic lymphocytic leukemia, chronic myelogenous leukemia, Hodgkin's Disease, non-Hodgkin's lymphomas, rectum cancer, urinary cancers, uterine cancers, oral cancers, skin cancers, stomach cancer, brain tumors, liver cancer, laryngeal cancer, esophageal cancer, mammary tumors, childhood-null acute lymphoid leukemia (ALL), thymic ALL, B-cell ALL, acute myeloid leukemia, myelomonocytoid leukemia, acute megakaryocytoid leukemia, Burkitt's lymphoma, acute myeloid leukemia, chronic myeloid leukemia, and T cell leukemia, small and large non-small cell lung carcinoma, acute granulocytic leukemia, germ cell tumors, endometrial cancer, gastric cancer, cancer of the head and neck, chronic lymphoid leukemia, hairy cell leukemia and thyroid cancer.

In some aspects of the present invention, the administration of at least one compound of formula (I) of the present invention and at least one additional therapeutic agent demonstrates therapeutic synergy. In some aspects of the methods of the present invention, a measurement of response to treatment observed after administering both at least one compound of formula (I) of the present invention and the additional therapeutic agent is improved over the same measurement of response to treatment observed after administering either the at least one compound of formula (I) of the present invention or the additional therapeutic agent alone.

A further aspect of the present invention concerns combination therapy involving administering a compound of formula (I) of the present invention together with an anti-fibrotic compound different form the compound of formula (I) to a mammal in need thereof. In a further embodiment, such anti-fibrotic compound may be selected from the following non-limiting group of anti-fibrotic compounds: pirfenidone, nintedanib, simtuzumab (GS-6624, AB0024), BG00011 (STX100), PRM-151, PRM-167, PEG-FGF21, BMS-986020, FG-3019, MN-001, IW001, SAR156597, GSK2126458, PAT-1251 and PBI-4050.

A still further aspect of the present invention concerns combination therapy involving administering a compound of formula (I) in combination with a further conventional cancer treatment such as chemotherapy or radiotherapy, or treatment with immunostimulating substances, gene therapy, treatment with antibodies and treatment using dendritic cells, or mRNA based therapeutics including mRNA based cancer vaccines, and/or virus based cancer vaccines, to a mammal in need thereof.

In an embodiment the compound of formula (I) is administered together with at least one additional therapeutic agent selected from an antineoplastic chemotherapy agent. In a further embodiment, the antineoplastic chemotherapeutic agent is selected from: all-trans retinoic acid, Actimide, Azacitidine, Azathioprine, Bleomycin, Carboplatin, Capecitabine, Cisplatin, Chlorambucil, Cyclophosphamide, Cytarabine, Daunorubicin, Docetaxel, Doxifluridine, Doxorubicin, Epirubicin, Etoposide, Fludarabine, Fluorouracil, Gemcitabine, Hydroxyurea, Idarubicin, Irinotecan, Lenalidomide, Leucovorin, Mechlorethamine, Melphalan, Mercaptopurine, Methotrexate, Mitoxantrone, Oxaliplatin, Paclitaxel, Pemetrexed, Revlimid, Temozolomide, Teniposide, Thioguanine, Valrubicin, Vinblastine, Vincristine, Vindesine and Vinorelbine. In one embodiment, a chemotherapeutic agent for use in the combination of the present agent may, itself, be a combination of different chemotherapeutic agents. Suitable combinations include FOLFOX and IFL. FOLFOX is a combination which includes 5-fluorouracil (5-FU), leucovorin, and oxaliplatin. IFL treatment includes irinotecan, 5-FU, and leucovorin.

In a further embodiment of the present invention, the further conventional cancer treatment includes radiation therapy. In some embodiments, radiation therapy includes localized radiation therapy delivered to the tumor. In some embodiments, radiation therapy includes total body irradiation.

In other embodiments of the present invention the further cancer treatment is selected from the group of immunostimulating substances e.g. cytokines and antibodies. Such cytokines may be selected from the group consisting of, but not limited to: GM-CSF, type I IFN, interleukin 21, interleukin 2, interleukin 12 and interleukin 15. The antibody is preferably an immunostimulating antibody such as anti-CD40 or anti-CTLA-4 antibodies. The immunostimulatory substance may also be a substance capable of depletion of immune inhibitory cells (e.g. regulatory T-cells) or factors, said substance may for example be E3 ubiquitin ligases. E3 ubiquitin ligases (the HECT, RING and U-box proteins) have emerged as key molecular regulators of immune cell function, and each may be involved in the regulation of immune responses during infection by targeting specific inhibitory molecules for proteolytic destruction. Several HECT and RING E3 proteins have now also been linked to the induction and maintenance of immune self-tolerance: c-Cbl, Cbl-b, GRAIL, Itch and Nedd4 each negatively regulate T cell growth factor production and proliferation.

In some embodiments of the present invention the compound of formula (I) is administered together with at least one additional therapeutic agent selected from a checkpoint inhibitor. In some embodiments of the invention, the checkpoint inhibitor is acting on one or more of the following, non-limiting group of targets: CEACAM1, galectin-9, TIM3, CD80, CTLA4, PD-1, PD-L1, HVEM, BTLA, CD160, VISTA, B7-H4, B7-2, CD155, CD226, TIGIT, CD96, LAG3, GITF, OX40, CD137, CD40, IDO, and TDO, kyneurenine antagonists. These are known targets and some of these targets are described in Melero et al., Nature Reviews Cancer (2015). Examples of check point inhibitors administered together with the compound of formula (1) are Anti-PD-1: Nivolumab, Pembrolizumab, Cemiplimab. Anti-PD-L1: Atezolizumab, Avelumab, Durvalumab and one Anti-CTLA-4: Ipilimumab. Each one of these check point inhibitors can be made the subject of an embodiment in combination with any one of the compounds of formula (1).

In some embodiments of the present invention the compound of formula (I) is administered together with at least one additional therapeutic agent selected from an inhibitor of indoleamine-2,3-dioxygenase (IDO).

In some embodiments of the present invention the compound of formula (I) is administered together with at least one additional therapeutic agent selected from one or more inhibitors of the CTLA4 pathway. In some embodiments, the inhibitor of the CTLA4 pathway is selected from one or more antibodies against CTLA4.

In some embodiments of the present invention the compound of formula (I) is administered together with at least one additional therapeutic agent selected from one or more inhibitors of the PD-1/PD-L pathway. In some embodiments, the one or more inhibitors of the PD-1/PD-L pathway are selected from one or more antibodies or antibody fragments against PD-1, PD-L1, and/or PD-L2, or other ways by which an anti-PD1 antibodies can be induced such as mRNA based introduction of genetic material which sets forth in-body production of anti-PD1 or anti-PDL1 antibodies or fragments of such antibodies.

In a still further aspect the present invention relates to a process of preparing a compound of formula II or a pharmaceutically acceptable salt or solvate thereof comprising the step a1 where $B^1$ and $R^1$ are defined as above under formula 1;

a1) Reacting the compound of formula I with a compound of formula Het$^1$-CC—H or Het$^1$-CC-TMS in an inert solvent, such as DMF or acetonitrile, using a base, such as diisopropylethylamine or L-ascorbic acid sodium salt, catalyzed by a cupper salt such as CuI or copper(II) sulfate, optionally using a reagent such as CsF to provide a compound of the formula II. The compounds of formula I can be made by the synthesis described in WO2019067702A1.

In a still further aspect the present invention relates to a process of preparing a compound of formula II or a pharmaceutically acceptable salt or solvate thereof comprising the step a2 where A$^1$, B$^1$ and R$^1$ are defined as above under formula 1;

a2) Reacting a compound of formula III wherein X$^1$ and X$^2$ together form a protective group such as benzylidene in the presence of an acid, such as TFA or HCl, in an inert organic solvent, such as DCM, followed by neutralisation with an base, such as triethylamine, optionally at temperatures below room temperature, to give a compound of formula II.

In a still further aspect the present invention relates to a process of preparing a compound of formula VI or a pharmaceutically acceptable salt or solvate thereof comprising the step a3 and a4 where A$^1$, B$^1$, R$^1$ and R$^{28}$ are defined as above under formula 1;

a3) Reacting a compound of formula IV with N,N-dimethylformamide dimethyl acetal at elevated temperature followed by removal of solvents. The residues could be further further reacted with R28-NHNH$_2$ in a solvent such as ethanol in the presence of acid such as HCl to give a product of the formula V.

a4) Reacting a compound of formula IV wherein X$^1$ and X$^2$ together form a protective group such as benzylidene in the presence of an acid, such as TFA or HCl, in an inert organic solvent, such as DCM, followed by neutralisation with an base, such as triethylamine, optionally at temperatures below room temperature, to give a compound of formula VI.

In a still further aspect the present invention relates to a process of preparing a compound of formula XII or a pharmaceutically acceptable salt or solvate thereof comprising the steps a5-a9 where A$^1$, R$^2$ is defined as above under formula 1 and X$^9$ is selected from the substituents under formula 1 under B$^1$.

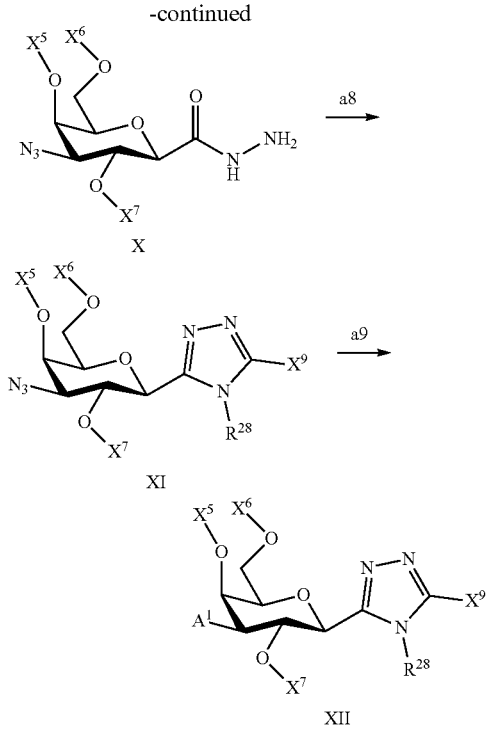

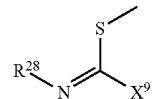

in the presence of p-toluenesulfonic acid in a solvent such as DMF to give a compound of formula XI.

a9) Reacting the compound of formula XI wherein $X^5$ and $X^6$ together form a protective group such as benzylidene and X7 is an alkyl group such as methyl or a hydrogen with a compound of formula $A^1$-CC—H or $A^1$-CC-TMS in an inert solvent, such as DMF or acetonitrile, using a base, such as diisopropylethylamine or L-ascorbic acid sodium salt, catalyzed by a cupper salt such as CuI or copper(II) sulfate, optionally using a reagent such as CsF to provide a compound of the formula XII.

In a still further aspect the present invention relates to a process of preparing a compound of formula XV or a pharmaceutically acceptable salt or solvate thereof comprising the steps a10-a12 where $A^1$ and $Het^1$ is defined as under formula 1, $X^{11}$ and $X^{12}$ together form a protective group such as benzylidene and $X^{13}$ is an alkyl group such as methyl or a hydrogen $R^{28}$ is defined as above under formula 1 and $X^{10}$ is selected from the substituents under formula 1 under $B^1$;

a5) Reacting a compound of the formula VII wherein X5-X8 is a protective group such as acetate, with a cyanide reagent such as trimethylsilyl cyanide in the presence of a reagent such as boron trifluoride diethyl etherate in an inert solvent such as nitromethane at 0° C. to give a compound of the formula VIII a6) Reacting a compound of the formula VIII wherein X5-X7 is a protective group such as acetate with acetyl chloride in methanol giving a product which is further reacted with benzaldehyde dimethylacetal in the presence of D(+)-10-camphorsulfonic acid to give a compound of formula IX, wherein $X^5$ and $X^6$ together form a protective group such as benzylidene and X7 is a hydrogen. Optionally the compound of formula IX, wherein $X^5$ and $X^6$ together form a protective group such as benzylidene and X7 is a hydrogen could be reacted further with an alkyl halide such as iodomethane in the presence of a base such as cesium carbonate in a solvent such as DMF to give a compound of formula IX wherein $X^5$ and $X^6$ together form a protective group such as benzylidene and X7 is an alkyl group such as methyl.

a7) Reacting a compound of formula IX wherein $X^5$ and $X^6$ together form a protective group such as benzylidene and X7 is an alkyl group such as methyl or a hydrogen, with hydrazine at elevated temperatures in a solvent such as ethanol to give a compound of formula X.

a8) Reacting a compound of formula X wherein $X^5$ and $X^6$ together form a protective group such as benzylidene and X7 is an alkyl group such as methyl or a hydrogen, with N,N-dimethylformamide dimethyl acetal yielding a product which is further reacted with $R^{28}$—NH2 and acetic acid to give a compound of formula XI; Optionally reacting a compound of formula X wherein $X^5$ and $X^6$ together form a protective group such as benzylidene and X7 is an alkyl group such as methyl or a hydrogen with XIII wherein

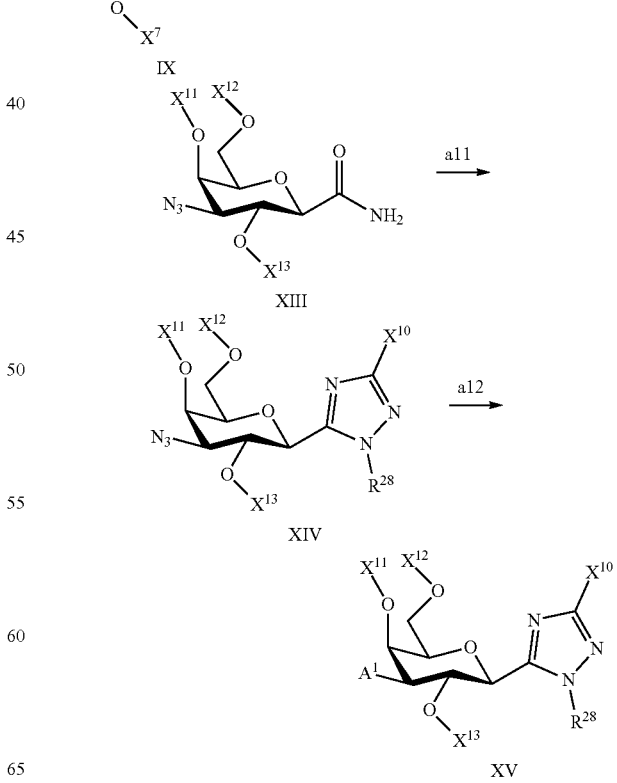

a10) Reacting a compound of formula IX wherein $X^5$ and $X^6$ together form a protective group such as benzylidene and $X^7$ is an alkyl group such as methyl or a hydrogen, with $NH_3$ in a solvent such as methanol to give a compound of formula XIII.

a11) Reacting a compound of the formula XIII with N,N-dimethylformamide dimethyl acetal in a solvent such as dioxane resulting in a product which is further reacted with acetic acid and $R_{28}$—$NHNH_2$ in a solvent such as acetonitrile at elevated temperatures to give a compound of formula XIV.

a12) Reacting a compound of formula XIV with a compound of formula $Het^1$-CC—H or $Het^1$-CC-TMS in an inert solvent, such as DMF or acetonitrile, using a base, such as diisopropylethylamine or L-ascorbic acid sodium salt, catalyzed by a cupper salt such as CuI or copper(II) sulfate, optionally using a reagent such as CsF to provide a compound of the formula XV.

In a still further aspect the present invention relates to a process of preparing a compound of formula XX or a pharmaceutically acceptable salt or solvate thereof comprising the steps a13-a17 where $A^1$ and $Het^1$ is defined as under formula 1, $X^{13}$ and $X^{14}$ together form a protective group such as benzylidene and $X^{15}$ is an alkyl group such as methyl or a hydrogen;

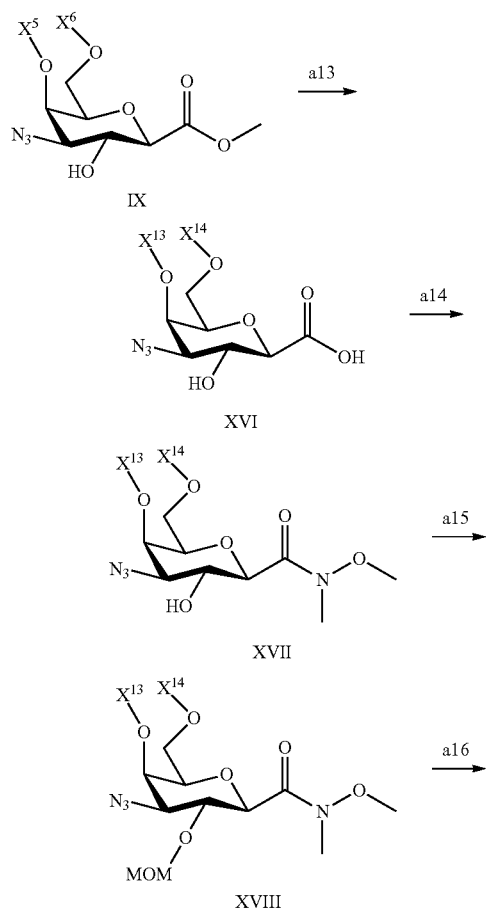

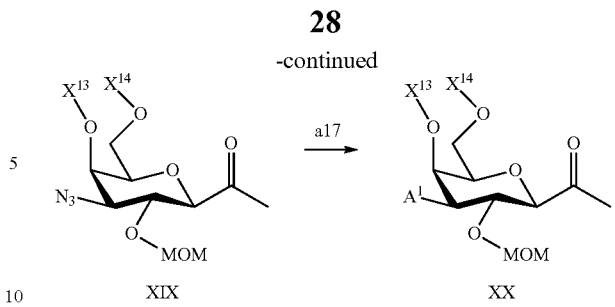

a13) Reacting a compound of formula IX wherein $X^5$ and $X^6$ together form a protective group such as benzylidene and $X^7$ is an alkyl group such as methyl or a hydrogen, with a base such as Lithium hydroxide in mixture of solvents such as water/THF to give a compound of formula XVI.

a14) Reacting a compound of formula XVI with N,O-dimethylhydroxylamine in the presence of a coupling reagent such as HATU and an organic base such as DIPEA in a solvent such as DMF to give a compound of formula XVII.

a15) Reacting a compound of formula XVII with bromo(methoxy)methane in the presence of silver(I) oxide and sodium iodide in a solvent such as DMF to give a compound of formula XVIII.

a16) Reacting a compound of formula XVIII with methylmagnesium bromide in a solvent like THF to give a compound of formula XIX.

a17) Reacting a compound of formula XIX with a compound of formula $Het^1$-CC—H or $Het^1$-CC-TMS in an inert solvent, such as DMF or acetonitrile, using a base, such as diisopropylethylamine or L-ascorbic acid sodium salt, catalyzed by a cupper salt such as CuI or copper(II) sulfate, optionally using a reagent such as CsF to provide a compound of the formula XX.

In a still further aspect the present invention relates to a process of preparing a compound of formula XIII or a pharmaceutically acceptable salt or solvate thereof comprising the steps a18-a20 where $R^{28}$ is defined as under formula 1 and $X^9$ is selected from the substituents under formula 1 under $B^1$;

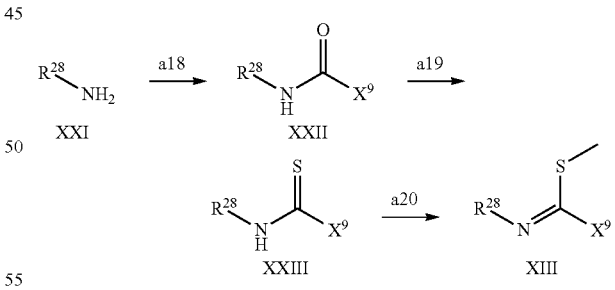

a18) Reacting a compound of formula XXI with a compound of formula an activated ester of such as an anhydride of the formula $(X^9CO)_2O$ in the presence of pyridine in a solvent such as DCM to give a compound of formula XXII.

a19) Reacting a compound of formula XXII with lawessons reagent in a solvent such as toluene to give a compound of formula XXIII.

a20) Reacting a compound of formula XXIII with iodomethane in the presence of a base such as potassium carbonate in a solvent such as acetonitrile to give a compound of formula XIII.

In a still further aspect the present invention relates to a process of preparing a compound of formula XV or a pharmaceutically acceptable salt or solvate thereof comprising the steps a21 where $R^{28}$ is defined as under formula 1;

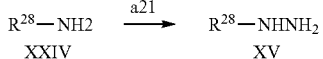

a21) reacting a compound of the formula XXIV with sodium nitrite in the presence of HCl and acetic acid in water solution to give a product that is reacted with tin(II)chloride to give a compound of formula XV.

In a still further aspect the present invention relates to a process of preparing a compound of formula $Het^1$-CC—H or $Het^1$-CC-TMS comprising the step a22 wherein $Het^1$ is defined as above under formula (1):

a22) Reacting a compound of formula $Het^1$-$L^1$ wherein $L^1$ is defined as a leaving group such as chlorine or bromine with trimethylsilane-acetylene using a palladium catalyst such as bis(triphenylphosphine)palladium-(II)-chloride, copper iodide and a base like diisopropylethylamine in an inert solvent, such as tetrahydrofuran THF, to give a compound of the formula $Het^1$-CC—H or $Het^1$-CC-TMS.

DETAILED DESCRIPTION

The present compounds of formula (1) differ from prior art compounds particularly in that the pyranose ring is β-D-galactopyranose. It is important to emphasize that alpha and beta anomers are very different isomers and it is by no means considered to be obvious to the skilled person to expect same or similar activity of both anomers. Consequently, alpha and beta anomers do not in general posses the same activity, and this is common knowledge to the skilled person. The compounds of the present invention are novel β-D-galactopyranose compounds that unexpectedly have shown very high affinity and specificity for galectin-1 and are considered novel potent drug candidates. Some of the novel β-D-galactopyranose compounds have both galectin-1 and galectin-3 affinity and, as such have a broader disease treatment profile compared to selective galectin-1 inhibitors.

In broad aspect the present invention concerns a β-D-galactopyranose compound of formula (1)

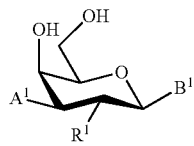

wherein
the pyranose ring is β-D-galactopyranose, and A1, B1 and R1 are as defined above; as well as a pharmaceutically acceptable salt or solvate thereof.

Preferably Het1 is selected from the group consisting of

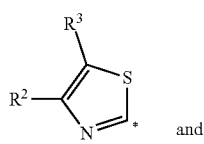

and

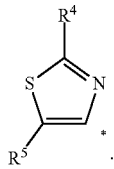

In another embodiment Het1 is

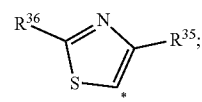

When Het1 is formula 2

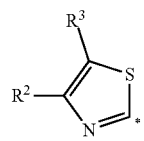

$R^2$ is selected from the group consisting of hydrogen, methyl, OH, Cl, Br and F;

$R^3$ is hydrogen.

When Het1 is formula 3

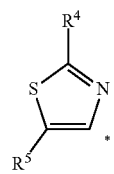

$R^4$ is selected from the group consisting of OH, Cl, Br, F and amino;

$R^5$ is hydrogen.

In another embodiment Het1 is formula 3

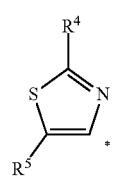

Wherein $R^4$ is selected from the group consisting of OH, Cl, $CH_3$, Br, F and amino;

$R^5$ is hydrogen.

In a further embodiment Het1 is

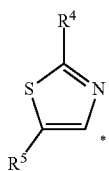

wherein $R^4$ is $CH_3$ and $R^5$ is H,

Typically, Het1 is selected from the group consisting of

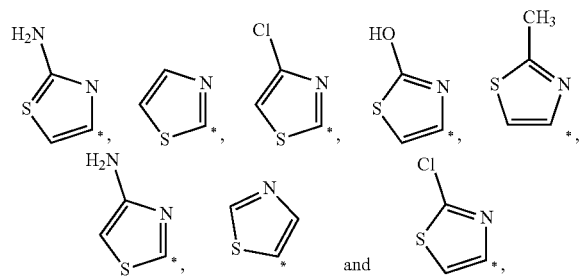

Each of these Het1 groups are individual embodiments and can be subject to a claim in combination with any one of R1 and/or B1. For instance, Het1 is

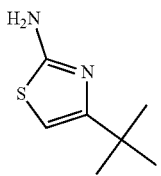

and R1 and B1 are selected from any one of the above embodiments.

Preferably $B^1$ is triazolyl; optionally substituted with one or more groups selected from a) $C_{1-6}$ alkyl optionally substituted with one or more of $C_{1-6}$ alkyl, amino, CN, halogen, hydroxy, $C_{1-6}$ alkoxy, carboxy, alkoxycarbonyl, $H_2NCO$, b) $R^{28}$—$C_{1-6}$ alkyl, c) $C_{3-6}$cycloalkyl optionally substituted with one or more of $C_{1-6}$ alkyl, amino, CN, halogen, or hydroxy, c) $C_{1-6}$ alkenyl, d) $C_{1-6}$ alkoxy, e) $C_{1-6}$ alkylthio, f) $C_{1-6}$ alkylsulfonyl, g) carbonyl substituted with any one of hydroxy, $C_{1-6}$ alkoxy, $C_{1-6}$ alkylNH, $((R^9)(R^{30})N)C_{1-6}$ alkylNH, or (pyridinyl)$C_{1-6}$ alkylNH, h) $(R^{31})(R^{32})N$, i) $C_2$-alkynyl, and j) $R^2$;
wherein $R^{28}$, $R^{29}$, $R^{30}$, $R^{31}$ and $R^{32}$ are as defined above in the first aspect.

Typically, B1 is a triazolyl substituted with a group selected from any one of a) phenyl, naphthalinyl, biphenyl, pyridinyl, pyridazinyl, pyrimidinyl, pyrazinyl, quinolinyl, isoquinolinyl, quinoxainyl, indolyl, indazolyl, benzimidazolyl, benzisoxazolyl, benzisothiazolyl, benzoxazolyl, benzothiazolyl, benzodioxolyl, dihydrobenzodioxinyl, dihydroquinolinonyl, dihydrobenzothiophene-2,2-dioxide, pyrrolyl, furanyl, thienyl, pyrazolyl, isoxazolyl, isothiazolyl, imidazolyl, oxazolyl, thiazolyl, triazolyl, oxadiazolyl, or thiadiazolyl; optionally substituted with one or more substituents selected from the group consisting of cyano, nitro, OH, $C_2$-alkynyl, halogen, $C_{1-6}$ alkyl, halo-$C_{1-6}$ alkyl, $C_{3-6}$ cycloalkyl, $C_{1-6}$ alkoxy, halo-$C_{1-6}$ alkoxy, $C_{1-6}$ alkylthio, carboxy, $C_{1-6}$ alkoxycarbonyl, $CONH_2$, and $(R^{33})(R^{34})N$; orb) ($C_{1-6}$ alkyl-$SO_2$)phenyl, ($C_{1-6}$ alkyl $SO_2$)(halo)phenyl, (amino$SO_2$)phenyl, (di-$C_{1-6}$ alkylamino$SO_2$)phenyl, (($C_{1-6}$ alkyl-$NHSO_2$)—$C_{1-6}$ alkyl)phenyl, (pyrrolyl)phenyl, (imidazolyl)phenyl, (oxazolyl)phenyl, (tetrazolyl)phenyl, ((pyridinyl)methyl)phenyl, phenoxyphenyl, (benzyloxy)phenyl, ((methyl)thiazolyl)-phenyl, (thiazolyl)-benzenesulfamido, ((methyl)thiadiazolyl)benzenesulfamido, (methyl)-benzothiazolonyl, or fluoropyrazolopyrimidinyl.

In a specific embodiment B1 is selected from pyrazolyl or triazolyl; optionally substituted with a group selected from halogen, $C_{1-6}$ alkyl, halo-$C_{1-6}$ alkyl, phenyl, benzimidazolyl, and benzothiazolyl, optionally substituted with one or more substituents selected from the group consisting of halogen, $C_{1-6}$ alkyl, halo-$C_{1-6}$ alkyl, and $C_{3-6}$ cycloalkyl.

In a more specific embodiment B1 is selected from pyrazolyl, such as 1,2-pyrazolyl, substituted with a group selected from phenyl and benzothiazolyl, optionally substituted with one or two substituents selected from the group consisting of halogen, $C_{1-6}$-alkyl, and halo-$C_{1-6}$ alkyl.

In a further specific embodiment B1 is selected from triazolyl, such as 1,2,4-triazolyl, substituted with a group selected from methyl, $CF_3$, phenyl, pyridinyl, benzimidazolyl, and benzothiazolyl, optionally substituted with one or more substituents selected from the group consisting of halogen, $C_{1-6}$ alkyl, halo-$C_{1-6}$ alkyl, and $C_{3-6}$ cycloalkyl.

In a specific embodiment B1 is a 1,2,4-triazolyl substituted with one or two of a $CF_3$, a methyl, a phenyl optionally substituted with a halogen or $C_{1-4}$ alkyl, such as one to three Br, Cl or methyl. In another specific embodiment B1 is a 1,2,4-triazolyl substituted with one or two of a methyl, a benzothiazole, e.g. a benzo[d]thiazole, optionally substituted with a $C_{1-4}$ alkyl, such as a methyl. In a further specific embodiment B1 is a 1,2,4-triazolyl substituted with one or two of a methyl, a benzimidazolyl, optionally substituted with one or more $C_{1-6}$ alkyl, such as methyl. In a further specific embodiment B1 is a 1,2,4-triazolyl substituted with one or two of a methyl, a pyridinyl, optionally substituted with one or more halogen or $C_{3-6}$ cycloalkyl, such as cyclopropyl.

Preferably, $R^1$ is selected from the group consisting of H, OH, O-methyl, O-ethyl, and O-isopropyl, typically H, OH or methoxy. In a further embodiment, $R^1$ is selected from OH or methoxy.

Typically, the compound of formula (1) is selected from any one of:
3-[4-(4-chlorothiazol-2-yl)-1H-1,2,3-triazol-1-yl]-1,3-dideoxy-1-[4-(2-methylbenzo[d]thiazol-6-yl)-4H-1,2,4-triazole-3-yl]-β-D-galactopyranoside,
1-[4-(3-chlorophenyl)-4H-1,2,4-triazole-3-yl]-1,3-dideoxy-3-[4-(2-hydroxythiazol-4-yl)-1H-1,2,3-triazol-1-yl]-β-D-galactopyranoside,
1-[4-(5-chloro-2-methylphenyl)-5-(trifluoromethyl)-4H-1,2,4-triazole-3-yl]-1,3-dideoxy-3-[4-(2-hydroxythiazol-4-yl)-1H-1,2,3-triazol-1-yl]-2-O-methyl-β-D-galactopyranoside,
1-[4-(2,5-dichlorophenyl)-4H-1,2,4-triazole-3-yl]-1,3-dideoxy-3-[4-(4-methylthiazol-2-yl)-1H-1,2,3-triazol-1-yl]-β-D-galactopyranoside,
1-[1-(2-bromo-5-chlorophenyl)-3-methyl-1H-1,2,4-triazole-5-yl]-1,3-dideoxy-3-[4-(thiazol-2-yl)-1H-1,2,3-triazol-1-yl]-β-D-galactopyranoside,
3-[4-(2-aminothiazol-4-yl)-1H-1,2,3-triazol-1-yl]-1,3-dideoxy-1-[4-(2-methylbenzo[d]thiazol-6-yl)-4H-1,2,4-triazole-3-yl]-β-D-galactopyranoside, and 1-[1-(2-bromo-5-chlorophenyl)-3-methyl-1H-1,2,4-triazole-5-yl]-1,2,3-trideoxy-3-[4-(thiazol-4-yl)-1H-1,2,3-triazol-1-yl]-β-D-galactopyranoside.

Preferably, the compound of formula (1) is selected from any one of:

6-{3-{3-[4-(4-Chlorothiazol-2-yl)-1H-1,2,3-triazol-1-yl]-3-deoxy-β-D-galactopyranosyl}-4H-1,2,4-triazol-4-yl}-2-methylbenzothiazole, 3-Chloro-1-{3-{3-deoxy-3-[4-(2-hydroxythiazol-4-yl)-1H-1,2,3-triazol-1-yl]-β-D-galactopyranosyl}-4H-1,2,4-triazol-4-yl}benzene, 5-Chloro-1-{3-{3-deoxy-3-[4-(2-hydroxythiazol-4-yl)-1H-1,2,3-triazol-1-yl]-2-O-methyl-β-D-galactopyranosyl}-5-trifluoromethyl-4H-1,2,4-triazol-4-yl}-2-methylbenzene, 2,5-Dichloro-1-{3-{3-deoxy-3-[4-(4-methylthiazol-2-yl)-1H-1,2,3-triazol-1-yl]-β-D-galactopyranosyl}-4H-1,2,4-triazol-4-yl}benzene, 2-Bromo-5-chloro-1-{3-{3-Deoxy-3-[4-(2-thiazolyl)-1H-1,2,3-triazol-1-yl]-β-D-galactopyranosyl}-5-methyl-1H-1,2,4-triazol-4-yl}benzene, 6-{3-{3-[4-(2-Aminothiazol-4-yl)-1H-1,2,3-triazol-1-yl]-3-deoxy-β-D-galactopyranosyl}-4H-1,2,4-triazol-4-yl}-2-methylbenzothiazole, 2-Bromo-5-chloro-1-{3-{3-Deoxy-3-[4-(4-thiazolyl)-1H-1,2,3-triazol-1-yl]-β-D-galactopyranosyl}-5-methyl-1H-1,2,4-triazol-4-yl}benzene, 6-{3-{3-Deoxy-3-[4-(2-hydroxythiazol-4-yl)-1H-1,2,3-triazol-1-yl]-β-D-galactopyranosyl}-4H-1,2,4-triazol-4-yl}-2-methylbenzothiazole, 1-{3-{3-[4-(4-Chlorothiazol-2-yl)-1H-1,2,3-triazol-1-yl]-3-deoxy-β-D-galactopyranosyl}-5-methyl-4H-1,2,4-triazol-4-yl}-5-chloro-2-(trifluoromethyl)benzene, 6-{5-{3-Deoxy-3-[4-(2-thiazolyl)-1H-1,2,3-triazol-1-yl]-β-D-galactopyranosyl}-3-methyl-1H-1,2,4-triazol-1-yl}-2-methylbenzothiazole, 5-Chloro-1-{3-{3-deoxy-3-[4-(4-methylthiazol-2-yl)-1H-1,2,3-triazol-1-yl]-β-D-galactopyranosyl}-5-methyl-4H-1,2,4-triazol-4-yl}-2-(trifluoromethyl)benzene, 5-Chloro-1-{3-{3-deoxy-3-[4-(2-hydroxythiazol-4-yl)-1H-1,2,3-triazol-1-yl]β-D-galactopyranosyl}-5-methyl-4H-1,2,4-triazol-4-yl}-2-(trifluoromethyl)benzene, 6-{5-{3-Deoxy-3-[4-(2-methylthiazol-4-yl)-1H-1,2,3-triazol-1-yl]-β-D-galactopyranosyl}-3-methyl-1H-1,2,4-triazol-1-yl}-2-methylbenzothiazole, 6-{5-{3-Deoxy-3-[4-(5-thiazolyl)-1H-1,2,3-triazol-1-yl]-β-D-galactopyranosyl}-3-methyl-1H-1,2,4-triazol-1-yl}-2-methylbenzothiazole, 1-{3-{3-[4-(2-Aminothiazol-4-yl)-1H-1,2,3-triazol-1-yl]-3-deoxy-β-D-galactopyranosyl}-5-methyl-1H-1,2,4-triazol-4-yl}-5-chloro-2-(trifluoromethyl)benzene, 1-{3-{3-[4-(4-Chlorothiazol-2-yl)-1H-1,2,3-triazol-1-yl]-3-deoxy-β-D-galactopyranosyl}-5-methyl-1H-1,2,4-triazol-4-yl}-5-chloro-2-(trifluoromethyl)benzene, 1-{3-{3-[4-(4-Chlorothiazol-2-yl)-1H-1,2,3-triazol-1-yl]-3-deoxy-2-O-methyl-β-D-galactopyranosyl}-5-methyl-4H-1,2,4-triazol-4-yl}-5-chloro-2-(trifluoromethyl)benzene, 3-{5-{3-[4-(4-Chlorothiazol-2-yl)-1H-1,2,3-triazol-1-yl]-3-deoxy-β-D-galactopyranosyl}-3-methyl-1H-1,2,4-triazol-1-yl}-5-chloro-2-cyclopropylpyridine, 1-{3-{3-[4-(2-Aminothiazol-4-yl)-1H-1,2,3-triazol-1-yl]-3-deoxy-β-D-galactopyranosyl}-5-methyl-4H-1,2,4-triazol-4-yl}-5-chloro-2-(trifluoromethyl)benzene, 5-Chloro-1-{3-{3-deoxy-3-[4-(2-thiazolyl)-1H-1,2,3-triazol-1-yl]-β-D-galactopyranosyl}-5-methyl-4H-1,2,4-triazol-4-yl}-2-(trifluoromethyl)benzene, 6-{3-{3-Deoxy-3-[4-(2-thiazolyl)-1H-1,2,3-triazol-1-yl]-β-D-galactopyranosyl}-4H-1,2,4-triazol-4-yl}-2-methylbenzothiazole, 6-{3-{3-Deoxy-3-[4-(4-methylthiazol-2-yl)-1H-1,2,3-triazol-1-yl]-β-D-galactopyranosyl}-4H-1,2,4-triazol-4-yl}-2-methylbenzothiazole, 6-{5-{3-[4-(4-Chlorothiazol-2-yl)-1H-1,2,3-triazol-1-yl]-3-deoxy-β-D-galactopyranosyl}-3-methyl-1H-1,2,4-triazol-1-yl}-2-methylbenzothiazole, 6-{5-{3-[4-(2-Aminothiazol-4-yl)-1H-1,2,3-triazol-1-yl]-3-deoxy-β-D-galactopyranosyl}-3-methyl-1H-1,2,4-triazol-1-yl}-2-methylbenzothiazole, 6-{3-{3-[4-(4-Chlorothiazol-2-yl)-1H-1,2,3-triazol-1-yl]-3-deoxy-2-O-methyl-β-D-galactopyranosyl}-5-methyl-4H-1,2,4-triazol-4-yl}-2-methylbenzothiazole, 6-{3-{3-[4-(4-Chlorothiazol-2-yl)-1H-1,2,3-triazol-1-yl]-3-deoxy-β-D-galactopyranosyl}-5-methyl-4H-1,2,4-triazol-4-yl}-2-methylbenzothiazole, 5-{3-{3-[4-(4-Chlorothiazol-2-yl)-1H-1,2,3-triazol-1-yl]-3-deoxy-β-D-galactopyranosyl}-5-methyl-4H-1,2,4-triazol-4-yl}-N-3-methylbenzimidazole, 1-{5-{3-[4-(4-Chlorothiazol-2-yl)-1H-1,2,3-triazol-1-yl]-3-deoxy-β-D-galactopyranosyl}-1H-1,2-pyrazol-1-yl}-5-chloro-2-(trifluoromethyl)benzene, and 6-{3-{3-[4-(4-Chlorothiazol-2-yl)-1H-1,2,3-triazol-1-yl]-3-deoxy-β-D-galactopyranosyl}-1H-1,2-pyrazol-1-yl}-2-methylbenzothiazole.

The skilled person will understand that it may be necessary to adjust or change the order of steps in the processes a1-a22, and such change of order is encompassed by the aspects of the process as described above in the reaction schemes and accompanying description of the process steps.

Furthermore, the skilled person will understand that the processes described above and hereinafter the functional groups of intermediate compounds may need to be protected by protecting groups.

Functional groups that it is desirable to protect include hydroxy, amino and carboxylic acid. Suitable protecting groups for hydroxy include optionally substituted and/or unsaturated alkyl groups (e.g. methyl, allyl, benzyl or tert-butyl), trialkyl silyl or diarylalkylsilyl groups (e.g. t-butyldimethylsilyl, t-butyldipheylsilyl or trimethylsilyl), AcO(acetoxy), TBS(t-butyldimethylsilyl), TMS(trimethylsilyl), PMB (p-methoxybensyl), and tetrahydropyranyl. Suitable protecting groups for carboxylic acid include ($C_{1-6}$)-alkyl or benzyl esters. Suitable protecting groups for amino include t-butyloxycarbonyl, benzyloxycarbonyl, 2-(trimethylsilyl)-ethoxy-methyl or 2-trimethylsilylethoxycarbonyl (Teoc). Suitable protecting groups for S include S—C(=N)NH$_2$, TIPS.

The protection and deprotection of functional groups may take place before or after any reaction in the above-mentioned processes.

Furthermore the skilled person will appreciate, that, in order to obtain compounds of the invention in an alternative, and on some occasions more convenient manner, the individual process steps mentioned hereinbefore may be performed in different order, and/or the individual reactions may be performed at a different stage in the overall route (i.e. substituents may be added to and/or chemical transformations performed upon, different intermediates to those mentioned hereinbefore in conjunction with a particular reaction). This may negate, or render necessary, the need for protecting groups.

In a still further embodiment the compound (1) is on free form. "On free form" as used herein means a compound of formula (1), either an acid form or base form, or as a neutral compound, depending on the substitutents. The free form does not have any acid salt or base salt in addition. In one embodiment the free form is an anhydrate. In another embodiment the free form is a solvate, such as a hydrate.

In a further embodiment the compound of formula (1) is a crystalline form. The skilled person may carry out tests in order to find polymorphs, and such polymorphs are intended to be encompassed by the term "crystalline form" as used herein.

When the compounds and pharmaceutical compositions herein disclosed are used for the above treatment, a therapeutically effective amount of at least one compound is administered to a mammal in need of said treatment.

The term "$C_{1-x}$ alkyl" as used herein means an alkyl group containing 1-x carbon atoms, e.g. $C_{1-5}$ or $C_{1-6}$, such as methyl, ethyl, propyl, butyl, pentyl or hexyl.

The term "branched $C_{3-6}$ alkyl" as used herein means a branched alkyl group containing 3-6 carbon atoms, such as isopropyl, isobutyl, tert-butyl, isopentyl, 3-methylbutyl, 2,2-dimethylpropyl, n-hexyl, 2-methylpentyl, 2,2-dimethylbutyl, 2,3-dimethylbutyl.

The term "$C_{3-x}$ cycloalkyl" as used herein means a cyclic alkyl group containing 3-x carbon atoms, e.g. $C_{3-6}$ or $C_{3-7}$, such as cyclopropyl, cyclobutyl, cyclopentyl, cyclohexyl, cycloheptyl, and 1-methylcyclopropyl.

The term "$C_{5-7}$ cycloalkyl" as used herein means a cyclic alkyl group containing 5-7 carbon atoms, such as cyclopentyl, cyclohexyl, or cycloheptyl.

The term "Oxo" as used herein means an oxygen atom with double bonds, also indicated as =O.

The term "CN" as used herein means a nitril.

The term "halogen" as used herein means Cl, F, Br or I.

The term "halo-$C_{1-6}$ alkyl" as used herein means one or more halogens linked to a $C_{1-6}$ alkyl, such as $CF_3$, CH(Cl)$CHF_2$.

The term "$C_{1-6}$ alkoxy" as used herein means an oxygen linked to a $C_{1-6}$ alkyl, such as methoxy or ethoxy.

The term "$C_{1-6}$ alkylthio" as used herein means a sulphur linked to a $C_{1-6}$ alkyl, such as thiomethoxy or thioethoxy.

The term "halo-$C_{1-6}$ alkoxy" as used herein means one or more halogens linked to a $C_{1-6}$ alkoxy, such as $CH(F_2)CH(Br)O$—.

The term "$C_{1-6}$ alkoxycarbonyl" as used herein means a $C_{1-6}$ alkoxy linked to a carbonyl, such as methoxycarbonyl ($CH_2OC(=O)$).

The term "a five or six membered heteroaromatic ring" as used herein means one five membered heteroaromatic ring or one six membered heteroaromatic ring. The five membered heteroaromatic ring contains 5 ring atoms of which one to four are heteroatoms selected from N, O, and S. The six membered heteroaromatic ring contains 6 ring atoms of which one to five are heteroatoms selected from N, O and S. Examples include thiophene, furan, pyran, pyrrole, imidazole, pyrazole, isothiazole, isooxazole, pyridine, pyrazine, pyrimidine and pyridazine. When such heteroaromatic rings are substituents they are termed thiophenyl, furanyl, pyranyl, pyrrolyl, imidazolyl, pyrazolyl, isothiazolyl, isooxazolyl, pyridinyl, pyrazinyl, pyrimidinyl and pyridazinyl. Also included are oxazoyl, thiazoyl, thiadiazoly, oxadiazolyl, and pyridonyl.

The term "a heterocycle, such as heteroaryl or heterocycloalkyl" as used herein means a heterocycle consisting of one or more 3-7 membered ring systems containing one or more heteroatoms and wherein such ring systems may optionally be aromatic. The term "a heteroaryl" as used herein means a mono or bicyclic aromatic ringsystem containing one or more heteroatoms, such as 1-10, e.g. 1-6, selected from O, S, and N, including but not limited to oxazolyl, oxadiazolyl, thiophenyl, thiadiazolyl, thiazolyl, pyridyl, pyrimidinyl, pyridonyl, pyrimidonyl, quinolinyl, azaquionolyl, isoquinolinyl, azaisoquinolyl, quinazolinyl, azaquinazolinyl, bensozazoyl, azabensoxazoyl, bensothiazoyl, or azabensothiazoyl. The term "a heterocycloalkyl" as used herein means a mono or bicyclic 3-7 membered alifatic heterocycle containing one or more heteroatoms, such as 1-7, e.g. 1-5, selected from O, S, and N, including but not limited to piperidinyl, tetrahydropyranyl, tetrahydrothipyranyl, or piperidonyl.

The term "treatment" and "treating" as used herein means the management and care of a patient for the purpose of combating a condition, such as a disease or a disorder. The term is intended to include the full spectrum of treatments for a given condition from which the patient is suffering, such as administration of the active compound to alleviate the symptoms or complications, to delay the progression of the disease, disorder or condition, to alleviate or relief the symptoms and complications, and/or to cure or eliminate the disease, disorder or condition as well as to prevent the condition, wherein prevention is to be understood as the management and care of a patient for the purpose of combating the disease, condition, or disorder and includes the administration of the active compounds to prevent the onset of the symptoms or complications. The treatment may either be performed in an acute or in a chronic way. The patient to be treated is preferably a mammal; in particular, a human being, but it may also include animals, such as dogs, cats, cows, sheep and pigs.

The term "a therapeutically effective amount" of a compound of formula (1) of the present invention as used herein means an amount sufficient to cure, alleviate or partially arrest the clinical manifestations of a given disease and its complications. An amount adequate to accomplish this is defined as "therapeutically effective amount". Effective amounts for each purpose will depend on the severity of the disease or injury as well as the weight and general state of the subject. It will be understood that determining an appropriate dosage may be achieved using routine experimentation, by constructing a matrix of values and testing different points in the matrix, which is all within the ordinary skills of a trained physician or veterinary.

In a still further aspect, the present invention relates to a pharmaceutical composition comprising the compound of formula (1) and optionally a pharmaceutically acceptable additive, such as a carrier or an excipient.

As used herein "pharmaceutically acceptable additive" is intended without limitation to include carriers, excipients, diluents, adjuvant, colorings, aroma, preservatives etc. that the skilled person would consider using when formulating a compound of the present invention in order to make a pharmaceutical composition.

The adjuvants, diluents, excipients and/or carriers that may be used in the composition of the invention must be pharmaceutically acceptable in the sense of being compatible with the compound of formula (1) and the other ingredients of the pharmaceutical composition, and not deleterious to the recipient thereof. It is preferred that the compositions shall not contain any material that may cause an adverse reaction, such as an allergic reaction. The adjuvants, diluents, excipients and carriers that may be used in the pharmaceutical composition of the invention are well known to a person skilled within the art.

As mentioned above, the compositions and particularly pharmaceutical compositions as herein disclosed may, in addition to the compounds herein disclosed, further comprise at least one pharmaceutically acceptable adjuvant, diluent, excipient and/or carrier. In some embodiments, the pharmaceutical compositions comprise from 1 to 99% by weight of said at least one pharmaceutically acceptable adjuvant, diluent, excipient and/or carrier and from 1 to 99% by weight of a compound as herein disclosed. The combined amount of the active ingredient and of the pharmaceutically acceptable adjuvant, diluent, excipient and/or carrier may not constitute more than 100% by weight of the composition, particularly the pharmaceutical composition.

In some embodiments, only one compound as herein disclosed is used for the purposes discussed above.

In some embodiments, two or more of the compounds as herein disclosed are used in combination for the purposes discussed above.

The composition, particularly pharmaceutical composition comprising a compound set forth herein may be adapted for oral, intravenous, topical, intraperitoneal, nasal, buccal, sublingual, or subcutaneous administration, or for administration via the respiratory tract in the form of, for example, an aerosol or an air-suspended fine powder. Therefore, the pharmaceutical composition may be in the form of, for example, tablets, capsules, powders, nanoparticles, crystals, amorphous substances, solutions, transdermal patches or suppositories.

Further embodiments of the process are described in the experimental section herein, and each individual process as well as each starting material constitutes embodiments that may form part of embodiments.

The above embodiments should be seen as referring to any one of the aspects (such as 'method for treatment', 'pharmaceutical composition', 'compound for use as a medicament', or 'compound for use in a method') described herein as well as any one of the embodiments described herein unless it is specified that an embodiment relates to a certain aspect or aspects of the present invention.

All references, including publications, patent applications and patents, cited herein are hereby incorporated by reference to the same extent as if each reference was individually and specifically indicated to be incorporated by reference and was set forth in its entirety herein.

All headings and sub-headings are used herein for convenience only and should not be construed as limiting the invention in any way.

Any combination of the above-described elements in all possible variations thereof is encompassed by the invention unless otherwise indicated herein or otherwise clearly contradicted by context.

The terms "a" and "an" and "the" and similar referents as used in the context of describing the invention are to be construed to cover both the singular and the plural, unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. Unless otherwise stated, all exact values provided herein are representative of corresponding approximate values (e.g., all exact exemplary values provided with respect to a particular factor or measurement can be considered to also pro-vide a corresponding approximate measurement, modified by "about," where appropriate).

All methods described herein can be performed in any suitable order unless otherwise indicated herein or otherwise clearly contradicted by context.

The use of any and all examples, or exemplary language (e.g., "such as") provided herein, is intended merely to better illuminate the invention and does not pose a limitation on the scope of the invention unless otherwise indicated. No language in the specification should be construed as indicating any element is essential to the practice of the invention unless as much is explicitly stated.

The citation and incorporation of patent documents herein is done for convenience only and does not reflect any view of the validity, patentability and/or enforceability of such patent documents.

The term "and/or" as used herein is intended to mean both alternatives as well as each of the alternatives individually. For instance, the expression "xxx and/or yyy" means "xxx and yyy"; "xxx"; or "yyy", all three alternatives are subject to individual embodiments.

The description herein of any aspect or embodiment of the invention using terms such as "comprising", "having", "including" or "containing" with reference to an element or elements is intended to provide support for a similar aspect or embodiment of the invention that "consists of", "consists essentially of", or "substantially comprises" that particular element or elements, unless otherwise stated or clearly contradicted by context (e.g., a composition described herein as comprising a particular element should be understood as also describing a composition consisting of that element, unless otherwise stated or clearly contradicted by context). This invention includes all modifications and equivalents of the subject matter recited in the aspects or claims presented herein to the maximum extent permitted by applicable law.

The present invention is further illustrated by the following examples that, however, are not to be construed as limiting the scope of protection. The features disclosed in the foregoing description and in the following examples may, both separately and in any combination thereof, be material for realizing the invention indiverse forms thereof.

Experimental Procedures (Evaluation of Kd Values)

The affinity of Example 1-29 for galectins were determined by a fluorescence anisotropy assay where the compound was used as an inhibitor of the interaction between galectin and a fluorescein tagged saccharide probe as described Sörme, P., Kahl-Knutsson, B., Huflejt, M., Nilsson, U. J., and Leffler H. (2004) Fluorescence polarization as an analytical tool to evaluate galectin-ligand interactions. Anal. Biochem. 334: 36-47, (Sörme et al., 2004) and Monovalent interactions of Galectin-1 By Salomonsson, Emma; Larumbe, Amaia; Tejler, Johan; Tullberg, Erik; Rydberg, Hanna; Sundin, Anders; Khabut, Areej; Frejd, Torbjorn; Lobsanov, Yuri D.; Rini, James M.; et al, From Biochemistry (2010), 49(44), 9518-9532, (Salomonsson et al., 2010).

| Example | Name | Structure | Gal-1 Kd (μM) | Gal-3 Kd (μM) |
|---|---|---|---|---|
| 1 | 6-{3-{3-[4-(4-Chlorothiazol-2-yl)-1H-1,2,3-triazol-1-yl]-3-deoxy-β-D-galactopyranosyl}-4H-1,2,4-triazol-4-yl}-2-methylbenzothiazole | | 0.75 | 0.15 |
| 2 | 3-Chloro-1-{3-{3-deoxy-3-[4-(2-hydroxythiazol-4-yl]-1H-1,2,3-triazol-1-yl]-β-D-galactopyranosyl}-4H-1,2,4-triazol-4-yl}benzene | | | |
| 3 | 5-Chloro-1-{3-{3-deoxy-3-[4-(2-hydroxythiazol-4-yl-1H-1,2,3-triazol-1-yl]-2-O-methyl-β-D-galactopyranosyl}-5-trifluoromethyl-4H-1,2,4-triazol-4-yl}-2-methylbenzene | | | |
| 4 | 2,5-Dichloro-1-{3-{3-deoxy-3-[4-(4-methylthiazol-2-yl)-1H-1,2,3-triazol-1-yl]-β-D-galactopyranosyl}-4H-1,2,4-triazol-4-yl}benzene | | | |

-continued

| Example | Name | Structure | Gal-1 Kd (μM) | Gal-3 Kd (μM) |
|---|---|---|---|---|
| 5 | 2-Bromo-5-chloro-1-{3-{3-Deoxy-3-[4-(2-thiazolyl)-1H-1,2,3-triazol-1-yl]-β-D-galactopyranosyl}-5-methyl-1H-1,2,4-triazol-4-yl}benzene | | | |
| 6 | 6-{3-{3-[4-(2-Aminothiazol-4-yl)-1H-1,2,3-triazol-1-yl]-3-deoxy-β-D-galactopyranosyl}-4H-1,2,4-triazol-4-yl}-2-methylbenzothiazole | | 1.6 | 1.9 |
| 7 | 2-Bromo-5-chloro-1-{3-{3-Deoxy-3-[4-(4-thiazolyl)-1H-1,2,3-triazol-1-yl]-β-D-galactopyranosyl}-5-methyl-1H-1,2,4-triazol-4-yl}benzene | | | |
| 8 | 6-{3-{3-Deoxy-3-[4-(2-hydroxythiazol-4-yl)-1H-1,2,3-triazol-1-yl]-β-D-galactopyranosyl}-4H-1,2,4-triazol-4-yl}-2-methylbenzothiazole | | 0.32 | 1.9 |

-continued

| Example | Name | Structure | Gal-1 Kd (μM) | Gal-3 Kd (μM) |
|---|---|---|---|---|
| 9 | 1-{3-{3-[4-(4-Chlorothiazol-2-yl)-1H-1,2,3-triazol-1-yl]-3-deoxy-β-D-galactopyranosyl}-5-methyl-4H-1,2,4-triazol-4-yl}-5-chloro-2-(trifluoromethyl)benzene | | 0.29 | 0.041 |
| 10 | 6-{5-{3-Deoxy-3-[4-(2-thiazolyl)-1H-1,2,3-triazol-1-yl]-β-D-galactopyranosyl}-3-methyl-1H-1,2,4-triazol-1-yl}-2-methylbenzothiazole | | 5.2 | 2.3 |
| 11 | 5-Chloro-1-{3-{3-deoxy-3-[4-(4-methylthiazol-2-yl)-1H-1,2,3-triazol-1-yl]-β-D-galactopyranosyl}-5-methyl-4H-1,2,4-triazol-4-yl}-2-(trifluoromethyl)benzene | | 2.1 | 0.7 |
| 12 | 5-Chloro-1-{3-{3-deoxy-3-[4-2-hydroxythiazol-4-yl)-1H-1,2,3-triazol-1-yl]-β-D-galactopyranosyl}-5-methyl-4H-1,2,4-triazol-4-yl}-2-(trifluoromethyl)benzene | | 0.19 | 0.52 |

-continued

| Example | Name | Structure | Gal-1 Kd (μM) | Gal-3 Kd (μM) |
|---------|------|-----------|---------------|---------------|
| 13 | 6-{5-{3-Deoxy-3-[4-(2-methylthiazol-4-yl)-1H-1,2,3-triazol-1-yl]-β-D-galactopyranosyl}-3-methyl-1H-1,2,4-triazol-1-yl}-2-methylbenzothiazole | | 9 | 1.8 |
| 14 | 6-{5-{3-Deoxy-3-[4-(5-thiazolyl)-1H-1,2,3-triazol-1-yl]-β-D-galactopyranosyl}-3-methyl-1H-1,2,4-triazol-1-yl}-2-methylbenzothiazole | | 19.5 | 2.3 |
| 15 | 1-{3-{3-[4-(2-Aminothiazol-4-yl)-1H-1,2,3-triazol-1-yl]-3-deoxy-β-D-galactopyranosyl}-5-methyl-1H-1,2,4-triazol-4-yl}-5-chloro-2-(trifluoromethyl)benzene | | 1.5 | 1.3 |

-continued

| Example | Name | Structure | Gal-1 Kd (μM) | Gal-3 Kd (μM) |
|---|---|---|---|---|
| 16 | 1-{3-{3-[4-(4-Chlorothiazol-2-yl)-1H-1,2,3-triazol-1-yl]-3-deoxy-β-D-galactopyranosyl}-5-methyl-1H-1,2,4-triazol-4-yl}-5-chloro-2-(trifluoromethyl)benzene | | 0.9 | 0.039 |
| 17 | 1-{3-{3-[4-(4-Chlorothiazol-2-yl)-1H-1,2,3-triazol-1-yl]-3-deoxy-2-O-methyl-β-D-galactopyranosyl}-5-methyl-4H-1,2,4-triazol-4-yl}-5-chloro-2-(trifluoromethyl)benzene | | 0.52 | 0.026 |
| 18 | 3-{5-{3-[4-(4-Chlorothiazol-2-yl)-1H-1,2,3-triazol-1-yl]-3-deoxy-β-D-galactopyranosyl}-3-methyl-1H-1,2,4-triazol-1-yl}-5-chloro-2-cyclopropylpyridine | | 0.66 | 0.13 |
| 19 | 1-{3-{3-[4-(2-Aminothiazol-4-yl)-1H-1,2,3-triazol-1-yl]-3-deoxy-β-D-galactopyranosyl}-5-methyl-4H-1,2,4-triazol-4-yl}-5-chloro-2-(trifluoromethyl)benzene | | 0.73 | 0.82 |

-continued

| Example | Name | Structure | Gal-1 Kd (μM) | Gal-3 Kd (μM) |
|---|---|---|---|---|
| 20 | 5-Chloro-1-{3-{3-deoxy-3-[4-(2-thiazolyl)-1H-1,2,3-triazol-1-yl]-β-D-galactopyranosyl}-5-methyl-4H-1,2,4-triazol-4-yl}-2-(trifluoromethyl)benzene | | 0.69 | 0.15 |
| 21 | 6-{3-{3-Deoxy-3-[4-(2-thiazolyl)-1H-1,2,3-triazol-1-yl]-β-D-galactopyranosyl}-4H-1,2,4-triazol-4-yl}-2-methylbenzothiazole | | 3 | 1.2 |
| 22 | 6-{3-{3-Deoxy-3-[4-(4-methylthiazol-2-yl)-1H-1,2,3-triazol-1-yl]-β-D-galactopyranosyl}-4H-1,2,4-triazol-4-yl}-2-methylbenzothiazole | | 2.4 | 1.8 |

-continued

| Example | Name | Structure | Gal-1 Kd (μM) | Gal-3 Kd (μM) |
|---|---|---|---|---|
| 23 | 6-{5-{3-[4-(4-Chlorothiazol-2-yl)-1H-1,2,3-triazol-1-yl]-3-deoxy-β-D-galactopyranosyl}-3-methyl-1H-1,2,4-triazol-1-yl}-2-methylbenzothiazole | | 2.1 | 0.14 |
| 24 | 6-{5-{3-[4-(2-Aminothiazol-4-yl)-1H-1,2,3-triazol-1-yl]-3-deoxy-β-D-galactopyranosyl}-3-methyl-1H-1,2,4-triazol-1-yl}-2-methylbenzothiazole | | 3.2 | 2.6 |
| 25 | 6-{3-{3-[4-(4-Chlorothiazol-2-yl)-1H-1,2,3-triazol-1-yl]-3-deoxy-2-O-methyl-β-D-galactopyranosyl}-5-methyl-4H-1,2,4-triazol-4-yl}-2-methylbenzothiazole | | 0.34 | 0.070 |

-continued

| Example | Name | Structure | Gal-1 Kd (μM) | Gal-3 Kd (μM) |
|---|---|---|---|---|
| 26 | 6-{3-{3-[4-(4-Chlorothiazol-2-yl)-1H-1,2,3-triazol-1-yl]-3-deoxy-β-D-galactopyranosyl}-5-methyl-4H-1,2,4-triazol-4-yl}-2-methylbenzothiazole | | 0.59 | 0.065 |
| 27 | 5-{3-{3-[4-(4-Chlorothiazol-2-yl)-1H-1,2,3-triazol-1-yl]-3-deoxy-β-D-galactopyranosyl}-5-methyl-4H-1,2,4-triazol-4-yl}-N-3-methylbenzimidazole | | 2.6 | 0.036 |
| 28 | 1-{5-{3-[4-(4-Chlorothiazol-2-yl)-1H-1,2,3-triazol-1-yl]-3-deoxy-β-D-galactopyranosyl}-1H-1,2-pyrazol-1-yl}-5-chloro-2-(trifluoromethyl)benzene | | 0.048 | 0.43 |

| Example | Name | Structure | Gal-1 Kd (μM) | Gal-3 Kd (μM) |
|---|---|---|---|---|
| 29 | 6-{3-{3-[4-(4-Chlorothiazol-2-yl)-1H-1,2,3-triazol-1-yl]-3-deoxy-β-D-galactopyranosyl}-1H-1,2-pyrazol-1-yl}-2-methylbenzothiazole | | 0.033 | 0.6 |

Synthesis of Examples and Intermediates

General Experimental

Nuclear Magnetic Resonance (NMR) spectra were recorded on a 400 MHz Bruker AVANCE U11500 instrument or a Varian instrument at 400 MHz, at 25 TC. Chemical shifts are reported in ppm (d) using the residual solvent as internal standard. Peak multiplicities are expressed as follow: s, singlet; d, doublet; dd, doublet of doublets; t, triplet; dt, doublet of triplet; q, quartet; m, multiplet; br s, broad singlet. LC-MS were acquired on an Agilent 1200 HPLC coupled with an Agilent MSD mass spectrometer operating in ES (+) ionization mode. Column: XBridge C18 (4.6×50 mm, 3.5 μm) or SunFire C18 (4.6×50 mm, 3.5 μm). Solvent A water+0.1% TFA and solvent B Acetonitrile+0.1% TFA or solvent A water (10 mM Ammonium hydrogen carbonate) and solvent B Acetonitrile. Wavelength: 254 nM. Alternatively, LC-MS were acquired on an Agilent 1100 HPLC coupled with an Agilent MSD mass spectrometer operating in ES (+) ionization mode. Column: Waters symmetry 2.1×30 mm $C_{18}$ or Chromolith RP-18 2×50 mm. Solvent A water+0.1% TFA and solvent B Acetonitrile+0.1% TFA. Wavelength 254 nm.

Preparative HPLC was performed on a Gilson 215. Flow: 25 mL/min Column: XBrige prep C18 10 μm OBD (19×250 mm) column. Wavelength: 254 nM. Solvent A water (10 mM Ammonium hydrogen carbonate) and solvent B Acetonitrile. Alternatively, preparative HPLC were acquired on a Gilson system. Flow: 15 ml/min Column: kromasil 100-5-C18 column. Wavelength: 220 nm. Solvent A water+0.1% TFA and solvent B Acetonitrile+0.1% TFA.

The following abbreviations are used aq: aqueous
Calcd: Calculated
MeCN: Acetonitrile
CuI: Copper Iodide
DCM: Dichloromethane
DIPEA: Diisopropylethylamine
DMF: N,N-dimethylformamide
ESI-MS: Electrospray ionization mass spectrometry
EtOAc or EA: Ethylacetate
$Et_3N$: Triethylamine
h: hour(s)
HATU: 1-[Bis(dimethylamino)methylene]-1H-1,2,3-triazolo[4,5-b]pyridinium 3-oxid hexafluorophosphate
HPLC: High performance liquid chromatography
LC: Liquid Chromatography
MeCN: Acetonitrile
mL: milliliter
MeOH: Methanol
MeOD: Deuterated methanol
mm: millimeter
mM: millimolar
MS: Mass spectroscopy
nm: nanometer
NaOMe: Sodium methoxide
$N_2$: Nitrogen gas
NMR: Nuclear magnetic resonance
PE: petroleum ether
pH: acidity
Prep: Preparative
rt: Room temperature
TFA: trifluoroacetic acid
THF: Tetrahydrofuran
TMS: Trimethylsilyl
UV: Ultraviolet
Å: Ångstrom When naming examples and intermediates with aryl groups connected directly to C1 of the galactose unit the following methodology has been used. The highest priority has been given to the aryl furthest away from the galactose C1, regardless of IUPAC rules.

Example 1

6-{3-{3-[4-(4-Chlorothiazo-2-yl)-1H-1,2,3-triazol-1-yl]-3-deoxy-β-D-galactopyranosyl}-4H-1,2,4-triazol-4-yl}-2-methylbenzothiazole

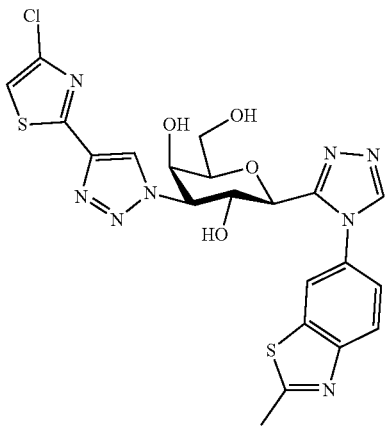

A solution of 6-{3-{4,6-O-benzylidene-3-[4-(4-chlorothiazol-2-yl)-1H-1,2,3-triazol-1-yl]-3-deoxy-β-D-galactopyranosyl}-4H-1,2,4-triazol-4-yl}-2-methylbenzothiazole (93.0 mg, 0.15 mmol) in DCM/TFA (4 mL, 19:1) was stirred overnight at rt. Et$_3$N was added to neutralize the TFA. The mixture was evaporated and purified by prep HPLC (MeCN/H$_2$O (10 mmol/L NH$_4$HCO$_3$), X-Select 10 μm 19*250 mm, 20 mL/min, UV 254) to give the title compound (24.7 mg, 31%). ESI-MS m/z calcd for [C$_{21}$H$_{19}$ClN$_8$O$_4$S$_2$] [M+H]$^+$: 547.1; found: 547.0. $^1$H NMR (400 MHz, DMSO-d$_6$) δ 8.95 (s, 1H), 8.55 (s, 1H), 8.44 (s, 1H), 8.10 (d, J=8.8 Hz, 1H), 7.79 (s, 1H), 7.34 (d, J=8.4 Hz, 1H), 5.62 (d, J=5.2 Hz, 1H), 5.36 (d, J=6.4 Hz, 1H), 4.99-4.92 (m, 3H), 4.42 (d, J=7.6 Hz, 1H), 3.98 (d, J=6.4 Hz, 1H), 3.78-3.77 (m, 1H), 3.57-3.450 (m, 2H), 2.87 (s, 3H).

Example 2-5 and 7 are made by the general experimental 1 below from their respective azide aa2-aa5 and aa7

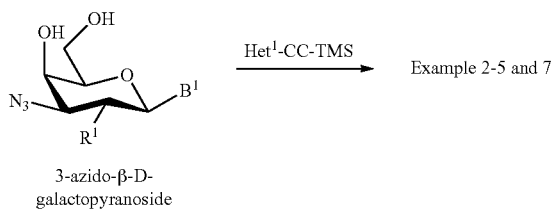

3-azido-β-D-galactopyranoside

General Experimental 1

A solution of 1 equivalent of 3-azido-β-D-galactopyranoside and Het$^1$-CC-TMS 1-3 equivalents is dissolved in 10-40 volumes of DMF and added to 1-3 equivalents of L-ascorbic acid sodium salt and 0.1-2 equivalents of copper sulfate pentahydrate. This reaction mixture is stirred at rt until all starting materials are consumed or over night. The solvents are removed in vacuo and the residue is purified by chromatographic methods such as Prep.HPLC to give the title compound.

Compounds of the structure 3-azido-β-D-galactopyranoside used as starting material in General experimental 1 can be made by the synthesis described in WO2019067702A1.

Example 2

1-[4-(3-chlorophenyl)-4H-1,2,4-triazole-3-yl]-1,3-dideoxy-3-[4-(2-hydroxythiazol-4-yl)-1H-1,2,3-triazol-1-yl]-β-D-galactopyranoside

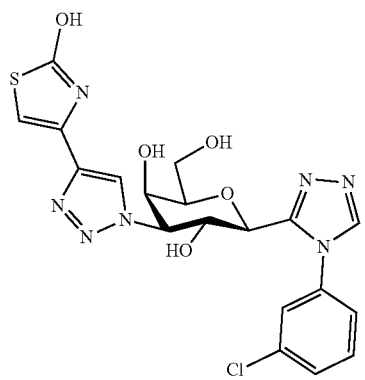

In this example the 3-azido-β-D-galactopyranoside is 3-azido-1-[4-(3-chlorophenyl)-4H-1,2,4-triazole-3-yl]-1,3-dideoxy-β-D-galactopyranoside and Het$^1$-CC-TMS is 4-(2-trimethylsilylethynyl)thiazol-2-ol which are reacted in according to the general experimental 1 to give the title compound.

Example 3

1-[4-(5-chloro-2-methylphenyl)-5-(trifluoromethyl)-4H-1,2,4-triazole-3-yl]-1,3-dideoxy-3-[4-(2-hydroxythiazol-4-yl)-1H-1,2,3-triazol-1-yl]-β-D-galactopyranoside

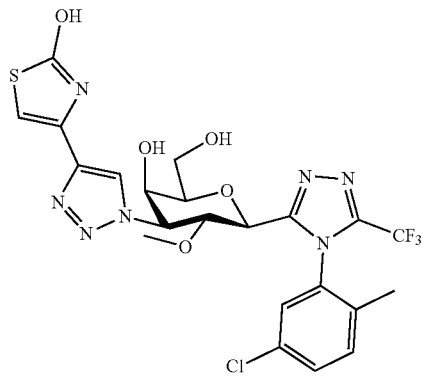

In this example the 3-azido-β-D-galactopyranoside is 3-azido-1-[4-(5-chloro-2-methylphenyl)-5-(trifluoromethyl)-4H-1,2,4-triazole-3-yl]-1,3-dideoxy-β-D-galactopyranoside and Het$^1$-CC-TMS is 4-(2-trimethylsilylethynyl)thiazol-2-ol which are reacted in according to the general experimental 1 to give the title compound.

Example 4

1-[4-(2,5-dichlorophenyl)-4H-1,2,4-triazole-3-yl]-1,3-dideoxy-3-[4-(4-methylthiazol-2-yl)-1H-1,2,3-triazol-1-yl]-β-D-galactopyranoside

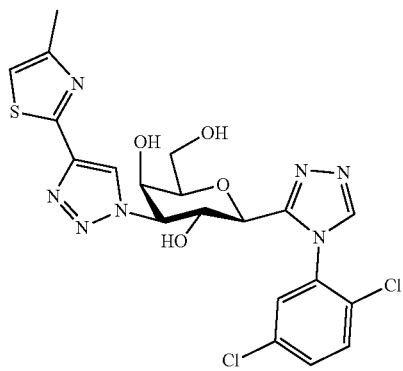

In this example the 3-azido-β-D-galactopyranoside is 3-azido-1-[4-(2,5-dichlorophenyl)-4H-1,2,4-triazole-3-yl]-1,3-dideoxy-β-D-galactopyranoside and Het[1]-CC-TMS is 4-methyl-2-((trimethylsilyl)ethynyl)thiazole which are reacted in according to the general experimental 1 to give the title compound.

Example 5

1-[1-(2-bromo-5-chlorophenyl)-3-methyl-1H-1,2,4-triazole-5-yl]-1,3-dideoxy-3-[4-(thiazol-2-yl)-1H-1,2,3-triazol-1-yl]-β-D-galactopyranoside

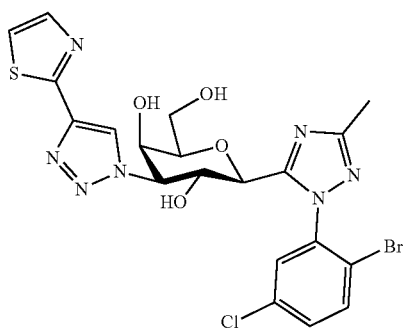

In this example the 3-azido-β-D-galactopyranoside is 3-azido-1-[1-(2-bromo-5-chlorophenyl)-3-methyl-1H-1,2,4-triazole-5-yl]-1,3-dideoxy-β-D-galactopyranoside and Het[1]-CC-TMS is 2-((trimethylsilyl)ethynyl)thiazole which are reacted in according to the general experimental 1 to give the title compound.

Example 6

6-{3-{3-[4-(2-Aminothiazol-4-yl)-1H-1,2,3-triazol-1-yl]-3-deoxy-β-D-galactopyranosyl}-4H-1,2,4-triazol-4-yl}-2-methylbenzothiazole

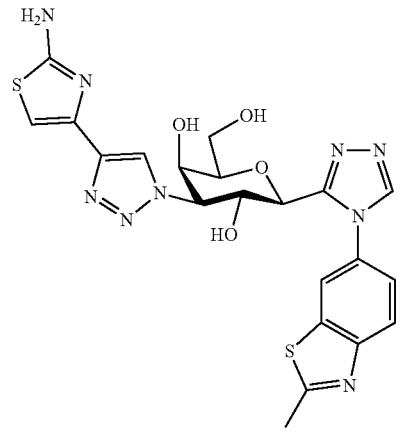

A solution of 6-{3-{4,6-O-benzylidene-3-{4-[2-(di-tert-butoxycarbonylamino)thiazol-4-yl]-1H-1,2,3-triazol-1-yl}-3-deoxy-β-D-galactopyranosyl}-4H-1,2,4-triazol-4-yl}-2-methylbenzothiazole (100 mg, 0.11 mmol) in DCM/TFA (20 mL, 19:1) was stirred 6 h at rt. Et$_3$N was added to neutralize the TFA. The mixture was evaporated and purified by prep HPLC (MeCN/H$_2$O (10 mmol/L NH$_4$HCO$_3$), X-Select 10 μm 19*250 mm, 20 mL/min, UV 254) to give the title compound (28 mg, 50%). ESI-MS m/z calcd for [C$_{21}$H$_{21}$N$_9$O$_4$S$_2$] [M+H]$^+$: 528.1; found: 528.2. $^1$H NMR (400 MHz, Methanol-d$_4$) δ 8.75 (s, 1H), 8.26 (d, J=2.0 Hz, 1H), 8.12 (s, 1H), 7.99 (d, J=8.4 Hz, 1H), 7.64 (dd, J=8.8, 2.0 Hz, 1H), 6.83 (s, 1H), 4.88-4.83 (m, 2H), 4.43 (d, J=9.2 Hz, 1H), 3.99 (d, J=2.8 Hz, 1H), 3.73-3.67 (m, 2H), 3.62-3.56 (m, 1H), 2.80 (s, 3H).

Example 7

1-[1-(2-bromo-5-chlorophenyl)-3-methyl-1H-1,2,4-triazole-5-yl]-1,2,3-trideoxy-3-[4-(thiazol-4-yl)-1H-1,2,3-triazol-1-yl]-β-D-galactopyranoside

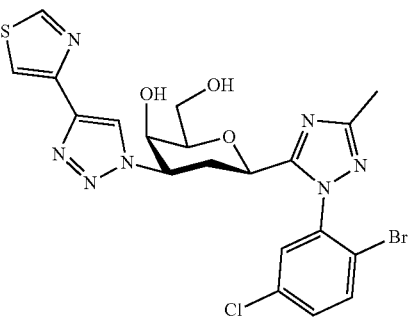

In this example the 3-azido-β-D-galactopyranoside is 3-azidol-[1-(2-bromo-5-chlorophenyl)-3-methyl-1H-1,2,4-triazole-5-yl]-1,2,3-trideoxy-β-D-galactopyranoside and Het[1]-CC-TMS is 4-((trimethylsilyl)ethynyl)thiazole which are reacted in according to the general experimental 1 to give the title compound.

Example 8

6-{3-{3-Deoxy-3-[4-(2-hydroxythiazol-4-yl)-1H-1,2,3-triazol-1-yl]-β-D-galactopyranosyl}-4H-1,2,4-triazol-4-yl}-2-methylbenzothiazole

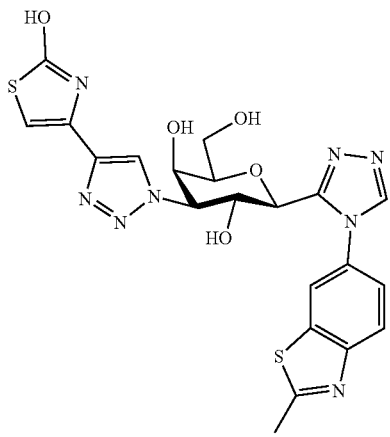

A solution of 6-{3-{4,6-O-benzylidene-3-deoxy-3-[4-(2-hydroxythiazol-4-yl)-1H-1,2,3-triazol-1-yl]-β-D-galactopyranosyl}-4H-1,2,4-triazol-4-yl}-2-methylbenzothiazole (50 mg, 0.07 mmol) in DCM/TFA (6 mL, 19:1) was stirred 6 h at rt. Et$_3$N was added to neutralize the TFA. The mixture was evaporated and purified by prep HPLC (MeCN/H$_2$O (10 mmol/L NH$_4$HCO$_3$), X-Select 10 μm 19*250 mm, 20 mL/min, UV 254) to give the title compound (19 mg, 52%). ESI-MS m/z calcd for [C$_{21}$H$_{20}$N$_8$O$_5$S$_2$] [M+H]$^+$: 529.1; found: 529.2. $^1$H NMR (400 MHz, DMSO-d$_6$) δ 11.87 (s, 1H), 8.92 (s, 1H), 8.41 (d, J=2.0 Hz, 2H), 8.07 (d, J=8.4 Hz, 1H), 7.70 (dd, J=8.0, 2.0 Hz, 1H), 6.70 (s, 1H), 5.45 (d, J=5.6 Hz, 1H), 5.37 (s, 1H), 4.90-4.81 (m, 3H), 4.35 (d, J=8.8 Hz, 1H), 3.90 (d, J=4.4 Hz, 1H), 3.73 (t, J=6.0 Hz, 1H), 3.57-3.46 (m, 2H), 2.85 (s, 3H).

Example 9

1-{3-{3-[4-(4-Chlorothiazol-2-yl)-1H-1,2,3-triazol-1-yl]-3-deoxy-β-D-galactopyranosyl}-5-methyl-4H-1,2,4-triazol-4-yl}-5-chloro-2-(trifluoromethyl)benzene

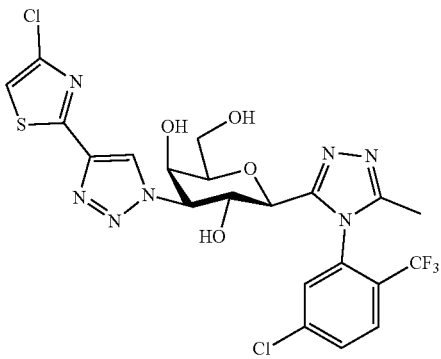

A solution of 1-{3-{4,6-O-benzylidene-3-[4-(4-chlorothiazol-2-yl)-1H-1,2,3-triazol-1-yl]-3-deoxy-β-D-galactopyranosyl}-5-methyl-4H-1,2,4-triazol-4-yl}-5-chloro-2-(trifluoromethyl)benzene (45.0 mg, 0.066 mmol) in DCM/TFA (10 mL, 19:1) was stirred overnight at rt. Et$_3$N was added to neutralize the TFA. The mixture was evaporated and purified by prep HPLC (MeCN/H$_2$O (10 mmol/L NH$_4$HCO$_3$), X-Select 10 μm 19*250 mm, 20 mL/min, UV 254) to give the title compound (23.9 mg, 61%). ESI-MS m/z calcd for [C$_{21}$H$_{18}$Cl$_2$F$_3$N$_7$O$_4$S] [M+H]$^+$: 592.0; found: 592.0. $^1$H NMR (400 MHz, Methanol-d$_4$) δ 8.62 (s, 1H), 8.01 (d, J=8.4 Hz, 1H), 7.90 (dd, J=8.4, 1.2 Hz, 1H), 7.86 (d, J=1.6 Hz, 1H), 7.46 (s, 1H), 5.03 (dd, J=10.8, 9.6 Hz, 1H), 4.93-4.89 (m, 1H), 4.27 (d, J=9.2 Hz, 1H), 4.08 (d, J=2.8 Hz, 1H), 3.58-3.51 (m, 3H), 2.27 (s, 3H).

Example 10

6-{5-{3-Deoxy-3-[4-(2-thiazolyl)-1H-1,2,3-triazol-1-yl]β-D-galactopyranosyl}-3-methyl-1H-1,2,4-triazol-1-yl}-2-methylbenzothiazole

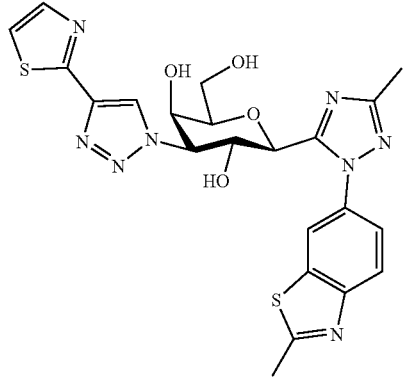

To a solution of 6-{5-{4,6-O-benzylidene-3-deoxy-3-[4-(2-thiazolyl)-1H-1,2,3-triazol-1-yl]-β-D-galactopyranosyl}-3-methyl-1H-1,2,4-triazol-1-yl}-2-methylbenzothiazole (87.0 mg, 0.13 mmol) in DCM (6 mL) TFA (0.3 mL) was added at 0° C. and the mixture was stirred 3 h at rt. Et$_3$N (2 mL) was added at 0° C. to neutralize the TFA. The mixture was evaporated and purified by prep HPLC (MeCN/H$_2$O (10 mmol/L NH$_4$HCO$_3$), X-Select 10 μm 19*250 mm, 20 mL/min, UV 254) to give the title compound (46.0 mg, 36%). ESI-MS m/z calcd for [C$_{22}$H$_{22}$N$_8$O$_4$S$_2$] [M+H]$^+$: 527.1; found: 527.0. $^1$H NMR (400 MHz, Methanol-d$_4$) δ 8.59 (s, 1H), 8.36 (d, J=2.0 Hz, 1H), 8.06 (d, J=8.8 Hz, 1H), 7.88 (d, J=3.2 Hz, 1H), 7.79 (dd, J=8.8, 2.0 Hz, 1H), 7.63 (d, J=3.2 Hz, 1H), 4.99-4.91 (m, 2H), 4.58 (d, J=8.4 Hz, 1H), 4.13 (d, J=2.0 Hz, 1H), 4.00-3.69 (m, 3H), 2.88 (s, 3H), 2.46 (s, 3H).

Example 11

5-Chloro-1-{3-{3-deoxy-3-[4-(4-methylthiazol-2-yl)-1H-1,2,3-triazol-1-yl]-β-D-galactopyranosyl}-5-methyl-4H-1,2,4-triazol-4-yl}-2-(trifluoromethyl)benzene

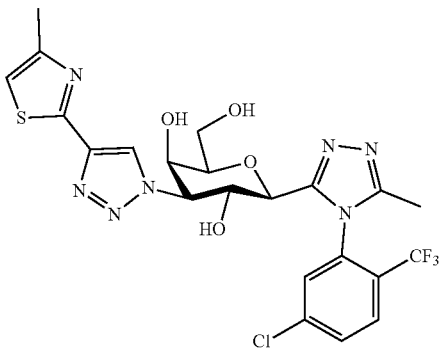

A solution of 1-{3-{4,6-O-benzylidene-3-deoxy-3-[4-(4-methylthiazol-2-yl)-1H-1,2,3-triazol-1-yl]β-D-galactopyranosyl}-5-methyl-4H-1,2,4-triazol-4-yl}-5-chloro-2-(trifluoromethyl)benzene (42.0 mg, 0.064 mmol) in DCM/TFA (2 mL, 19:1) was stirred overnight at rt. Et$_3$N was added to neutralize the TFA. The mixture was evaporated and purified by prep HPLC (MeCN/H$_2$O (10 mmol/L NH$_4$HCO$_3$), X-Select 10 μm 19*250 mm, 20 mL/min, UV 254) to give the title compound (6 mg, 17%). ESI-MS m/z calcd for [C$_{22}$H$_{21}$ClF$_3$N$_7$O$_4$S] [M+H]$^+$: 572.1; found: 572.2. $^1$H NMR (400 MHz, Methanol-d$_4$) δ 8.58 (s, 1H), 8.02 (d, J=8.8 Hz, 1H), 7.90 (d, J=8.8 Hz, 1H), 7.86 (d, J=2.0 Hz, 1H), 7.16 (s, 1H), 5.03 (dd, J=10.8, 9.2 Hz, 1H), 4.91-4.88 (m, 1H), 4.27 (d, J=9.6 Hz, 1H), 4.07 (d, J=2.8 Hz, 1H), 3.56-3.53 (m, 3H), 2.47 (s, 3H), 2.26 (s, 3H).

Example 12

5-Chloro-1-{3-{3-deoxy-3-[4-(2-hydroxythiazol-4-yl)-1H-1,2,3-triazol-1-yl]β-D-galactopyranosyl}-5-methyl-4H-1,2,4-triazol-4-yl}-2-(trifluoromethyl)benzene

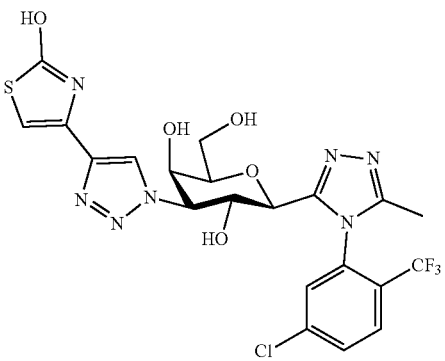

To a solution of 1-{3-{4,6-O-benzylidene-3-deoxy-3-[4-(2-hydroxythiazol-4-yl)-1H-1,2,3-triazol-1-yl]-β-D-galactopyranosyl}-5-methyl-4H-1,2,4-triazol-4-yl}-5-chloro-2-(trifluoromethyl)benzene (30.0 mg, 0.045 mmol) in DCM (6 mL) TFA (0.17 mL) was added and the mixture was stirred overnight at rt. Et$_3$N (0.5 mL) was added at 0° C. to neutralize the TFA. The mixture was evaporated and purified by prep HPLC (MeCN/H$_2$O (10 mmol/L NH$_4$HCO$_3$), X-Select 10 μm 19*250 mm, 20 mL/min, UV 254) to give the title compound (13.0 mg, 50%). ESI-MS m/z calcd for [C$_{21}$H$_{19}$ClF$_3$N$_7$O$_5$S] [M+H]$^+$: 574.1; found: 574.0. $^1$H NMR (400 MHz, Methanol-d$_4$) δ 8.38 (s, 1H), 8.00 (d, J=8.4 Hz, 1H), 7.95-7.87 (m, 1H), 7.84 (d, J=1.6 Hz, 1H), 6.69 (s, 1H), 5.09-4.92 (m, 1H), 4.84-4.81 (m, 1H), 4.21 (d, J=9.2 Hz, 1H), 4.04 (d, J=2.8 Hz, 1H), 3.60-3.48 (m, 3H), 2.26 (s, 3H).

Example 13

6-{5-{3-Deoxy-3-[4-(2-methylthiazol-4-yl)-1H-1,2,3-triazol-1-yl]β-D-galactopyranosyl}-3-methyl-1H-1,2,4-triazol-1-yl}-2-methylbenzothiazole

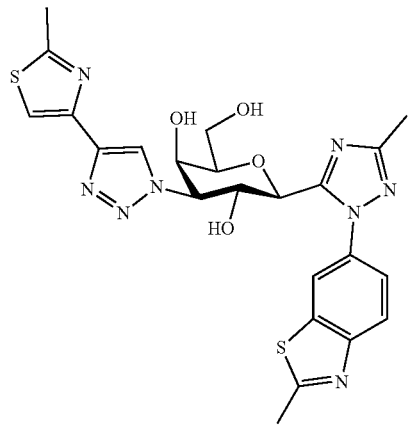

A solution of 6-{5-{4,6-O-benzylidene-3-deoxy-3-[4-(2-methylthiazol-4-yl)-1H-1,2,3-triazol-1-yl]β-D-galactopyranosyl}-3-methyl-1H-1,2,4-triazol-1-yl}-2-methylbenzothiazole (160 mg, 0.25 mmol) in DCM/TFA (10.0 mL, 19:1) was stirred overnight at rt. Et$_3$N was added to neutralize the TFA. The mixture was evaporated and purified by prep HPLC (MeCN/H$_2$O (10 mmol/L NH$_4$HCO$_3$), X-Select 10 μm 19*250 mm, 20 mL/min, UV 254) to give the title compound (99.7 mg, 73%). ESI-MS m/z calcd for [C$_{23}$H$_{24}$N$_8$O$_4$S$_2$] [M+H]$^+$: 541.1; found: 541.2. $^1$H NMR (400 MHz, Methanol-d$_4$) δ 8.42 (s, 1H), 8.37-8.34 (m, 1H), 8.06 (dd, J=8.8, 2.0 Hz, 1H), 7.79 (dd, J=8.8, 2.0 Hz, 1H), 7.72 (d, J=1.6 Hz, 1H), 4.95-4.91 (m, 2H), 4.60-4.55 (m, 1H), 4.12 (s, 1H), 3.91-3.78 (m, 2H), 3.71 (dd, J=11.2, 4.0 Hz, 1H), 2.89 (s, 3H), 2.75 (s, 3H), 2.46 (s, 3H).

Example 14

6-{5-{3-Deoxy-3-[4-(5-thiazolyl)-1H-1,2,3-triazol-1-yl]β-D-galactopyranosyl}-3-methyl-1H-1,2,4-triazol-1-yl}-2-methylbenzothiazole

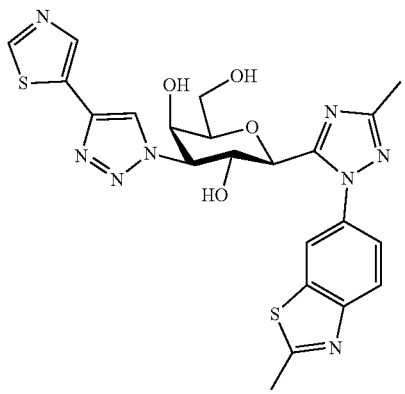

A solution of 6-{5-{4,6-O-benzylidene-3-deoxy-3-[4-(5-thiazolyl)-1H-1,2,3-triazol-1-yl]-β-D-galactopyranosyl}-3-methyl-1H-1,2,4-triazol-1-yl}-2-methylbenzothiazole (130 mg, 0.21 mmol) in DCM/TFA (5.5 mL, 10:1) was stirred overnight at rt. Et$_3$N was added at 0° C. to neutralize the TFA. The mixture was evaporated and purified by prep HPLC (MeCN/H$_2$O (10 mmol/L NH$_4$HCO$_3$), X-Select 10 μm 19*250 mm, 20 mL/min, UV 254) to give the title compound (54.4 mg, 49%). ESI-MS m/z calcd for [C$_{22}$H$_{22}$N$_8$O$_4$S$_2$] [M+H]$^+$: 527.1; found: 527.2. $^1$H NMR (400 MHz, Methanol-d$_4$) δ 9.01 (s, 1H), 8.53 (s, 1H), 8.36 (d, J=2.0 Hz, 1H), 8.24 (s, 1H), 8.07 (d, J=8.8 Hz, 1H), 7.79 (dd, J=8.8, 2.0 Hz, 1H), 5.01-4.90 (m, 2H), 4.55 (d, J=8.8 Hz, 1H), 4.12 (d, J=2.0 Hz, 1H), 3.91-3.78 (m, 2H), 3.74-3.66 (m, 1H), 2.89 (s, 3H), 2.47 (s, 3H).

Example 15

1-{3-{3-[4-(2-Aminothazol-4-yl)-1H-1,2,3-triazol-1-yl]-3-deoxy-β-D-galactopyranosyl}-5-methyl-1H-1,2,4-triazol-4-yl}-5-chloro-2-(trifluoromethyl)benzene

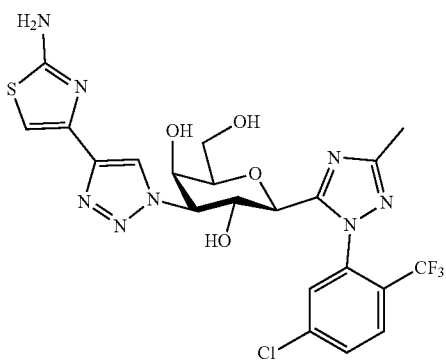

A solution of 1-{3-{4,6-O-benzylidene-3-{4-[2-(di-tert-butoxycarbonylamino)thiazol-4-yl]-1H-1,2,3-triazol-1-yl}-3-deoxy-β-D-galactopyranosyl}-3-methyl-1H-1,2,4-triazol-1-yl}-5-chloro-2-(trifluoromethyl)benzene (72 mg, 0.084 mmol) in DCM/TFA (6 mL, 19:1) was stirred overnight at rt. Et$_3$N was added to neutralize the TFA. The mixture was evaporated and purified by prep HPLC (MeCN/H$_2$O (10 mmol/L NH$_4$HCO$_3$), X-Select 10 μm 19*250 mm, 20 mL/min, UV 254) to give the title compound (18.5 mg, 39%). ESI-MS m/z calcd for [C$_{21}$H$_{20}$ClF$_3$N$_8$O$_4$S] [M+H]$^+$: 573.1; found: 573.2. $^1$H NMR (400 MHz, Methanol-d$_4$) δ 8.24 (s, 1H), 7.96 (d, J=8.4 Hz, 1H), 7.85 (d, J=8.8 Hz, 1H), 7.76 (s, 1H), 6.94 (s, 1H), 4.88-4.82 (m, 2H), 4.35-4.33 (m, 1H), 4.09-4.08 (m, 1H), 3.73-3.65 (m, 3H), 2.44 (s, 3H).

Example 16

1-{3-{3-[4-(4-Chlorothiazol-2-yl)-1H-1,2,3-triazol-1-yl]-3-deoxy-β-D-galactopyranosyl}-5-methyl-1H-1,2,4-triazol-4-yl}-5-chloro-2-(trifluoromethyl)benzene

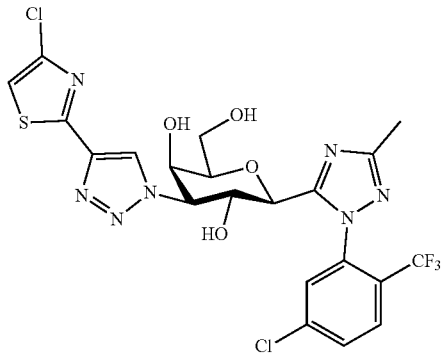

A solution of 1-{3-{4,6-O-benzylidene-3-[4-(4-chlorothiazol-2-yl)-1H-1,2,3-triazol-1-yl]-3-deoxy-β-D-galactopyranosyl}-3-methyl-1H-1,2,4-triazol-1-yl}-5-chloro-2-(trifluoromethyl)benzene (77 mg, 0.11 mmol) in DCM/TFA (6 mL, 19:1) was stirred overnight at rt. Et$_3$N was added to neutralize the TFA. The mixture was evaporated and purified by prep HPLC (MeCN/H$_2$O (10 mmol/L NH$_4$HCO$_3$), X-Select 10 μm 19*250 mm, 20 mL/min, UV 254) to give the title compound (31 mg, 46%). ESI-MS m/z calcd for [C$_{21}$H$_{18}$Cl$_2$F$_3$N$_7$O$_4$S] [M+H]$^+$: 592.0; found: 592.2. $^1$H NMR (400 MHz, Methanol-d$_4$) δ 8.60 (s, 1H), 7.96 (d, J=8.4 Hz, 1H), 7.85 (d, J=8.4 Hz, 1H), 7.76 (s, 1H), 7.46 (s, 1H), 4.93-4.91 (m, 2H), 4.37 (d, J=9.2 Hz, 1H), 4.10 (d, J=1.6 Hz, 1H), 3.75-3.64 (m, 3H), 2.44 (s, 3H).

Example 17

1-{3-{3-[4-(4-Chlorothiazol-2-yl)-1H-1,2,3-triazol-1-yl]-3-deoxy-2-O-methyl-β-D-galactopyranosyl}-5-methyl-4H-1,2,4-triazol-4-yl}-5-chloro-2-(trifluoromethyl)benzene

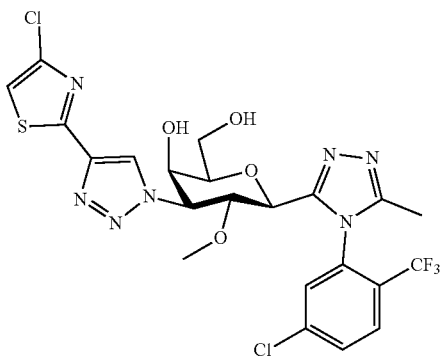

To a solution of 1-{3-{4,6-O-benzylidene-3-[4-(4-chlorothiazol-2-yl)-1H-1,2,3-triazol-1-yl]-3-deoxy-2-O-methyl-β-D-galactopyranosyl}-5-methyl-4H-1,2,4-triazol-4-yl}-5-chloro-2-(trifluoromethyl)benzene (100 mg, 0.14 mmol) in DCM (6 mL) TFA (0.321 mL, 4.32 mmol) was added and the mixture was stirred overnight at rt. Et$_3$N was added at 0° C. to neutralize the TFA. The mixture was evaporated and purified by prep HPLC (MeCN/H$_2$O (10 mmol/L NH$_4$HCO$_3$), X-Select 10 μm 19*250 mm, 20 mL/min, UV 254) to give the title compound (44.0 mg, 50%). ESI-MS m/z calcd for [C$_{22}$H$_{20}$Cl$_2$F$_3$N$_7$O$_4$S] [M+H]$^+$: 606.1; found: 606.1. $^1$H NMR (400 MHz, Methanol-d$_4$) δ 8.79 (s, 1H), 8.02 (d, J=8.8 Hz, 1H), 7.93-7.88 (m, 2H), 7.47 (d, J=2.0 Hz, 1H), 4.96-4.79 (m, 2H), 4.20 (d, J=9.2 Hz, 1H), 4.02 (d, J=2.8 Hz, 1H), 3.65-3.51 (m, 3H), 3.14 (s, 3H), 2.28 (s, 3H).

Example 18

3-{5-{3-[4-(4-Chlorothiazol-2-yl)-1H-1,2,3-triazol-1-yl]-3-deoxy-β-D-galactopyranosyl}-3-methyl-1H-1,2,4-triazol-1-yl}-5-chloro-2-cyclopropylpyridine

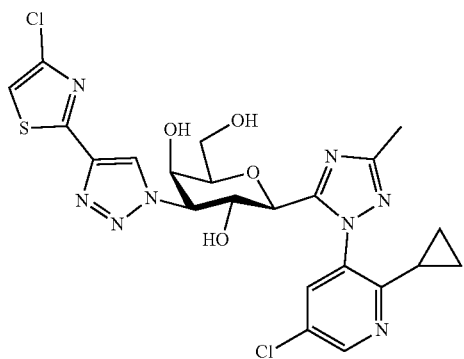

A solution of 3-{5-{4,6-O-benzylidene-3-[4-(4-chlorothiazol-2-yl)-1H-1,2,3-triazol-1-yl]-3-deoxy-β-D-galactopyranosyl}-3-methyl-1H-1,2,4-triazol-1-yl}-5-chloro-2-cyclopropylpyridine (115 mg, 0.18 mmol) in DCM/TFA (4 mL, 19:1) was stirred overnight at rt. Et$_3$N was added to neutralize the TFA. The mixture was evaporated and purified by prep HPLC (MeCN/H$_2$O (10 mmol/L NH$_4$HCO$_3$), X-Select 10 μm 19*250 mm, 20 mL/min, UV 254) to afford the title compound (49.9 mg, 50%). ESI-MS m/z calcd for [C$_{22}$H$_{22}$Cl$_2$N$_8$O$_4$S] [M+H]$^+$: 653.1; found: 653.1. $^1$H NMR (400 MHz, Methanol-d$_4$) δ 8.59 (d, J=2.4 Hz, 1H), 8.57 (s, 1H), 7.90 (s, 1H), 7.46 (s, 1H), 4.95-4.91 (m, 1H), 4.77-4.72 (m, 1H), 4.45 (d, J=9.2 Hz, 1H), 4.09 (d, J=2.4 Hz, 1H), 3.82-3.63 (m, 3H), 2.46 (s, 3H), 1.67-1.62 (m, 1H), 1.13-0.93 (m, 4H).

Example 19

1-{3-{3-[4-(2-Aminothiazol-4-yl)-1H-1,2,3-triazol-1-yl]-3-deoxy-β-D-galactopyranosyl}-5-methyl-4H-1,2,4-triazol-4-yl}-5-chloro-2-(trifluoromethyl)benzene

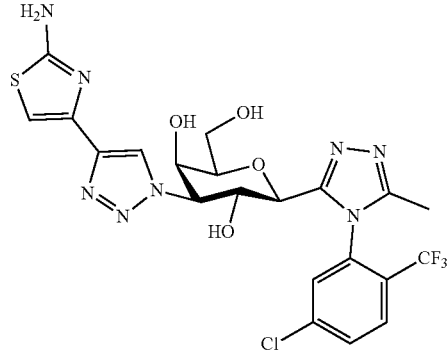

To a solution of 1-{3-{4,6-O-benzylidene-3-{4-[2-(di-tert-butoxycarbonylamino)thiazol-4-yl]-1H-1,2,3-triazol-1-yl}-3-deoxy-β-D-galactopyranosyl}-5-methyl-4H-1,2,4-triazol-4-yl}-5-chloro-2-(trifluoromethyl)benzene (60.0 mg, 0.070 mmol) in DCM (6 mL) TFA (0.26 mL) was added and the mixture was stirred overnight at rt. Et$_3$N (0.5 mL) was added at 0° C. to neutralize the TFA. The mixture was evaporated and purified by prep HPLC (MeCN/H$_2$O (10 mmol/L NH$_4$HCO$_3$), X-Select 10 μm 19*250 mm, 20 mL/min, UV 254) to give the title compound (19.0 mg, 48%). ESI-MS m/z calcd for [C$_{21}$H$_{20}$ClF$_3$N$_8$O$_4$S] [M+H]$^+$: 573.1; found: 573.2. $^1$H NMR (400 MHz, Methanol-d$_4$) δ 8.27 (s, 1H), 8.02-7.97 (m, 1H), 7.93-7.83 (m, 2H), 6.94 (s, 1H), 5.04-4.97 (m, 1H), 4.84-4.79 (m, 1H), 4.24 (d, J=9.2 Hz, 1H), 4.05 (d, J=2.8 Hz, 1H), 3.58-3.51 (m, 3H), 2.26 (s, 3H).

Example 20

5-Chloro-1-{3-{3-deoxy-3-[4-(2-thiazolyl)-1H-1,2,3-triazol-1-yl]β-D-galactopyranosyl}-5-methyl-4H-1,2,4-triazol-4-yl}-2-(trifluoromethyl)benzene

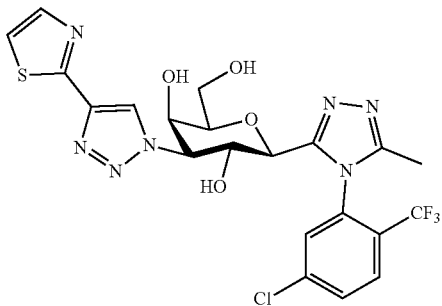

A solution of 1-{3-{4,6-O-benzylidene-3-deoxy-3-[4-(2-thiazolyl)-1H-1,2,3-triazol-1-yl]-β-D-galactopyranosyl}-5-methyl-4H-1,2,4-triazol-4-yl}-5-chloro-2-(trifluoromethyl)benzene (65.0 mg, 0.10 mmol) in DCM/TFA (10 mL, 19:1) was stirred overnight at rt. Et$_3$N was added to neutralize the TFA. The mixture was evaporated and purified by prep HPLC (MeCN/H$_2$O (10 mmol/L NH$_4$HCO$_3$), X-Select 10 μm 19*250 mm, 20 mL/min, UV 254) to give the title compound (24.4 mg, 44%). ESI-MS m/z calcd for [C$_{21}$H$_{19}$ClF$_3$N$_7$O$_4$S] [M+H]$^+$: 558.1; found: 558.1. $^1$H NMR (400 MHz, Methanol-d$_4$) δ 8.61 (s, 1H), 8.00 (d, J=8.5 Hz, 1H), 7.96-7.77 (m, 3H), 7.63 (d, J=2.4 Hz, 1H), 5.04 (m, 1H), 4.94-4.90 (m, 1H), 4.27 (d, J=9.6 Hz, 1H), 4.08 (s, 1H), 3.62-3.49 (m, 3H), 2.27 (s, 3H).

Example 21

6-{3-{3-Deoxy-3-[4-(2-thiazolyl)-1H-1,2,3-triazol-1-yl]-β-D-galactopyranosyl}-4H-1,2,4-triazol-4-yl}-2-methylbenzothiazole

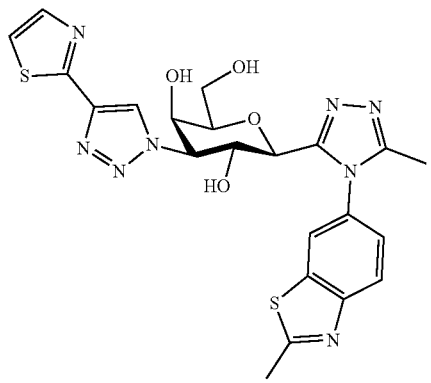

A solution of 6-{3-{4,6-O-benzylidene-3-deoxy-3-[4-(2-thiazolyl)-1H-1,2,3-triazol-1-yl]-β-D-galactopyranosyl}-4H-1,2,4-triazol-4-yl}-2-methylbenzothiazole (87.0 mg, 0.13 mmol) in DCM/TFA (4 mL, 19:1) was stirred overnight at rt. Et$_3$N was added to neutralize the TFA. The mixture was evaporated and purified by prep HPLC (MeCN/H$_2$O (10 mmol/L NH$_4$HCO$_3$), X-Select 10 μm 19*250 mm, 20 mL/min, UV 254) to give the title compound (17.1 mg, 23%). ESI-MS m/z calcd for [C$_{21}$H$_{20}$N$_8$O$_4$S$_2$] [M+H]$^+$: 513.1; found: 513.2. $^1$H NMR (400 MHz, DMSO-d$_6$) δ 8.95 (s, 1H), 8.47 (d, J=10.4 Hz, 2H), 8.10 (d, J=8.8 Hz, 1H), 7.94 (d, J=2.4 Hz, 1H), 7.78-7.72 (m, 2H), 5.64-5.62 (m, 1H), 5.40-5.38 (m, 1H), 4.97-4.93 (m, 3H), 4.43 (d, J=7.6 Hz, 1H), 3.97-3.96 (m, 1H), 3.78-3.77 (m, 1H), 3.60-3.48 (m, 2H), 2.87 (s, 3H).

Example 22

6-{3-{3-Deoxy-3-[4-(4-methylthiazol-2-yl)-1H-1,2,3-triazol-1-yl]-β-D-galactopyranosyl}-4H-1,2,4-triazol-4-yl}-2-methylbenzothiazole

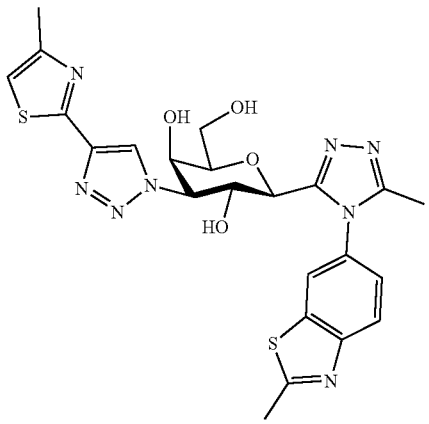

A solution of 6-{3-{4,6-O-benzylidene-3-deoxy-3-[4-(4-methylthiazol-2-yl)-1H-1,2,3-triazol-1-yl]β-D-galactopyranosyl}-4H-1,2,4-triazol-4-yl}-2-methylbenzothiazole (70 mg, 0.10 mmol) in DCM/TFA (10 mL, 19:1) was stirred 6 h at rt. Et$_3$N was added to neutralize the TFA. The mixture was evaporated and purified by prep HPLC (MeCN/H$_2$O (10 mmol/L NH$_4$HCO$_3$), X-Select 10 μm 19*250 mm, 20 mL/min, UV 254) to give the title compound (35 mg, 65%). ESI-MS m/z calcd for [C$_{22}$H$_{22}$N$_8$O$_4$S$_2$][M+H]$^+$: 527.1; found: 527.2. $^1$H NMR (400 MHz, DMSO-d$_6$) δ 8.93 (s, 1H), 8.42 (d, J=2.4 Hz, 1H), 8.40 (s, 1H), 8.07 (d, J=8.4 Hz, 1H), 7.70 (dd, J=8.8, 2.4 Hz, 1H), 7.28 (d, J=0.8 Hz, 1H), 5.51 (s, 3H), 4.96-4.89 (m, 2H), 4.41 (d, J=8.8 Hz, 1H), 3.94 (d, J=1.2 Hz, 1H), 3.76 (dd, J=6.8, 5.2 Hz, 1H), 3.58-3.46 (m, 2H), 2.85 (s, 3H), 2.40 (d, J=0.4 Hz, 3H).

Example 23

6-{5-[3-[4-(4-Chlorothiazol-2-yl)-1H-1,2,3-triazol-1-yl]-3-deoxy-β-D-galactopyranosyl}-3-methyl-1H-1,2,4-triazol-1-yl}-2-methylbenzothiazole

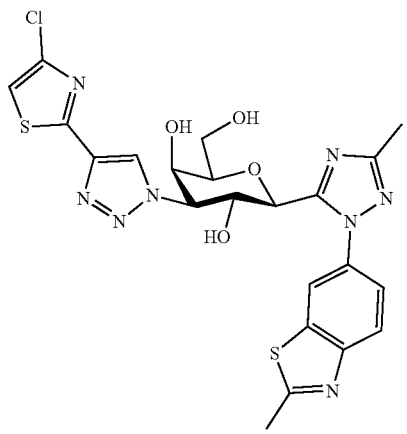

To a solution of 6-{5-{4,6-O-benzylidene-3-[4-(4-chlorothiazol-2-yl)-1H-1,2,3-triazol-1-yl]-3-deoxy-β-D-galactopyranosyl}-3-methyl-1H-1,2,4-triazol-1-yl}-2-methylbenzothiazole (95 mg, 0.15 mmol) in DCM (12 mL) TFA (0.54 mL) was added at 0° C. and the mixture was stirred overnight at rt. Et₃N (2 mL) was added at 0° C. to neutralize the TFA. The mixture was evaporated and purified by prep HPLC (MeCN/H₂O (10 mmol/L NH₄HCO₃), X-Select 10 μm 19*250 mm, 20 mL/min, UV 254) to give the title compound (35 mg, 43%). ESI-MS m/z calcd for [C₂₂H₂₁ClN₈O₄S₂][M+H]⁺: 561.1; found: 561.2. ¹H NMR (400 MHz, Methanol-d₄) δ 8.61 (s, 1H), 8.36 (d, J=2.0 Hz, 1H), 8.06 (d, J=8.8 Hz, 1H), 7.79 (dd, J=8.8, 2.0 Hz, 1H), 7.46 (s, 1H), 4.99-4.91 (m, 2H), 4.57 (d, J=8.8 Hz, 1H), 4.12 (d, J=2.0 Hz, 1H), 3.89-3.69 (m, 3H), 2.89 (s, 3H), 2.47 (s, 3H).

Example 24

6-{5-{3-[4-(2-Aminothiazol-4-yl)-1H-1,2,3-triazol-1-yl]-3-deoxy-β-D-galactopyranosyl}-3-methyl-1H-1,2,4-triazol-1-yl}-2-methylbenzothiazole

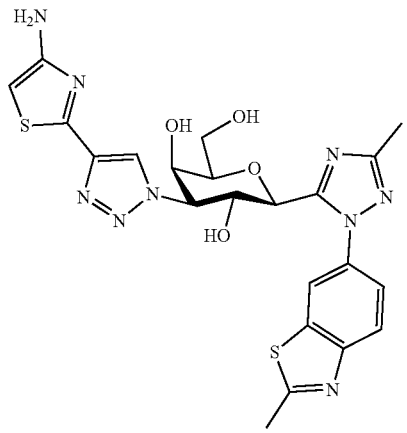

To a solution of 6-{5-{4,6-O-benzylidene-3-{4-[2-(di-tert-butoxycarbonylamino)thiazol-4-yl]-1H-1,2,3-triazol-1-yl}-3-deoxy-β-D-galactopyranosyl}-3-methyl-1H-1,2,4-triazol-1-yl}-2-methylbenzothiazole (220 mg, 0.27 mmol) in DCM (6 mL) TFA (0.3 mL) was added at 0° C. and the mixture was stirred overnight at rt. Et₃N (2 mL) was added at 0° C. to neutralize the TFA. The mixture was evaporated and purified by prep HPLC (MeCN/H₂O (10 mmol/L NH₄HCO₃), X-Select 10 μm 19*250 mm, 20 mL/min, UV 254) to give the title compound (64 mg, 45%). ESI-MS m/z calcd for [C₂₂H₂₃N₉O₄S₂] [M+H]⁺: 542.1; found: 542.2. ¹H NMR (400 MHz, Methanol-d₄) δ 8.36 (d, J=2.0 Hz, 1H), 8.25 (s, 1H), 8.06 (d, J=8.4 Hz, 1H), 7.79 (dd, J=8.4, 2.0 Hz, 1H), 6.94 (s, 1H), 4.93-4.89 (m, 2H), 4.56 (dd, J=7.2, 2.0 Hz, 1H), 4.01 (s, 1H), 3.88-3.68 (m, 3H), 2.89 (s, 3H), 2.46 (s, 3H).

Example 25

6-{3-{3-[4-(4-Chlorothiazol-2-yl)-1H-1,2,3-triazol-1-yl]-3-deoxy-2-O-methyl-β-D-galactopyranosyl}-5-methyl-4H-1,2,4-triazol-4-yl}-2-methylbenzothiazole

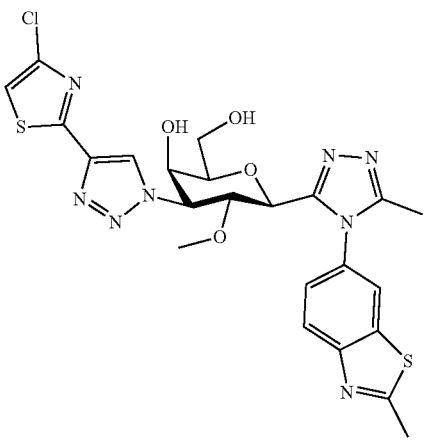

To a solution of 6-{3-{4,6-O-benzylidene-3-[4-(4-chlorothiazol-2-yl)-1H-1,2,3-triazol-1-yl]-3-deoxy-2-O-methyl-β-D-galactopyranosyl}-5-methyl-4H-1,2,4-triazol-4-yl}-2-methylbenzothiazole (150 mg, 0.23 mmol) in DCM (10 mL) TFA (0.50 mL) was added and the mixture was stirred overnight at rt. Et₃N was added at 0° C. to neutralize the TFA. The mixture was evaporated and purified by prep HPLC (MeCN/H₂O (10 mmol/L NH₄HCO₃), X-Select 10 μm 19*250 mm, 20 mL/min, UV 254) to give the title compound (78 mg, 60%). ESI-MS m/z calcd for [C₂₃H₂₃ClN₈O₄S₂][M+H]⁺: 575.1; found: 575.2. ¹H NMR (400 MHz, DMSO-d₆) δ 8.88 (s, 1H), 8.34 (s, 1H), 8.08 (d, J=8.4 Hz, 1H), 7.80 (s, 1H), 7.64 (dd, J=8.8, 2.0 Hz, 1H), 5.41 (d, J=6.8 Hz, 1H), 5.06 (dd, J=10.4, 2.8 Hz, 1H), 4.85 (t, J=6.4 Hz, 1H), 4.74 (t, J=6.0 Hz, 1H), 4.22 (d, J=9.6 Hz, 1H), 3.86 (dd, J=9.6, 3.2 Hz, 1H), 3.61-3.42 (m, 3H), 2.97 (s, 3H), 2.87 (s, 3H), 2.30 (s, 3H).

Example 26

6-{3-{3-[4-(4-Chlorothiazol-2-yl)-1H-1,2,3-triazol-1-yl]-3-deoxy-β-D-galactopyranosyl}-5-methyl-4H-1,2,4-triazol-4-yl}-2-methylbenzothiazole

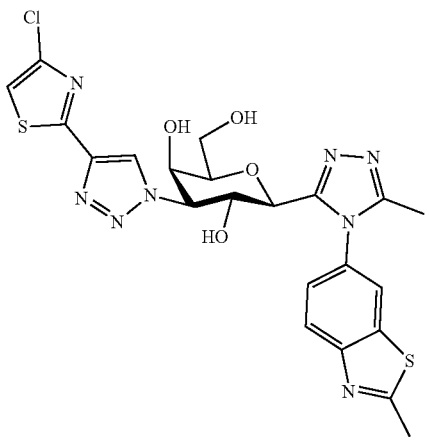

To a solution of 6-{3-{4,6-O-benzylidene-3-[4-(4-chlorothiazol-2-yl)-1H-1,2,3-triazol-1-yl]-3-deoxy-β-D-galactopyranosyl}-5-methyl-4H-1,2,4-triazol-4-yl}-2-methylbenzothiazole (170 mg, 0.26 mmol) in DCM (12 mL) TFA (0.58 mL) was added and the mixture was stirred overnight at rt. Et$_3$N was added at 0° C. to neutralize the TFA. The mixture was evaporated and purified by prep HPLC (MeCN/H$_2$O (10 mmol/L NH$_4$HCO$_3$), X-Select 10 μm 19*250 mm, 20 mL/min, UV 254) to give the title compound (85 mg, 58%). ESI-MS m/z calcd for [C$_{22}$H$_{21}$ClN$_8$O$_4$S$_2$] [M+H]$^+$: 561.1; found: 561.2. $^1$H NMR (400 MHz, DMSO-d$_6$) δ 8.52 (s, 1H), 8.32 (s, 1H), 8.09 (d, J=8.4 Hz, 1H), 7.79 (s, 1H), 7.63 (dd, J=8.8, 2.0 Hz, 1H), 5.59 (d, J=8.4 Hz, 1H), 5.28 (d, J=6.8 Hz, 1H), 4.94-4.80 (m, 3H), 4.19 (d, J=8.8 Hz, 1H), 3.91 (t, J=3.2 Hz, 1H), 3.62-3.59 (m, 1H), 3.53-3.41 (m, 2H), 2.87 (s, 3H), 2.29 (s, 3H).

Example 27

5-{3-{3-[4-(4-Chlorothiazol-2-yl)-1H-1,2,3-triazol-1-yl]-3-deoxy-β-D-galactopyranosyl}-5-methyl-4H-1,2,4-triazol-4-yl}-N-3-methylbenzimidazole

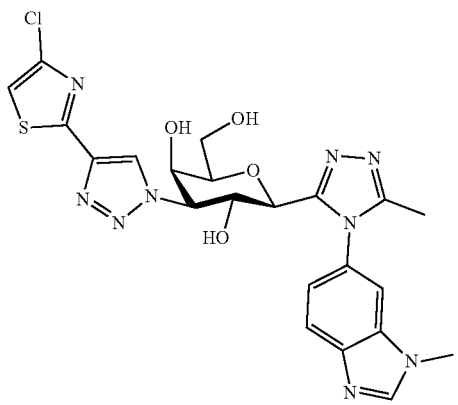

To a solution of 5-{3-{4,6-O-benzylidene-3-[4-(4-chlorothiazol-2-yl)-1H-1,2,3-triazol-1-yl]-3-deoxy-β-D-galactopyranosyl}-5-methyl-4H-1,2,4-triazol-4-yl}-N-3-methylbenzimidazole (65 mg, 0.10 mmol) in DCM (8 mL) TFA (0.38 mL) was added and the mixture was stirred overnight at rt. Et$_3$N was added at 0° C. to neutralize the TFA. The mixture was evaporated and purified by prep HPLC (MeCN/H$_2$O (10 mmol/L NH$_4$HCO$_3$), X-Select 10 μm 19*250 mm, 20 mL/min, UV 254) to give the title compound (38.5 mg, 69%). ESI-MS m/z calcd for [C$_{22}$H$_{22}$ClN$_9$O$_4$S] [M+H]$^+$: 544.1; found: 544.2. $^1$H NMR (400 MHz, Methanol-d$_4$) δ 8.53 (s, 1H), 8.35 (s, 1H), 7.90-7.80 (m, 2H), 7.45 (s, 1H), 7.38 (d, J=7.2 Hz, 1H), 4.86-4.83 (m, 2H), 4.33 (s, 1H), 4.04 (d, J=1.2 Hz, 1H), 3.97 (s, 3H), 3.77-3.62 (m, 3H), 2.36 (s, 3H).

Example 28

1-{5-{3-[4-(4-Chlorothiazol-2-yl)-1H-1,2,3-triazol-1-yl]-3-deoxy-β-D-galactopyranosyl}-1H-1,2-pyrazol-1-yl}-5-chloro-2-(trifluoromethyl)benzene

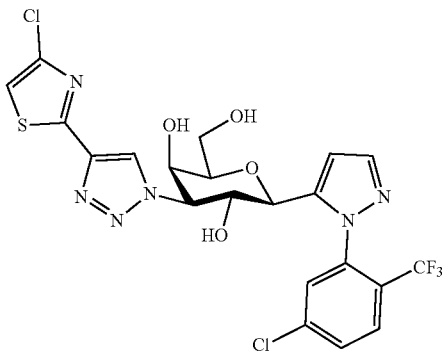

A solution of 3,7-anhydro-6,8-O-benzylidene-5-[4-(4-chlorothiazol-2-yl)-1H-1,2,3-triazol-1-yl]-5-deoxy-4-O-methoxymethyl-D-glycero-L-manno-2-octulose (100 mg, 0.20 mmol) in N,N-dimethylformamide dimethyl acetal (3.0 mL) was stirred 2 h at 80° C. The mixture was concentrated to dryness and the residue was dissolved together with and [5-chloro-2-(trifluoromethyl)phenyl]hydrazine (82.4 mg, 0.39 mmol) in EtOH (5.0 mL). Concentrated HCl (0.5 mL) was added and the mixture was stirred overnight at 80° C. The mixture was evaporated and purified by prep HPLC (MeCN/H$_2$O (10 mmol/L NH$_4$HCO$_3$), X-Select 10 μm 19*250 mm, 20 mL/min, UV 254) to afford the title compound (22.8 mg, 20%). ESI-MS m/z calcd for [C$_{21}$H$_{17}$Cl$_2$F$_3$N$_6$O$_4$S] [M+H]$^+$: 577.0; found: 577.2. $^1$H NMR (500 MHz, Methanol-d$_4$) δ 8.61 (s, 1H), 7.92 (d, J=8.6 Hz, 1H), 7.83-7.79 (m, 1H), 7.78-7.69 (m, 2H), 6.78 (d, J=1.9 Hz, 1H), 4.90-4.86 (m, 1H), 4.65 (s, 1H), 4.21 (d, J=8.7 Hz, 1H), 4.12 (d, J=2.8 Hz, 1H), 3.64 (s, 3H).

Example 29

6-{3-{3-[4-(4-Chlorothiazol-2-yl)-1H-1,2,3-triazol-1-yl]-3-deoxy-β-D-galactopyranosyl}-1H-1,2-pyrazol-1-yl}-2-methylbenzothiazole

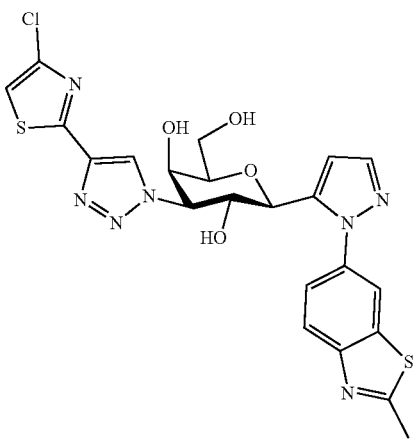

A solution of 3,7-anhydro-6,8-O-benzylidene-5-[4-(4-chlorothiazol-2-yl)-1H-1,2,3-triazol-1-yl]-5-deoxy-4-O-methoxymethyl-D-glycero-L-manno-2-octulose (100 mg, 0.20 mmol) in N,N-dimethylformamide dimethyl acetal (3.0 mL) was stirred 2 h at 80° C. The mixture was concentrated to dryness and the residue was dissolved together with and (2-methyl-1,3-benzothiazol-6-yl)hydrazine (63.8 mg, 0.36 mmol) in EtOH (5.0 mL). Concentrated HCl (0.5 mL) was added and the mixture was stirred overnight at 80° C. The mixture was evaporated and purified by prep HPLC (MeCN/H$_2$O (10 mmol/L NH$_4$HCO$_3$), X-Select 10 μm 19*250 mm, 20 mL/min, UV 254) to afford the title compound (5.9 mg, 5%). ESI-MS m/z calcd for [C$_{22}$H$_{20}$ClN$_7$O$_4$S] [M+H]$^+$: 546.1; found: 546.2. $^1$H NMR (400 MHz, Methanol-d$_4$) δ 8.62 (s, 1H), 8.36 (d, J=2.0 Hz, 1H), 8.04 (d, J=8.8 Hz, 1H), 7.79 (dd, J=8.8, 2.0 Hz, 1H), 7.76 (d, J=2.0 Hz, 1H), 7.46 (s, 1H), 6.82 (d, J=2.0 Hz, 1H), 4.97-4.89 (m, 1H), 4.83-4.72 (m, 1H), 4.41 (d, J=9.6 Hz, 1H), 4.13 (d, J=2.8 Hz, 1H), 3.88-3.75 (m, 2H), 3.75-3.65 (m, 1H), 2.88 (s, 3H).

Intermediate 1

2,4,6-Tri-O-acetyl-3-azido-3-deoxy-β-D-galactopyranosyl Cyanide

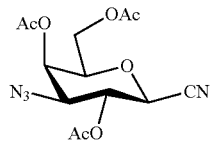

To a solution of 1,2,4,6-tetra-O-acetyl-3-azido-3-deoxy-β-D-galactopyranoside (10.0 g, 26.8 mmol) and trimethylsilyl cyanide (6.70 mL, 53.6 mmol) in nitromethane (100 mL) under argon at 0° C. boron trifluoride diethyl etherate (3.31 mL, 26.8 mmol) was added and the mixture was stirred 5 h at rt. The mixture was concentrated and purified by column chromatography (PE/EA=5/1~2/1, Silica-CS 80 g, 30 mL/min, silica gel, UV 254) to give the product (7.40 g, 81%). ESI-MS m/z calcd for [C$_{13}$H$_{16}$N$_4$O$_7$] [M+NH$_4$]$^+$: 358.1; found: 358.1. $^1$H NMR (400 MHz, CDCl$_3$) δ 5.52-5.41 (m, 2H), 4.25 (d, J=10.0 Hz, 1H), 4.16-4.08 (m, 1H), 4.07-4.00 (m, 1H), 3.92-3.83 (m, 1H), 3.59 (dd, J=10.0, 3.2 Hz, 1H), 2.19 (s, 6H), 2.06 (s, 3H).

Methyl 2,6-anhydro-4-azido-5,7-O-benzylidene-4-deoxy-D-glycero-L-manno-heptonate

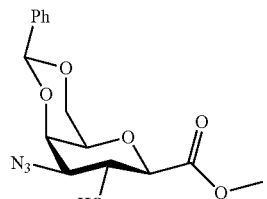

To a solution of 2,4,6-tri-O-acetyl-3-azido-3-deoxy-β-D-galactopyranosyl cyanide (7.40 g, 21.7 mmol) in MeOH (100 mL) at 0° C. acetyl chloride (8.535 g, 109 mmol) was added and the mixture was stirred overnight at 65° C. The mixture was concentrated, and the residue was dissolved in DMF (10 mL). Benzaldehyde dimethylacetal (9.918 g, 65.2 mmol) followed by D(+)-10-camphorsulfonic acid (1.009 g, 4.34 mmol) were added and the mixture was stirred 3 h at 50° C. under reduced pressure. The mixture was poured into water (30 mL) and extracted with EA (3×30 mL). The combined organic layers was washed with brine, concentrated and purified by column chromatography (PE/EA=5/1~1/1, Silica-CS 40 g, 30 mL/min, silica gel, UV 254) to give the product (4.00 g, 55%). ESI-MS m/z calcd for [C$_{15}$H$_{17}$N$_3$O$_6$] [M+NH$_4$]$^+$: 353.1; found: 353.1. $^1$H NMR (400 MHz, CDCl$_3$) δ 7.55-7.45 (m, 2H), 7.42-7.30 (m, 3H), 5.58 (s, 1H), 4.45-4.34 (m, 2H), 4.26 (d, J=2.8 Hz, 1H), 4.06 (dd, J=12.8, 2.0 Hz, 1H), 3.89 (d, J=9.6 Hz, 1H), 3.84 (s, 3H), 3.52 (d, J=1.2 Hz, 1H), 3.50-3.46 (m, 1H), 3.41 (dd, J=10.4, 3.6 Hz, 1H).

2,6-Anhydro-4-azido-5,7-O-benzylidene-4-deoxy-D-glycero-L-manno-heptonohydrazide

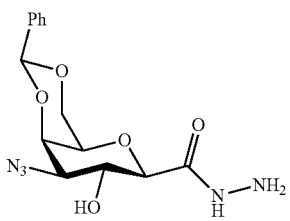

To a solution of methyl 2,6-anhydro-4-azido-5,7-O-benzylidene-4-deoxy-D-glycero-L-manno-heptonate (800 mg, 2.39 mmol) in EtOH (20 mL) hydrazine hydrate (0.514 mL, 10.6 mmol) was added and the mixture was stirred 16 h at 80° C. The mixture was concentrated and purified by prep HPLC (MeCN/H$_2$O (10 mmol/L NH$_4$HCO$_3$), X-Select 10 μm 19*250 mm, 20 mL/min, UV 254) to afford the product (705 mg, 88%). ESI-MS m/z calcd for [C$_{14}$H$_{17}$N$_5$O$_5$] [M+H]$^+$: 336.1; found: 336.3. H NMR (400 MHz, DMSO-d$_6$) δ 9.33 (s, 1H), 7.43-7.34 (m, 5H), 5.66-5.61 (m, 2H), 4.31-4.28 (m, 3H), 4.03-3.98 (m, 3H), 3.58 (d, J=9.2 Hz, 1H), 3.51 (s, 1H), 3.47-3.44 (m, 1H).

6-[3-(3-Azido-4,6-O-benzylidene-3-deoxy-β-D-galactopyranosyl)-4H-1,2,4-triazol-4-yl]-2-methylbenzothiazole

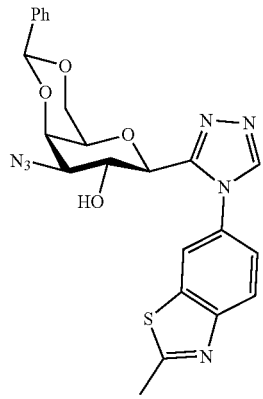

To a solution of 2,6-anhydro-4-azido-5,7-O-benzylidene-4-deoxy-D-glycero-L-manno-heptonohydrazide (705 mg, 2.10 mmol) in MeCN (20 mL) N,N-dimethylformamide dimethyl acetal (251 mg, 2.10 mol) was added and the mixture was stirred 30 min at 50° C. A solution of 6-amino-2-methylbenzothiazole (345 mg, 2.10 mol) in MeCN (10.0 mL) was added followed by acetic acid (2 mL) and the mixture was stirred 3 h 120° C.

The mixture was concentrated and purified by column chromatography (EA:MeOH=20:1, Silica-CS 40 g, 30 mL/min, silica gel, UV 254) to give the product (760 mg, 74%). ESI-MS m/z calcd for [$C_{23}H_{21}N_7O_4S$] [M+H]$^+$: 492.1; found: 492.1. $^1$H NMR (400 MHz, CDCl$_3$) δ 8.28 (s, 1H), 7.97-7.93 (m, 2H), 7.50 (dd, J=8.4, 2.0 Hz, 1H), 7.40-7.30 (m, 5H), 5.50 (s, 1H), 4.78 (t, J=10.0 Hz, 1H), 4.44 (d, J=9.2 Hz, 1H), 4.22 (d, J=3.2 Hz, 1H), 4.12-3.95 (m, 2H), 3.48-3.44 (m, 1H), 3.31 (d, J=0.8 Hz, 1H), 2.83 (s, 3H).

6-{3-{4,6-O-Benzylidene-3-[4-(4-chlorothiazol-2-yl)-1H-1,2,3-triazol-1-yl]-3-deoxy-β-D-galactopyranosyl}-4H-1,2,4-triazol-4-yl}-2-methylbenzothiazole

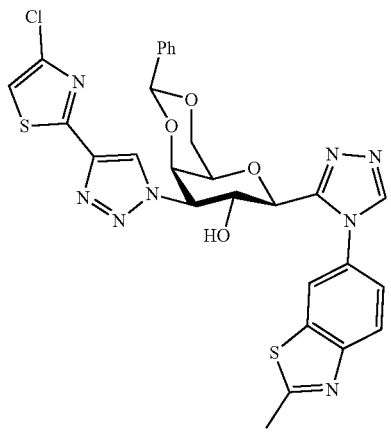

To a solution of 6-[3-(3-azido-4,6-O-benzylidene-3-deoxy-β-D-galactopyranosyl)-4H-1,2,4-triazol-4-yl]-2-methylbenzothiazole (100 mg, 0.20 mmol) in DMF (3 mL) 2-(4-chlorothiazol-2-yl)ethynyl-trimethyl-silane (61.5 mg, 0.29 mmol), copper(II) sulfate pentahydrate (25.4 mg, 0.10 mmol) and (+)-sodium L-ascorbate (40.3 mg, 0.20 mmol) were added and the mixture was stirred 3 h at rt. The mixture was evaporated and purified by column chromatography (EA/MeOH=50/1~20/1, Silica-CS 12 g, 20 mL/min, silica gel, UV 254) to afford the product (93.0 mg, 72%). ESI-MS m/z calcd for [$C_{28}H_{23}ClN_8O_4S_2$] [M+H]$^+$: 635.1; found: 635.1. $^1$H NMR (400 MHz, DMSO-d$_6$) δ 8.90 (s, 1H), 8.48 (s, 1H), 8.27 (d, J=2.0 Hz, 1H), 8.03 (d, J=8.4 Hz, 1H), 7.76 (s, 1H), 7.66 (dd, J=8.4, 2.0 Hz, 1H), 7.35-7.30 (m, 5H), 5.74 (d, J=6.4 Hz, 1H), 5.54 (s, 1H), 5.25 (dd, J=10.4, 3.2 Hz, 1H), 4.70-4.69 (m, 1H), 4.51 (d, J=3.2 Hz, 1H), 4.34-4.33 (m, 1H), 4.16-3.91 (m, 3H), 2.71 (s, 3H).

Intermediate 6 tert-Butyl N-tert-butoxycarbonyl-N-[4-(2-trimethylsilylethynyl)thiazol-2-yl]carbamate

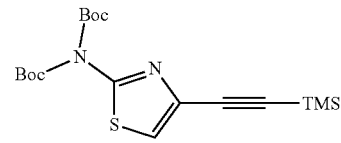 [SMILES: CC(C)(C)OC(=O)N(C(=O)OC(C)(C)C)c1nc(C#C[Si](C)(C)C)cs1]

To a solution of 4-(2-trimethylsilylethynyl)thiazol-2-amine (2.00 g, 10.2 mmol) in DCM (50 mL) di-tert-butyl dicarbonate (4.45 g, 20.4 mmol), Et$_3$N (5.68 mL, 40.8 mmol) and 4-(dimethylamino)pyridine (12.4 mg, 1.02 mmol) were added and the mixture was stirred 5 h at rt. Water (100 mL) was added, and the mixture was extracted with diethyl ether (3×100 mL). The combined organic layers were washed with brine (100 mL), dried over Na$_2$SO$_4$, evaporated and purified by column chromatography (PE/EA=1/0~10/1, Silica-CS 40 g, 40 mL/min, silica gel, UV 254) to give the product (3.60 g, 89%). ESI-MS m/z calcd for [$C_{18}H_{28}N_2O_4SSi$] [M+H]$^+$: 397.2; found: 397.3. $^1$H NMR (400 MHz, CDCl$_3$) δ 7.25-7.18 (m, 1H), 1.45 (d, J=2.8 Hz, 18H), 0.18 (d, J=2.8 Hz, 9H).

6-{3-{4,6-O-Benzylidene-3-{4-[2-(di-tea-butoxycarbonylamino)thiazol-4-yl]-1H-1,2,3-triazol-1-yl}-3-deoxy-β-D-galactopyranosyl}-4H-1,2,4-triazol-4-yl}-2-methylbenzothiazole

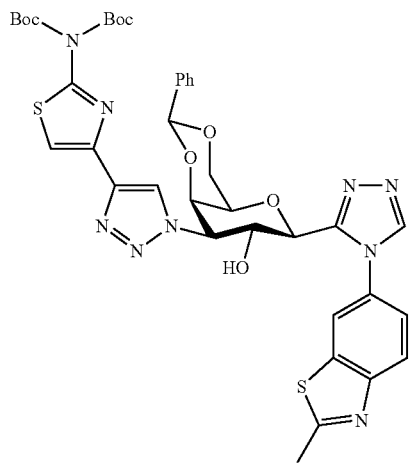

To a solution of 6-[3-(3-azido-4,6-O-benzylidene-3-deoxy-β-D-galactopyranosyl)-4H-1,2,4-triazol-4-yl]-2-methylbenzothiazole (120 mg, 0.24 mmol) in DMF (6 mL) tert-butyl N-tert-butoxycarbonyl-N-[4-(2-trimethylsilylethynyl)thiazol-2-yl]carbamate (145 mg, 0.37 mmol), copper(II) sulfate pentahydrate (30 mg, 0.12 mmol) and (+)-sodium L-ascorbate (24 mg, 0.12 mmol) were added and the mixture was stirred 3 h at rt. The mixture was evaporated and purified by column chromatography (EA/MeOH=50/1~20/1, Silica-CS 20 g, 20 mL/min, silica gel, UV 254) to afford the product (100 mg, 44%). ESI-MS m/z calcd for [$C_{38}H_{41}N_9O_8S_2$] [M+H]$^+$: 816.3; found: 816.1. $^1$H NMR (400 MHz, DMSO-$d_6$) δ 8.92 (s, 1H), 8.29 (d, J=2.4 Hz, 1H), 8.02 (d, J=8.8 Hz, 1H), 7.96 (d, J=3.2 Hz, 1H), 7.76 (s, 1H), 7.69 (dd, J=8.8, 2.4 Hz, 1H), 7.40-7.27 (m, 5H), 5.76 (d, J=6.0 Hz, 1H), 5.56 (s, 1H), 5.24 (dd, J=10.0, 2.8 Hz, 1H), 4.82-4.71 (m, 2H), 4.48 (d, J=3.2 Hz, 1H), 4.19-4.02 (m, 2H), 3.94 (s, 1H), 2.87 (s, 3H), 1.46 (s, 18H).

Intermediate 8

6-{3-{4,6-O-Benzylidene-3-deoxy-3-[4-(2-hydroxythiazol-4-yl)-1H-1,2,3-triazol-1-yl]β-D-galactopyranosyl}-4H-1,2,4-triazol-4-yl}-2-methylbenzothiazole

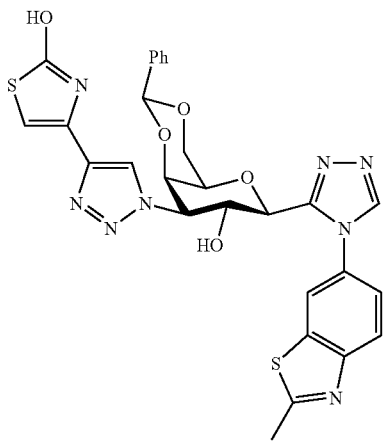

To a solution of 6-[3-(3-azido-4,6-O-benzylidene-3-deoxy-β-D-galactopyranosyl)-4H-1,2,4-triazol-4-yl]-2-methylbenzothiazole (120 mg, 0.24 mmol) in DMF (6 mL) 4-(2-trimethylsilylethynyl)thiazol-2-ol (145 mg, 0.37 mmol), copper(II) sulfate pentahydrate (30 mg, 0.12 mmol) and (+)-sodium L-ascorbate (24 mg, 0.12 mmol) were added and the mixture was stirred 3 h at rt. The mixture was evaporated and purified by column chromatography (EA/MeOH=50/1~20/1, Silica-CS 20 g, 20 mL/min, silica gel, UV 254) to afford the product (50 mg, 29%). ESI-MS m/z calcd for [$C_{28}H_{24}N_8O_5S_2$] [M+H]$^+$: 617.1; found: 617.2. $^1$H NMR (400 MHz, DMSO-$d_6$) δ 11.92 (s, 1H), 8.92 (s, 1H), 8.43 (s, 1H), 8.29 (d, J=2.0 Hz, 1H), 8.07 (d, J=8.8 Hz, 1H), 7.67 (dd, J=8.8, 2.0 Hz, 1H), 7.38-7.33 (m, 6H), 5.69 (d, J=6.8 Hz, 1H), 5.56 (s, 1H), 5.22 (dd, J=10.8, 3.2 Hz, 1H), 4.89-4.84 (m, 1H), 4.65 (d, J=9.2 Hz, 1H), 4.45 (d, J=2.4 Hz, 1H) 4.18-4.07 (m, 2H), 3.92 (s, 1H), 2.86 (s, 3H).

Intermediate 9

N-[5-Chloro-2-(trifluoromethyl)phenyl]acetamide

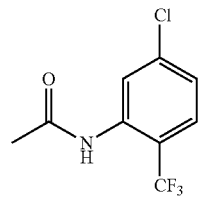

To a solution of 5-chloro-2-(trifluoromethyl)aniline (5.00 g, 25.6 mmol) and pyridine (3.03 g, 38.3 mmol) in DCM (50 mL) acetic anhydride (2.90 mL, 30.7 mmol) was added and the mixture was stirred overnight at rt under a nitrogen atmosphere. The mixture was poured into water (100 mL) and extracted with DCM (2×100 mL). The combined organic layers were washed with water (50 mL) and brine (50 mL), dried over $Na_2SO_4$, concentrated and purified by column chromatography (PE/EA=10/1~1/1, Silica-CS 40 g, 50 mL/min, silica gel, UV 254) to afford the product (2.50 g, 41%). ESI-MS m/z calcd for [$C_9H_7ClF_3NO$] [M+H]$^+$: 238.0; found: 238.2. $^1$H NMR (400 MHz, CDCl$_3$) δ 8.33 (s, 1H), 7.52 (d, J=8.4 Hz, 1H), 7.40 (s, 1H), 7.19 (d, J=8.4 Hz, 1H), 2.22 (s, 3H).

N-[5-Chloro-2-(trifluoromethyl)phenyl]thioacetamide

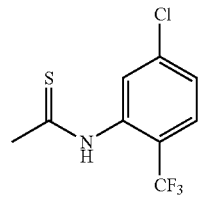

To a solution of N-[5-chloro-2-(trifluoromethyl)phenyl]acetamide (2.50 g, 10.5 mmol) in toluene (20 mL) Lawesson's reagent (2.34 g, 5.79 mmol) was added and the mixture was stirred 2 h at 110° C. The mixture was evaporated and purified by column chromatography (PE/EA=10/1~4/1, Silica-CS 40 g, 50 mL/min, silica gel, UV 254) to afford the product (2.1 g, 79%). ESI-MS m/z calcd for [$C_9H_7ClF_3NS$] [M+H]$^+$: 254.0; found: 254.0. $^1$H NMR (400 MHz, CDCl$_3$) δ 8.52 (s, 1H), 8.09 (s, 1H), 7.64 (d, J=8.4 Hz, 1H), 7.39 (d, J=8.4 Hz, 1H), 2.76 (s, 3H).

Methyl N-[5-chloro-2-(trifluoromethyl)phenyl]ethanimidothioate

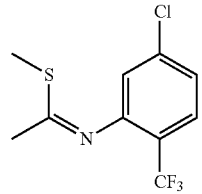 [SMILES: CS/C(C)=N\c1cc(Cl)ccc1C(F)(F)F]

To a solution of N-[5-chloro-2-(trifluoromethyl)phenyl]thioacetamide (2.10 g, 8.28 mmol) in MeCN (40 mL) $K_2CO_3$ (1.70 g, 12.3 mmol) and iodomethane (1.03 mL, 16.6 mmol) were added and the mixture was stirred 2 h at rt under a nitrogen atmosphere. The mixture was concentrated, dissolved in EtOAc and washed with water and brine. The organic phase was dried over $Na_2SO_4$, concentrated and purified by column chromatography (PE/EA=100/1~50/1, Silica-CS 40 g, 50 mL/min, silica gel, UV 254) to afford the product (1.80 g, 81%). ESI-MS m/z calcd for $[C_{10}H_9ClF_3NS]$ $[M+H]^+$: 268.0; found: 268.1. $^1$H NMR (400 MHz, $CDCl_3$) δ 7.52 (d, J=8.4 Hz, 1H), 7.09 (d, J=8.4, 1H), 6.75 (s, 1H), 2.40 (s, 3H), 2.06-1.91 (m, 3H).

1-[3-(3-Azido-4,6-O-benzylidene-3-deoxy-β-D-galactopyranosyl)-5-methyl-4H-1,2,4-triazol-4-yl]-5-chloro-2-(trifluoromethyl)benzene

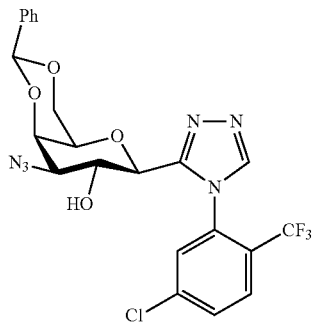

To a solution of 2,6-anhydro-4-azido-5,7-O-benzylidene-4-deoxy-D-glycero-L-manno-heptonohydrazide (335 mg, 1.00 mmol) in DMF (8 mL) methyl-N-[5-chloro-2-(trifluoromethyl)phenyl]ethanimidothioate (321 mg, 1.20 mmol) and p-toluenesulfonic acid monohydrate (38.0 mg, 0.20 mmol) were added and the mixture was stirred 2 h at 160° C. The mixture was concentrated and purified by reverse-phase column (MeCN/water (10 mM $NH_4HCO_3$)=0~45%, C18 40 g, 50 mL/min, UV 254) to afford the product (161 mg, 30%). ESI-MS m/z calcd for $[C_{23}H_{20}ClF_3N_6O_4]$ $[M+H]^+$: 537.1; found: 537.2. $^1$H NMR (400 MHz, DMSO-$d_6$) δ 7.89 (d, J=1.6 Hz, 1H), 7.82 (d, J=8.4 Hz, 1H), 7.52-7.36 (m, 4H), 7.31-7.23 (m, 2H), 5.95-5.63 (m, 1H), 5.51 (s, 1H), 4.39-4.14 (m, 3H), 3.96 (d, J=12.0 Hz, 1H), 3.78 (d, J=12.0 Hz, 1H), 3.55-3.43 (m, 2H), 2.11 (s, 3H).

1-{3-{4,6-O-Benzylidene-3-[4-(4-chlorothiazol-2-yl)-1H-1,2,3-triazol-1-yl]-3-deoxy-β-D-galactopyranosyl}-5-methyl-4H-1,2,4-triazol-4-yl}-5-chloro-2-(trifluoromethyl)benzene

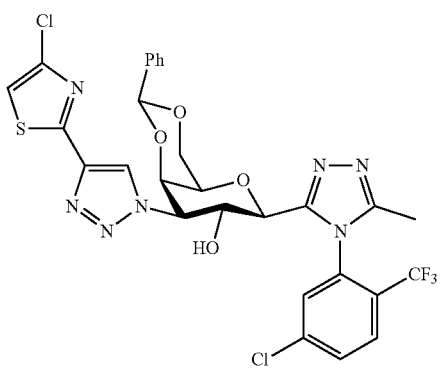

To a solution of 1-[3-(3-azido-4,6-O-benzylidene-3-deoxy-β-D-galactopyranosyl)-5-methyl-4H-1,2,4-triazol-4-yl]-5-chloro-2-(trifluoromethyl)benzene (70.0 mg, 0.13 mmol) and 2-(4-chlorothiazol-2-yl)ethynyl-trimethyl-silane (33.8 mg, 0.16 mmol) in DMF (4.0 mL) copper(II) sulfate pentahydrate (16.3 mg, 0.065 mmol) and (+)-sodium L-ascorbate (38.7 mg, 0.16 mmol) were added and the mixture was stirred overnight at rt. The mixture was evaporated and purified by prep HPLC (MeCN/$H_2O$ (10 mmol/L $NH_4HCO_3$), X-Select 10 μm 19*250 mm, 20 mL/min, UV 254) to afford the product (45 mg, 51%). ESI-MS m/z calcd for $[C_{28}H_{22}Cl_2F_3N_7O_4S]$ $[M+H]^+$: 680.1; found: 680.0. $^1$H NMR (400 MHz, DMSO-$d_6$) δ 8.48 (s, 1H), 7.96 (s, 1H), 7.92 (d, J=8.8 Hz, 1H), 7.79 (s, 1H), 7.56 (d, J=8.4 Hz, 1H), 7.43-7.34 (m, 3H), 7.27-7.18 (m, 2H), 5.72 (d, J=6.4 Hz, 1H), 5.45 (s, 1H), 5.23 (dd, J=10.8, 2.4 Hz, 1H), 4.83-4.72 (m, 1H), 4.55 (d, J=9.2 Hz, 1H), 4.43 (d, J=2.0 Hz, 1H), 4.01 (d, J=12.4 Hz, 1H), 3.83 (d, J=12.4 Hz, 1H), 3.71 (s, 1H), 2.15 (s, 3H).

Intermediate 10

(2-methyl-1,3-benzothiazol-6-yl)hydrazine

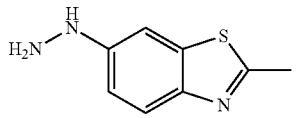

To a solution of 2-methyl-1,3-benzothiazol-6-amine (3.0 g, 18.3 mmol) in water (50 mL) hydrochloric acid (50 mL, 33% w/w) and AcOH (15 mL) were added. A solution $NaNO_2$ (1.51 g, 21.9 mmol) in water (50 mL) was added dropwise at −10° C. and the resulting mixture was stirred 2 h under nitrogen atmosphere at −10° C. Tin(II) chloride dihydrate (8.24 g, 36.5 mmol) was added by small portions at −10° C. The resulting mixture was stirred 2 h under nitrogen atmosphere at −10° C. Then $NaHCO_3$ (300 mL, 5% w/w) was added at 0 C. Water (200 mL) and DCM (100 mL) were added and the phases were separated. The aqueous phase was extracted with DCM (2×100 mL), and the combined organic phases were washed with water (50 mL) and brine (50 mL), dried over $Na_2SO_4$ and evaporated to afford the product (2.30 g, 70%). ESI-MS m/z calcd for $[C_8H_9N_3S]$ $[M+H]^+$: 180.1; found: 180.1. $^1$H NMR (400 MHz, DMSO-$d_6$) δ 7.66 (d, J=8.8 Hz, 1H), 7.35 (d, J=2.0 Hz, 1H), 7.03 (s, 1H), 6.93 (dd, J=8.8, 2.0 Hz, 1H), 4.22 (s, 2H), 2.75 (s, 3H).

2,6-Anhydro-4-azido-5,7-O-benzylidene-4-deoxy-D-glycero-L-manno-heptonamide

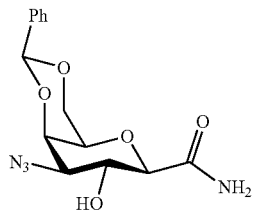

To a solution of methyl 2,6-anhydro-4-azido-5,7-O-benzylidene-4-deoxy-D-glycero-L-manno-heptonate (4.8 g, 14.3 mmol) in MeOH (50 mL) NH₃ (30 mL, 7 M in MeOH) was added and the mixture was stirred 3 h under nitrogen atmosphere at 50° C. The mixture was evaporated to afford the product (4.0 g, 87%). ESI-MS m/z calcd for [C₁₄H₁₆N₄O₅] [M+NH₄]⁺: 338.1; found: 338.2. ¹H NMR (400 MHz, Methanol-d₄) δ 7.53-7.50 (m, 2H), 7.40-7.34 (m, 3H), 5.68 (s, 1H), 4.38 (d, J=2.4 Hz, 1H), 4.28-4.25 (m, 2H), 4.08-4.03 (m, 1H), 3.79 (d, J=7.2 Hz, 1H), 3.65 (d, J=1.2 Hz, 1H), 3.45 (dd, J=10.4, 3.6 Hz, 1H), 1.93 (s, 2H).

6-[5-(3-Azido-4,6-O-benzylidene-3-deoxy-β-D-galactopyranosyl)-3-methyl-1H-1,2,4-triazol-1-yl]-2-methylbenzothiazole

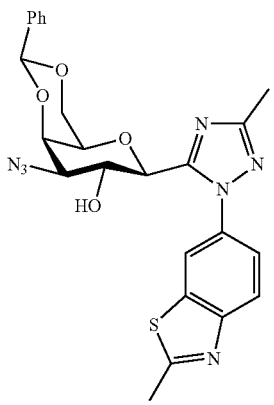

To a solution of 2,6-anhydro-4-azido-5,7-O-benzylidene-4-deoxy-D-glycero-L-manno-heptonamide (3.20 g, 9.99 mmol) in 1,4-dioxane (50 mL) N,N-dimethylformamide dimethyl acetal (1.25 g, 10.5 mmol) was added and the mixture was stirred 3 h under nitrogen atmosphere at 50° C. The mixture was evaporated and dissolved in acetonitrile (15 mL) and acetic acid (15 mL). (2-Methyl-1,3-benzothiazol-6-yl)hydrazine (1.79 g, 9.99 mmol) was added and the mixture was stirred 3 h under nitrogen atmosphere at 80° C. The mixture was evaporated and partitioned between water (100 mL) and DCM (100 mL). The aqueous phase was extracted with DCM (2×50 mL), and the combined organic phases were washed with water (50 mL) and brine (3×50 mL), dried over Na₂SO₄ and evaporated. The residue was purified by column chromatography (PE/EA=10/1~0/1, Silica-CS 40 g, 40 mL/min, silica gel, UV 254) to afford the product (1.50 g, 30%). ESI-MS m/z calcd for [C₂₄H₂₃N₇O₄S] [M+H]⁺: 506.2; found: 506.3. ¹H NMR (400 MHz, Methanol-d₄) δ 8.04 (d, J=2.0 Hz, 1H), 7.98 (d, J=8.8 Hz, 1H), 7.61 (dd, J=5.2, 2.0 Hz, 1H), 7.50-7.48 (m, 2H), 7.37-7.33 (m, 3H), 5.57 (s, 1H), 4.84 (t, J=9.6 Hz, 1H), 4.40 (d, J=9.2 Hz, 1H), 4.29 (d, J=2.8 Hz, 1H), 4.05-3.97 (m, 2H), 3.45-3.42 (m, 2H), 2.87 (s, 3H), 2.46 (s, 3H).

6-{5-{4,6-O-Benzylidene-3-deoxy-3-[4-(2-thiazolyl)-1H-1,2,3-triazol-1-yl]β-D-galactopyranosyl}-3-methyl-1H-1,2,4-triazol-1-yl}-2-methylbenzothiazole

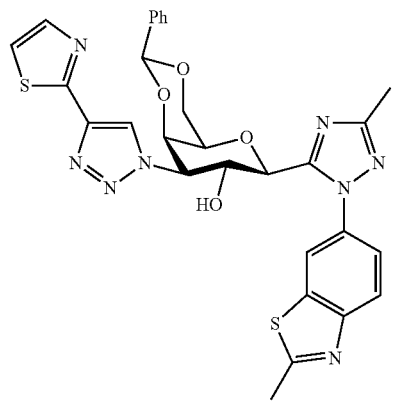

To a solution of 6-[5-(3-azido-4,6-O-benzylidene-3-deoxy-β-D-galactopyranosyl)-3-methyl-1H-1,2,4-triazol-1-yl]-2-methylbenzothiazole (180 mg, 0.36 mmol) in DMF (3 mL) trimethyl(2-thiazol-2-ylethynyl)silane (96.8 mg, 0.53 mmol), copper(II) sulfate pentahydrate (44.5 mg, 0.18 mmol) and (+)-sodium L-ascorbate (35.3 mg, 0.18 mmol) were added and the mixture was stirred 3 h at rt. The mixture was partitioned between water (50 mL) and DCM (50 mL), and the aqueous phase was extracted with DCM (2×50 mL). The combined organic phases were washed with water (50 mL) and brine (50 mL), dried over anhydrous sodium sulphate, evaporated and purified by column chromatography (PE/EA=10/1~1/1, Silica-CS 20 g, 20 mL/min, silica gel, UV 254) to afford the product (150 mg, 69%). ESI-MS m/z calcd for [C₂₉H₂₆N₈O₄S₂] [M+H]⁺: 615.2; found: 614.8. ¹H NMR (400 MHz, CDCl₃) δ 8.48 (s, 1H), 8.03 (dd, J=11.2, 1.6 Hz, 2H), 7.80 (d, J=2.8 Hz, 1H), 7.6 (dd, J=8.4, 2.0 Hz, 1H), 7.38-7.30 (m, 6H), 5.47 (s, 1H), 5.20-5.11 (m, 2H), 4.67 (t, J=8.8 Hz, 1H), 4.55 (d, J=2.0 Hz, 1H), 4.16-4.03 (m, 2H), 3.69 (s, 1H), 2.88 (s, 3H), 2.44 (s, 3H).

Intermediate 11

4-Methyl-2-((trimethylsilyl)ethynyl)thiazole

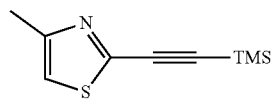

To a solution of 2-bromo-4-methylthiazole (300 mg, 1.68 mmol) in THF (5 mL) ethynyl(trimethyl)silane (248 mg, 2.53 mmol), CuI (16 mg, 0.084 mmol) and bis(triphenylphosphine)palladium(II) chloride (59.1 mg, 0.084 mmol) and Et₃N (0.47 mL, 3.37 mmol) were added and the mixture was stirred 2 h at 60° C. under a nitrogen atmosphere. The mixture was diluted with water (20 mL) and extracted with EA (3×20 mL). The organic phases were washed with brine, dried over MgSO₄, concentrated and purified by column chromatography (PE/EA=20/1~10/1, Silica-CS 40 g, 50 mL/min, silica gel, UV 254) to afford the product (225 mg, 68%). ¹H NMR (400 MHz, CDCl₃) δ 6.87 (s, 1H), 2.45 (s, 3H), 0.26 (s, 9H).

1-{3-{4,6-O-Benzylidene-3-deoxy-3-[4-(4-methyl-thiazol-2-yl)-1H-1,2,3-triazol-1-yl]-β-D-galactopyranosyl}-5-methyl-4H-1,2,4-triazol-4-yl}-5-chloro-2-(trifluoromethyl)benzene

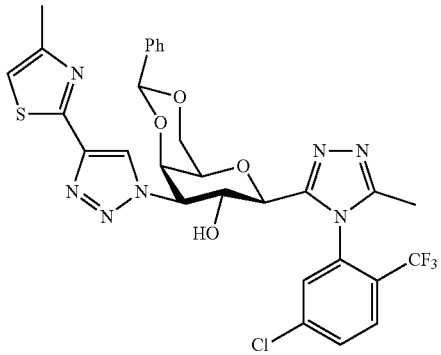

To a solution of 1-[3-(3-azido-4,6-O-benzylidene-3-deoxy-β-D-galactopyranosyl)-5-methyl-4H-1,2,4-triazol-4-yl]-5-chloro-2-(trifluoromethyl)benzene (88 mg, 0.16 mmol) and 4-methyl-2-((trimethylsilyl)ethynyl)thiazole (38.2 mg, 0.20 mmol) in DMF (3.0 mL) copper(II) sulfate pentahydrate (16.3 mg, 0.065 mmol) and (+)-sodium L-ascorbate (25.8 mg, 0.13 mmol) were added and the mixture was stirred 4 h at rt. The mixture was diluted with water (20 mL) and extracted with EtOAc (3×20 mL). The combined organic phases were washed with brine (20 mL), dried over Na₂SO₄, evaporated and purified by column chromatography (EA/MeOH=100/1~50/1, Silica-CS 20 g, 20 mL/min, silica gel, UV 254) to afford the product (42 mg, 49%). ESI-MS m/z calcd for [C₂₉H₂₅ClF₃N₇O₄S] [M+H]⁺: 660.1; found: 660.1. ¹H NMR (400 MHz, CDCl₃) δ 8.36 (s, 1H), 7.77 (d, J=8.8 Hz, 1H), 7.60 (d, J=8.4 Hz, 1H), 7.57 (s, 1H), 7.27-7.22 (m, 5H), 6.81 (s, 1H), 6.32 (s, 1H), 5.08-4.98 (m, 2H), 4.42 (s, 1H), 4.37 (d, J=8.0 Hz, 1H), 3.90-3.74 (m, 2H), 3.37-3.35 (m, 1H), 2.42 (s, 3H), 2.20 (s, 3H).

Intermediate 12

1-{3-{4,6-O-Benzylidene-3-deoxy-3-[4-(2-hydroxythiazol-4-yl)-1H-1,2,3-triazol-1-yl]β-D-galactopyranosyl}-5-methyl-4H-1,2,4-triazol-4-yl}-5-chloro-2-(trifluoromethyl)benzene

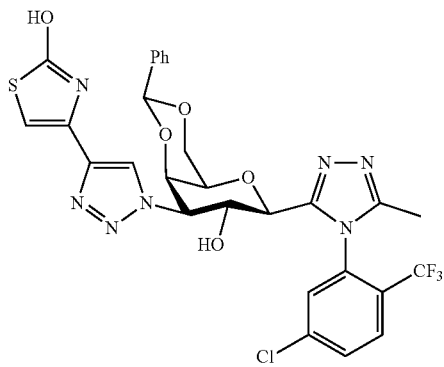

To a solution of 1-[3-(3-azido-4,6-O-benzylidene-3-deoxy-β-D-galactopyranosyl)-5-methyl-4H-1,2,4-triazol-4-yl]-5-chloro-2-(trifluoromethyl)benzene (88 mg, 0.16 mmol) in DMF (4.0 mL) 4-(2-trimethylsilylethynyl)thiazol-2-ol (97.5 mg, 0.49 mmol), copper(II) sulfate pentahydrate (13.6 mg, 0.055 mmol) and (+)-sodium L-ascorbate (32.5 mg, 0.16 mmol) were added and the mixture was stirred 4 h at rt. The mixture was diluted with water (20 mL) and extracted with EtOAc (3×20 mL). The combined organic phases were washed with brine, dried over Na₂SO₄, evaporated and purified by prep HPLC (MeCN/H₂O (10 mmol/L NH₄HCO₃), X-Select 10 μm 19*250 mm, 20 mL/min, UV 254) to afford the product (30 mg, 28%). ESI-MS m/z calcd for [C₂₈H₂₃ClF₃N₇O₅S] [M+H]⁺: 662.1; found: 662.0. ¹H NMR (400 MHz, Methanol-d₄) δ 8.22 (s, 1H), 7.90 (d, J=8.4 Hz, 1H), 7.86 (d, J=2.0 Hz, 1H), 7.59 (d, J=8.4 Hz, 1H), 7.42-7.29 (m, 5H), 6.63 (s, 1H), 5.46 (s, 1H), 5.13-5.07 (m, 1H), 4.97-4.91 (m, 1H), 4.51 (d, J=9.2 Hz, 1H), 4.44 (d, J=3.2 Hz, 1H), 4.09-3.99 (m, 2H), 3.65 (s, 1H), 2.26 (s, 3H).

Intermediate 13

Trimethyl[2-(2-methylthiazol-4-yl)ethynyl]silane

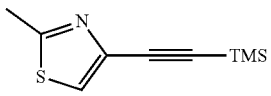

To a solution of 4-bromo-2-methylthiazole (200 mg, 1.12 mmol) and trimethylsilylacetylene (331 mg, 3.37 mmol) in THF (10.0 mL) bis(triphenylphosphine)palladium(II) chloride (39.4 mg, 0.056 mmol), (oxydi-2,1-phenylene)bis(diphenylphosine) (30.2 mg, 0.056 mmol), CuI (10.7 mg, 0.056 mmol) and DIPEA (0.961 mL, 5.62 mmol) were added and the mixture was stirred overnight at 50° C. under a nitrogen atmosphere. The mixture was evaporated and purified by column chromatography (PE/EA=10/1~5/1, Silica-CS 12 g, 20 mL/min, silica gel, UV 254) to afford the product (120 mg, 55%). ESI-MS m/z calcd for [C₉H₁₃NSSi] [M+H]⁺: 196.1; found: 196.1. ¹H NMR (400 MHz, CDCl₃) δ 7.25 (s, 1H), 2.63 (s, 3H), 0.18 (s, 9H).

6-{5-{4,6-O-Benzylidene-3-deoxy-3-[4-(2-methyl-thiazol-4-yl)-1H-1,2,3-triazol-1-yl]β-D-galactopyranosyl}-3-methyl-1H-1,2,4-triazol-1-yl}-2-methyl-benzothiazole

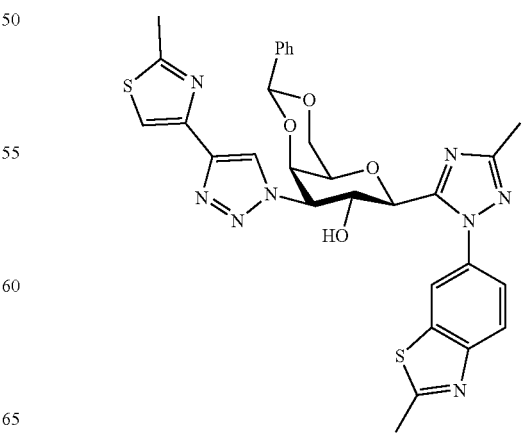

To a solution of 6-[5-(3-azido-4,6-O-benzylidene-3-deoxy-β-D-galactopyranosyl)-3-methyl-1H-1,2,4-triazol-1-yl]-2-methylbenzothiazole (150 mg, 0.30 mmol) and trimethyl-[2-(2-methylthiazol-4-yl)ethynyl]silane (96.0 mg, 0.49 mmol) in DMF (4.0 mL) copper(II) sulfate pentahydrate (37.0 mg, 0.15 mmol) and (+)-sodium L-ascorbate (88.2 mg, 0.45 mmol) were added and the mixture was stirred overnight at rt. The mixture was filtered and purified by prep HPLC (MeCN/H$_2$O (10 mmol/L NH$_4$HCO$_3$), X-Select 10 μm 19*250 mm, 20 mL/min, UV 254) to afford the product (160 mg, 86%). ESI-MS m/z calcd for [C$_{30}$H$_{28}$N$_8$O$_4$S2] [M+H]$^+$: 629.2; found: 629.2. $^1$H NMR (400 MHz, CDCl$_3$) δ 8.22 (s, 1H), 7.98 (d, J=2.0 Hz, 1H), 7.92 (d, J=8.8 Hz, 1H), 7.58 (dd, J=8.8, 2.0 Hz, 1H), 7.53 (s, 1H), 7.34-7.22 (m, 5H), 5.38 (s, 1H), 5.17-5.00 (m, 2H), 4.60 (d, J=8.4 Hz, 1H), 4.45 (d, J=2.0 Hz, 1H), 4.08 (d, J=12.4 Hz, 1H), 3.97 (d, J=12.4 Hz, 1H), 3.62 (s, 1H), 2.80 (s, 3H), 2.65 (s, 3H), 2.36 (s, 3H).

Intermediate 14

Trimethyl(2-thiazol-5-ylethynyl)silane

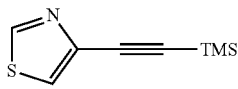

To a solution of 5-bromothiazole (328 mg, 2.00 mmol) in THF (10 mL) ethynyl(trimethyl)silane (393 mg, 4.00 mmol), Et$_3$N (0.836 mL, 6.00 mmol), bis(triphenylphosphine)palladium(II) chloride (73.0 mg, 0.10 mmol) and CuI(38.1 mg, 0.20 mmol) were added at 0° C. and the mixture was stirred under a nitrogen atmosphere overnight at rt. The mixture was poured into water (20 mL) and extracted with EtOAc (2×20 mL). The organic layers were washed with water (20 mL), brine (20 mL), dried over Na$_2$SO$_4$, concentrated and purified by column chromatography (PE/EA=20/1~10/1, Silica-CS 12 g, 20 mL/min, silica gel, UV 254) to afford the product (200 mg, 55%). $^1$H NMR (400 MHz, CDCl$_3$) δ 8.71 (s, 1H), 8.01 (s, 1H), 0.26 (s, 9H).

6-{5-{4,6-O-Benzylidene-3-deoxy-3-[4-(5-thiazolyl)-1H-1,2,3-triazol-1-yl]β-D-galactopyranosyl}-3-methyl-1H-1,2,4-triazol-1-yl}-2-methylbenzothiazole

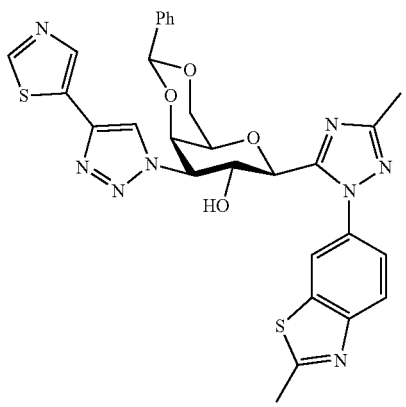

To a solution of 6-[5-(3-azido-4,6-O-benzylidene-3-deoxy-β-D-galactopyranosyl)-3-methyl-1H-1,2,4-triazol-1-yl]-2-methylbenzothiazole (173 mg, 0.34 mmol) in DMF (4.0 mL) trimethyl(2-thiazol-5-ylethynyl)silane (200 mg, 1.10 mmol), copper(II) sulfate pentahydrate (23.5 mg, 0.084 mmol) and (+)-sodium L-ascorbate (55.9 mg, 0.28 mmol) were added and the mixture was stirred 4 h at rt. The mixture was diluted with water (20 mL) and extracted with EtOAc (3×10 mL). The combined organic phases were washed with brine (50 mL), dried over Na$_2$SO$_4$, evaporated and purified by column chromatography (PE/EA=10/1~1/1, Silica-CS 4 g, 20 mL/min, silica gel, UV 254) to afford the product (130 mg, 75%). ESI-MS m/z calcd for [C$_{29}$H$_{26}$N$_8$O$_4$S$_2$][M+H]$^+$: 615.2; found: 615.2. $^1$H NMR (400 MHz, CDCl$_3$) δ 8.79 (s, 1H), 8.24-7.91 (m, 4H), 7.65 (dd, J=8.8, 2.0 Hz, 1H), 7.44-7.32 (m, 5H), 5.47 (s, 1H), 5.18-5.07 (m, 2H), 4.61 (d, J=8.4 Hz, 1H), 4.51 (s, 1H), 4.21-4.02 (m, 2H), 3.87 (d, J=2.8 Hz, 1H), 3.68 (s, 1H), 2.90 (s, 3H), 2.46 (s, 3H).

Intermediate 15

1-[5-(3-Azido-4,6-O-benzylidene-3-deoxy-β-D-galactopyranosyl)-3-methyl-1H-1,2,4-triazol-1-yl]-5-chloro-2-(trifluoromethyl)benzene

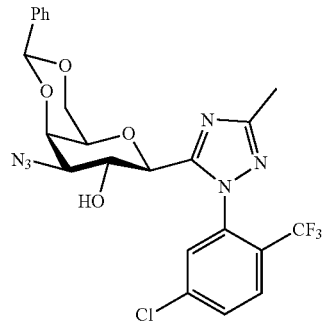

To a solution of 2,6-anhydro-4-azido-5,7-O-benzylidene-4-deoxy-D-glycero-L-manno-heptonamide (400 mg, 1.25 mmol) in 1,4-dioxane (10 mL) N,N-dimethylformamide dimethyl acetal (156 mg, 1.31 mmol) was added and the mixture was stirred 3 h at 50° C. The mixture was evaporated, and the residue was dissolved in MeCN (10.0 mL) and acetic acid (4.0 mL). To the solution [5-chloro-2-(trifluoromethyl)phenyl]hydrazine (333 mg, 1.58 mmol) was added and the mixture was stirred 2 h at 100° C. The mixture was concentrated and partitioned between water (20 mL) and DCM (20 mL). The aqueous phase was extracted with DCM (2×20 mL). The combined organic phases were washed with water (20 mL) and brine (20 mL), dried over Na$_2$SO$_4$, evaporated and purified by column chromatography (PE/EA=3/1~1/2, Silica-CS 12 g, 20 mL/min, silica gel, UV 254) to afford the product (400 mg, 30%, purity 50%). ESI-MS m/z calcd for [C$_{23}$H$_{20}$ClF$_3$N$_6$O$_4$] [M+H]$^+$: 537.1; found: 536.8.

1-{3-{4,6-O-Benzylidene-3-{4-[2-(di-tert-butoxycar-bonylamino)thiazol-4-yl]-1H-1,2,3-triazol-1-yl}-3-deoxy-β-D-galactopyranosyl}-3-methyl-1H-1,2,4-triazol-1-yl}-5-chloro-2-(trifluoromethyl)benzene

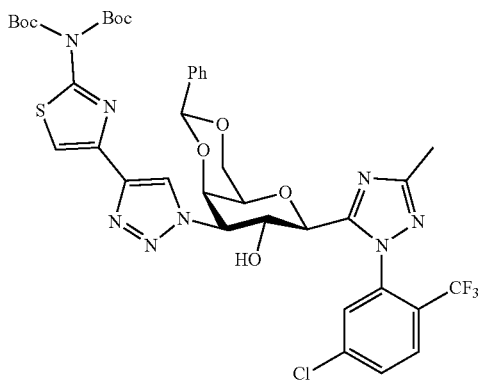

To a solution of 1-[5-(3-azido-4,6-O-benzylidene-3-deoxy-β-D-galactopyranosyl)-3-methyl-1H-1,2,4-triazol-1-yl]-5-chloro-2-(trifluoromethyl)benzene (200 mg, 50% purity, 0.19 mmol) in DMF (3 mL) tert-butyl N-tert-butoxycarbonyl-N-[4-(2-trimethylsilylethynyl)thiazol-2-yl]carbamate (96 mg, 0.24 mmol), copper(II) sulfate pentahydrate (37 mg, 0.19 mmol) and (+)-sodium L-ascorbate (46.6 mg, 0.19 mmol) were added and the mixture was stirred 3 h at rt. The mixture was evaporated and purified by column chromatography (DCM/MeOH=20/1, Silica-CS 12 g, 20 mL/min, silica gel, UV 254) to afford the product (72 mg, 44%). ESI-MS m/z calcd for [$C_{38}H_{40}ClF_3N_8O_8S$] [M+H]$^+$: 861.2; found: 861.2. $^1$H NMR (400 MHz, CDCl$_3$) δ 7.99 (s, 1H), 7.64-7.50 (m, 4H), 7.25-7.20 (m, 5H), 5.30 (s, 1H), 5.05 (dd, J=10.8, 7.2 Hz, 1H), 4.73-4.72 (m, 1H), 4.54-4.47 (m, 2H), 4.38 (d, J=2.4 Hz, 1H), 3.88-3.66 (m, 2H), 3.48 (s, 1H), 2.35 (s, 3H), 1.40 (s, 18H).

Intermediate 16

1-{3-{4,6-O-Benzylidene-3-[4-(4-chlorothiazol-2-yl)-1H-1,2,3-triazol-1-yl]-3-deoxy-β-D-galactopyranosyl}-3-methyl-1H-1,2,4-triazol-1-yl}-5-chloro-2-(trifluoromethyl)benzene

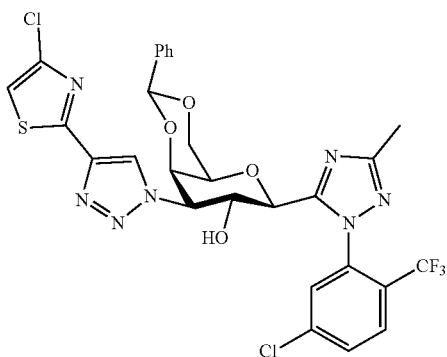

To a solution of 1-[5-(3-azido-4,6-O-benzylidene-3-deoxy-β-D-galactopyranosyl)-3-methyl-1H-1,2,4-triazol-1-yl]-5-chloro-2-(trifluoromethyl)benzene (200 mg, 50% purity, 0.19 mmol) in DMF (3 mL) 2-(4-chlorothiazol-2-yl)ethynyl-trimethyl-silane (60.3 mg, 0.28 mmol), copper(II) sulfate pentahydrate (37 mg, 0.19 mmol) and (+)-sodium L-ascorbate (46.6 mg, 0.19 mmol) were added and the mixture was stirred 3 h at rt. The mixture was evaporated and purified by column chromatography (DCM/MeOH=20/1, Silica-CS 12 g, 20 mL/min, silica gel, UV 254) to afford the product (77 mg, 61%). ESI-MS m/z calcd for [$C_{28}H_{22}Cl_2F_3N_7O_4S$] [M+H]$^+$: 680.1; found: 680.0. $^1$H NMR (400 MHz, CDCl$_3$) δ 8.32 (s, 1H), 7.66-7.52 (m, 3H), 7.25-7.20 (m, 5H), 7.01 (s, 1H), 5.30 (s, 1H), 5.03 (dd, J=10.8, 3.2 Hz, 1H), 4.77-4.68 (m, 2H), 4.50 (d, J=8.8 Hz, 1H), 4.42 (d, J=2.8 Hz, 1H), 3.88-3.64 (m, 2H), 3.48 (s, 1H), 2.35 (s, 3H).

Intermediate 17

Methyl 2,6-anhydro-4-azido-5,7-O-benzylidene-4-deoxy-3-O-methyl-D-glycero-L-manno-heptonate

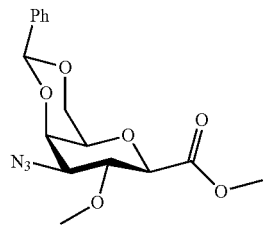

To a solution methyl 2,6-anhydro-4-azido-5,7-O-benzylidene-4-deoxy-D-glycero-L-manno-heptonate (1.0 g, 2.98 mmol) in DMF (20 mL) iodomethane (1.27 g, 8.95 mmol) and cesium carbonate (1.94 g, 5.96 mmol) were added and the mixture was stirred 3 h at rt under nitrogen atmosphere. The mixture was partitioned between water (100 mL) and DCM (100 mL) and the aqueous phase was extracted with DCM (2×100 mL). The combined organic phases were washed with water (50 mL) and brine (50 mL), dried over Na$_2$SO$_4$, evaporated and purified by column chromatography (PE/EA=10/1~1/3, Silica-CS 40 g, 40 mL/min, silica gel, UV 254) to afford the product (800 mg, 77%). ESI-MS m/z calcd for [$C_{16}H_{19}N_3O_6$] [M+NH$_4$]$^+$: 367.1; found: 367.2. $^1$H NMR (400 MHz, CDCl$_3$) δ 7.48-7.45 (m, 2H), 7.34-7.28 (m, 3H), 5.50 (s, 1H), 4.28-4.20 (m, 2H), 3.99-3.89 (m, 2H), 3.79 (s, 1H), 3.77 (s, 3H), 3.51 (s, 3H), 3.40 (d, J=1.2 Hz, 1H), 3.35 (dd, J=9.6, 3.2 Hz, 1H).

Methyl 2,6-anhydro-5,7-O-benzylidene-4-[4-(4-chlorothiazol-2-yl)-1H-1,2,3-triazol-1-yl]-4-deoxy-3-O-methyl-D-glycero-L-manno-heptonate

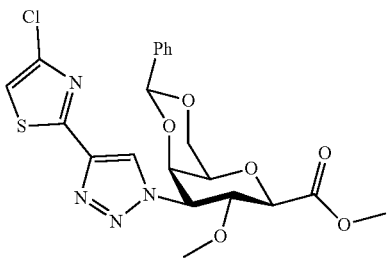

To a solution of methyl 2,6-anhydro-4-azido-5,7-O-benzylidene-4-deoxy-3-O-methyl-D-glycero-L-manno-heptonate (800 mg, 2.29 mmol) in DMF (10 mL) 2-(4-chlorothiazol-2-yl)ethynyl-trimethyl-silane (741 mg, 3.44 mmol), copper(II) sulfate pentahydrate (286 mg, 1.12 mmol) and (+)-sodium L-ascorbate (46.6 mg, 1.12 mmol) were added and the mixture was stirred 3 h at rt. The mixture was partitioned between water (50 mL) and DCM (50 mL) and the aqueous phase was extracted with DCM (2×50 mL). The combined organic phases were washed with water (50 mL) and brine (3×50 mL), dried over $Na_2SO_4$, evaporated and purified by column chromatography (PE/EA=10/1~1/1, Silica-CS 20 g, 20 mL/min, silica gel, UV 254) to afford the product (900 mg, 80%). ESI-MS m/z calcd for $[C_{21}H_{21}ClN_4O_6S]$ $[M+H]^+$: 493.1; found: 493.1. $^1$H NMR (400 MHz, $CDCl_3$) δ 8.36 (s, 1H), 7.41-7.33 (m, 5H), 7.03 (s, 1H), 5.42 (s, 1H), 4.99 (dd, J=9.2, 3.2 Hz, 1H), 4.35-4.32 (m, 2H), 4.22 (dd, J=10.4, 9.2 Hz, 1H), 4.02-3.96 (m, 2H), 3.78 (s, 3H), 3.64 (d, J=0.8 Hz, 1H), 3.01 (s, 3H).

2,6-Anhydro-5,7-O-benzylidene-4-[4-(4-chlorothiazol-2-yl)-1H-1,2,3-triazol-1-yl]-4-deoxy-3-O-methyl-D-glycero-L-manno-heptonohydrazide

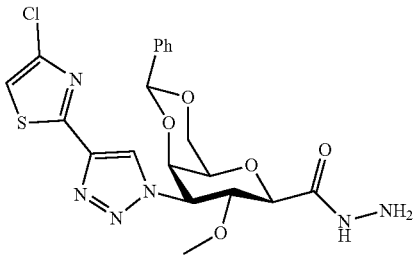

To a solution of methyl 2,6-anhydro-5,7-O-benzylidene-4-[4-(4-chlorothiazol-2-yl)-1H-1,2,3-triazol-1-yl]-4-deoxy-3-O-methyl-D-glycero-L-manno-heptonate (900 mg, 1.83 mmol) in EtOH (50 mL) hydrazine hydrate (0.44 mL, 9.13 mmol) was added and the mixture was stirred overnight at 80° C. The mixture was concentrated purified by prep HPLC (MeCN/$H_2O$ (10 mmol/L $NH_4HCO_3$), X-Select 10 μm 19*250 mm, 20 mL/min, UV 254) to afford the product (800 mg, 89%). ESI-MS m/z calcd for $[C_{20}H_{21}ClN_6O_5S]$ $[M+H]^+$: 493.1; found: 493.1. $^1$H NMR (400 MHz, DMSO-$d_6$) δ 9.57 (s, 1H), 8.91 (s, 1H), 7.80 (s, 1H), 7.42-7.37 (m, 5H), 5.57 (s, 1H), 5.28 (dd, J=10.8, 3.2 Hz, 1H), 4.52-4.44 (m, 4H), 4.14-4.05 (m, 2H), 3.84-3.81 (m, 2H), 3.06 (s, 3H).

1-{3-{4,6-O-Benzylidene-3-[4-(4-chlorothiazol-2-yl)-1H-1,2,3-triazol-1-yl]-3-deoxy-2-O-methyl-β-D-galactopyranosyl}-5-methyl-4H-1,2,4-triazol-4-yl}-5-chloro-2-(trifluoromethyl)benzene

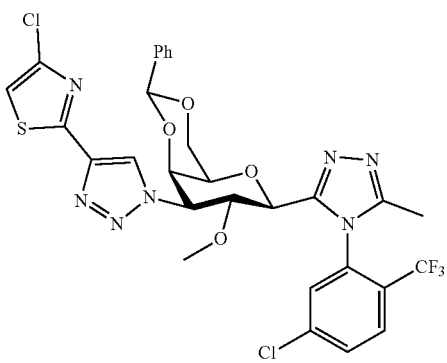

To a solution of 2,6-anhydro-5,7-O-benzylidene-4-[4-(4-chlorothiazol-2-yl)-1H-1,2,3-triazol-1-yl]-4-deoxy-3-O-methyl-D-glycero-L-manno-heptonohydrazide (400 mg, 0.81 mmol) in DMF (5 mL) methyl-N-[5-chloro-2-(trifluoromethyl)phenyl]ethanimidothioate (239 mg, 0.89 mmol) and p-toluenesulfonic acid monohydrate (15.4 mg, 0.089 mmol) were added and the mixture was stirred 90 min at 125° C. The mixture was cooled to rt and purified by prep HPLC (MeCN/$H_2O$ (10 mmol/L $NH_4HCO_3$), X-Select 10 μm 19*250 mm, 20 mL/min, UV 254) to afford the product (100 mg, 18%). ESI-MS m/z calcd for $[C_{29}H_{24}Cl_2F_3N_7O_4S]$ $[M+H]^+$: 694.1; found: 694.0. $^1$H NMR (400 MHz, Chloroform-d) δ 8.37 (s, 1H), 7.76 (d, J=8.4 Hz, 1H), 7.53 (d, J=10.4 Hz, 1H), 7.45 (s, 1H), 7.35 (s, 5H), 7.03 (s, 1H), 5.36 (s, 1H), 4.92 (dd, J=10.4, 3.2 Hz, 1H), 4.76 (t, J=9.6 Hz, 1H), 4.26 (d, J=2.8 Hz, 1H), 4.13-3.91 (m, 3H), 3.33 (s, 1H), 3.12 (s, 3H), 2.20 (s, 3H).

Intermediate 18

5-Chloro-2-cyclopropyl-3-nitropyridine

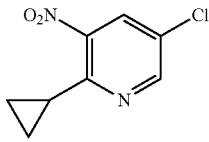 [SMILES: O=[N+]([O-])c1cc(Cl)cnc1C1CC1]

To a solution of 2,5-dichloro-3-nitropyridine (6.0 g, 31.1 mmol) in 1,4-dioxane (120 mL) and $H_2O$ (24 mL) potassium cyclopropyltrifluoroborate (7.36 g, 46.6 mmol), $K_2CO_3$ (12.9 g, 93.3 mmol) and [1,1'-bis(diphenylphosphino)ferrocene]dichloropalladium(II) (1.14 g, 1.55 mmol) were added and the mixture was stirred 16 h at 100° C. under nitrogen atmosphere. The mixture was partitioned between water (100 mL) and DCM (100 mL) and the aqueous phase was extracted with DCM (2×100 mL). The combined organic phases were washed with water (100 mL) and brine (50 mL), dried over $Na_2SO_4$, evaporated and purified by column chromatography (PE/EA=10/1~2/1, Silica-CS 80 g, 40 mL/min, silica gel, UV 254) to afford the product (3.3 g, 53%). $^1$H NMR (400 MHz, $CDCl_3$) δ 8.50 (d, J=2.0 Hz, 1H), 8.06 (d, J=2.4 Hz, 1H), 2.67-2.60 (m, 1H), 1.19-1.06 (m, 4H).

5-Chloro-2-cyclopropylpyridin-3-amine

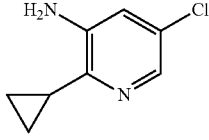 [SMILES: Nc1cc(Cl)cnc1C1CC1]

To a solution of 5-chloro-2-cyclopropyl-3-nitropyridine (3.3 g, 16.6 mmol) in EtOH (100 mL) iron (4.64 g, 8.31 mmol) and $NH_4Cl$ (4.44 g, 8.31 mmol) were added and the mixture was stirred 16 h at rt under hydrogen atmosphere. The mixture was filtered and evaporated to afford the product (2.00 g, 71%). ESI-MS m/z calcd for $[C_8H_9ClN_2]$ $[M+H]^+$: 169.0; found: 169.0. $^1$H NMR (400 MHz, DMSO-d₆) δ 7.57 (d, J=2.0 Hz, 1H), 6.91 (d, J=2.4 Hz, 1H), 2.06-1.99 (m, 1H), 0.85-0.77 (m, 4H).

(5-Chloro-2-cyclopropyl-3-pyridyl)hydrazine

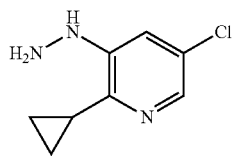 [SMILES: NNc1cc(Cl)cnc1C1CC1]

To a solution of 5-chloro-2-cyclopropylpyridin-3-amine (450 mg, 2.67 mmol) in water (7 mL) H₂SO₄ (7 mL, 98% w/w) was added. A solution of NaNO₂ (552 mg, 8.01 mmol) in water (2 mL) was added dropwise at −15° C. and the resulting mixture was stirred 2 h under nitrogen atmosphere at −15° C. Then tin(II) chloride dihydrate (3.61 g, 1.60 mmol) was added by small portion at −15° C. and the mixture was stirred 2 h under nitrogen atmosphere at −15° C. NaOH (50 mL, 5 M) was added at −15° C. followed by water (50 mL) and DCM (50 mL). The phases were separated, and the aqueous phase was extracted with DCM (2×50 mL). The combined organic phases were washed with brine (50 mL), dried over Na₂SO₄ and evaporated to afford the product (230 mg, 47%). ESI-MS m/z calcd for [C₈H₁₀ClN₃] [M+H]⁺: 184.1; found: 184.3. ¹H NMR (400 MHz, DMSO-d₆) δ 7.61 (d, J=2.4 Hz, 1H), 7.29 (d, J=2.0 Hz, 1H), 7.19 (s, 1H), 4.27 (s, 2H), 2.05-1.98 (m, 1H), 0.85-0.81 (m, 4H).

3-[5-(3-Azido-4,6-O-benzylidene-3-deoxy-β-D-galactopyranosyl)-3-methyl-1H-1,2,4-triazol-1-yl]-5-chloro-2-cyclopropylpyridine

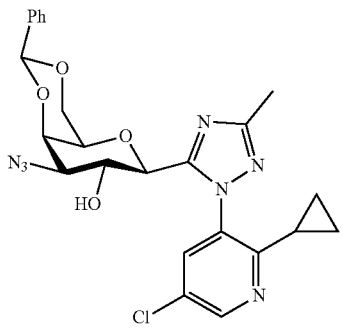

To a solution of 2,6-anhydro-4-azido-5,7-O-benzylidene-4-deoxy-D-glycero-L-manno-heptonamide (200 mg, 0.62 mmol) in 1,4-dioxane (5 mL) N,N-dimethylformamide dimethyl acetal (78.1 mg, 0.66 mmol) was added and the mixture was stirred 3 h under nitrogen atmosphere at 50° C. The mixture was evaporated and dissolved in MeCN (10 mL) and acetic acid (4 mL). (5-Chloro-2-cyclopropyl-3-pyridyl)hydrazine (141 mg, 0.77 mmol) was added and the mixture was stirred 2 h at 100° C. The mixture was evaporated and partitioned between water (20 mL) and DCM (20 mL). The aqueous phase was extracted with DCM (2×20 mL), and the combined organic phases were washed with water (20 mL) and brine (20 mL), dried over Na₂SO₄ and evaporated. The residue was purified by column chromatography (PE/EA=3/1~1/2, Silica-CS 4 g, 40 mL/min, silica gel, UV 254) to afford the product (130 mg, 41%). ESI-MS m/z calcd for [C₂₄H₂₄ClN₇O₄] [M+H]⁺: 510.2; found: 510.2. ¹H NMR (400 MHz, Chloroform-d) δ 8.44 (d, J=2.0 Hz, 1H), 7.66 (d, J=2.0 Hz, 1H), 7.47-7.45 (m, 2H), 7.36-7.34 (m, 3H), 5.53 (s, 1H), 4.86 (t, J=9.6 Hz, 1H), 4.35 (d, J=9.2 Hz, 1H), 4.24 (d, J=2.8 Hz, 1H), 3.95-3.80 (m, 2H), 3.42 (dd, J=10.4, 3.2 Hz, 1H), 3.30 (d, J=1.2 Hz, 1H), 2.05 (s, 3H), 1.60-1.54 (m, 1H), 1.09-0.93 (m, 4H).

3-{5-{4,6-O-Benzylidene-3-[4-(4-chlorothiazol-2-yl)-1H-1,2,3-triazol-1-yl]-3-deoxy-β-D-galactopyranosyl}-3-methyl-1H-1,2,4-triazol-1-yl}-5-chloro-2-cyclopropylpyridine

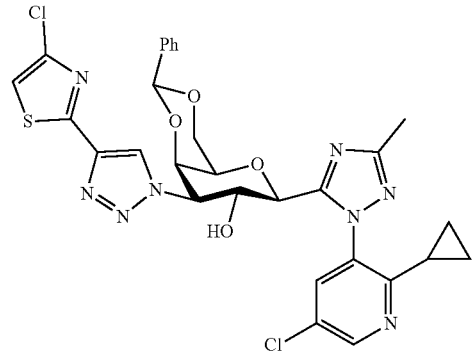

To a solution of 3-[5-(3-azido-4,6-O-benzylidene-3-deoxy-β-D-galactopyranosyl)-3-methyl-1H-1,2,4-triazol-1-yl]-5-chloro-2-cyclopropylpyridine (130 mg, 0.26 mmol) in DMF (3 mL) 2-(4-chlorothiazol-2-yl)ethynyl-trimethyl-silane (71.5 mg, 0.33 mmol), copper(II) sulfate pentahydrate (50.5 mg, 0.26 mmol) and (+)-sodium L-ascorbate (63.7 mg, 0.26 mmol) were added and the mixture was stirred 4 h at rt. The mixture was evaporated and purified by column chromatography (DCM/MeOH=20/1, Silica-CS 12 g, 20 mL/min, silica gel, UV 254) to afford the product (115 mg, 69%). ESI-MS m/z calcd for [C₂₉H₂₆Cl₂N₈O₄S] [M+H]⁺: 653.1; found: 653.1. ¹H NMR (400 MHz, Chloroform-d) δ 8.50 (d, J=2.0 Hz, 1H), 8.44 (s, 1H), 7.01 (s, 1H), 7.38-7.35 (m, 5H), 7.10 (s, 1H), 5.41 (s, 1H), 5.11-4.95 (m, 2H), 4.56-4.52 (m, 2H), 4.39 (s, 1H), 3.99-3.87 (m, 2H), 3.55 (s, 1H), 2.46 (s, 3H), 1.63-0.85 (m, 5H).

Intermediate 19

1-{3-{4,6-O-Benzylidene-3-{4-[2-(di-tea-butoxycarbonylamino)thiazol-4-yl]-1H-1,2,3-triazol-1-yl}-3-deoxy-β-D-galactopyranosyl}-5-methyl-4H-1,2,4-triazol-4-yl}-5-chloro-2-(trifluoromethyl)benzene

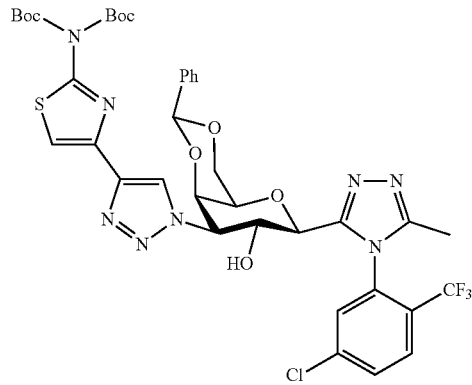

To a solution of 1-[3-(3-azido-4,6-O-benzylidene-3-deoxy-β-D-galactopyranosyl)-5-methyl-4H-1,2,4-triazol-4-yl]-5-chloro-2-(trifluoromethyl)benzene (88 mg, 0.16 mmol) and tert-butyl N-tert-butoxycarbonyl-N-[4-(2-trimethylsilylethynyl)thiazol-2-yl]carbamate (97.5 mg, 0.24 mmol) in DMF (4.0 mL) copper(II) sulfate pentahydrate (13.6 mg, 0.055 mmol) and (+)-sodium L-ascorbate (32.5 mg, 0.16 mmol) were added and the mixture was stirred 4 h at rt. The mixture was diluted with water (20 mL) and extracted with EtOAc (3×20 mL). The combined organic phases were washed with brine, dried over Na₂SO₄, evaporated and purified by column chromatography (PE/EA=2/1~0/1, Silica-CS 12 g, 20 mL/min, silica gel, UV 254) to afford the product (56 mg, 43%). ESI-MS m/z calcd for [C₃₈H₄₀ClF₃N₈O₈S] [M+H]⁺: 861.2; found: 861.1. ¹H NMR (400 MHz, CDCl₃) δ 8.03 (s, 1H), 7.81-7.70 (m, 1H), 7.67-7.50 (m, 3H), 7.31-7.22 (m, 5H), 5.31 (s, 1H), 5.12-4.90 (m, 2H), 4.51-4.29 (m, 2H), 3.94-3.68 (m, 2H), 3.43-3.28 (m, 1H), 2.29-2.12 (m, 3H), 1.42 (s, 18H).

Intermediate 20

Methyl 3-O-acetyl-2,6-anhydro-4-azido-5,7-O-benzylidene-4-deoxy-D-glycero-L-manno-heptonate

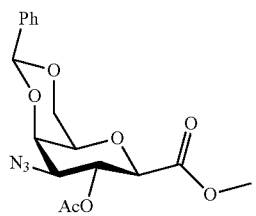

To a solution of methyl 2,6-anhydro-4-azido-5,7-O-benzylidene-4-deoxy-D-glycero-L-manno-heptonate (316 mg, 0.94 mmol) in pyridine (5 mL) acetic anhydride (2 mL) was added and the mixture was stirred overnight at rt. The mixture was poured into water (10 mL) and extracted with EA (2×10 mL). The organic phases were washed with water (20 mL), HCl (20 mL, 1 M), brine (20 mL), dried over Na₂SO₄, concentrated and purified by column chromatography (PE/EA=10/1~1/1, Silica-CS 4 g, 10 mL/min, silica gel, UV 254) to give the product (320 mg, 95%). ESI-MS m/z calcd for [C₁₇H₁₉N₃O₇] [M+NH₄]⁺: 395.1; found: 395.1. ¹H NMR (400 MHz, CDCl₃) δ 7.54-7.52 (m, 2H), 7.39-7.35 (m, 3H), 5.60-5.54 (m, 2H), 4.40-4.36 (m, 2H), 4.09-4.05 (m, 1H), 4.00 (d, J=9.6 Hz, 1H), 3.33 (s, 3H), 3.52 (d, J=1.2 Hz, 1H), 3.41 (dd, J=10.8, 3.2 Hz, 1H), 2.10 (s, 3H).

Methyl 3-O-acetyl-2,6-anhydro-5,7-O-benzylidene-4-deoxy-4-[4-(2-thiazolyl)-1H-1,2,3-triazol-1-yl]-D-glycero-L-manno-heptonate

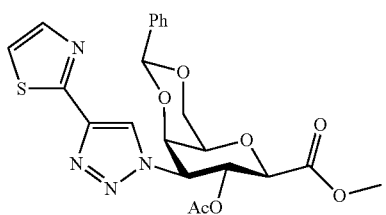

To a solution of methyl 3-O-acetyl-2,6-anhydro-4-azido-5,7-O-benzylidene-4-deoxy-D-glycero-L-manno-heptonate (300 mg, 0.80 mmol) and trimethyl(2-thiazol-2-ylethynyl)silane (173 mg, 0.95 mmol) in DMF (8 mL) copper(II) sulfate pentahydrate (99.3 mg, 0.40 mmol) and (+)-sodium L-ascorbate (236 mg, 1.19 mmol) were added and the mixture was stirred overnight at rt. The mixture was evaporated and purified by column chromatography (PE/EA=5/1~1/2, Silica-CS 20 g, 20 mL/min, silica gel, UV 254) to afford the product (350 mg, 91%). ESI-MS m/z calcd for [C₂₂H₂₂N₄O₇S][M+H]⁺: 487.1; found: 487.1. ¹H NMR (400 MHz, DMSO-d₆) δ 8.42 (s, 1H), 7.91 (d, J=3.2 Hz, 1H), 7.78 (d, J=3.2 Hz, 1H), 7.40 (s, 5H), 5.72-5.62 (m, 3H), 4.70 (s, 1H), 4.57-4.51 (m, 1H), 4.22-4.12 (m, 2H), 4.02 (s, 1H), 3.68 (s, 3H), 1.84 (s, 3H).

2,6-Anhydro-5,7-O-benzylidene-4-deoxy-4-[4-(2-thiazolyl)-1H-1,2,3-triazol-1-yl]-D-glycero-L-manno-heptonohydrazide

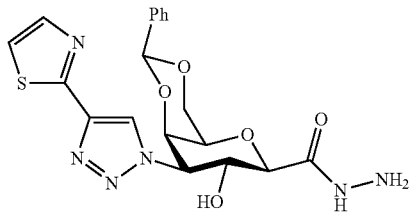

To a solution of methyl 3-O-acetyl-2,6-anhydro-5,7-O-benzylidene-4-deoxy-4-[4-(2-thiazolyl)-1H-1,2,3-triazol-1-yl]-D-glycero-L-manno-heptonate (350 mg, 0.72 mmol) in EtOH (20 mL) hydrazine hydrate (0.349 mL, 7.19 mmol) was added and the mixture was stirred overnight at 80° C. The mixture was concentrated and purified by reversed-phase chromatography (MeCN/H₂O=1/20~1/1, C-18 column 20 g, 20 mL/min, UV 254) to afford the product (300 mg, 94%). ESI-MS m/z calcd for [C₁₉H₂₀N₆O₅S][M+H]⁺: 445.1; found: 445.1. ¹H NMR (400 MHz, DMSO-d₆) δ 9.46 (s, 1H), 8.44 (s, 1H), 7.91 (d, J=3.2 Hz, 1H), 7.76 (d, J=3.2 Hz, 1H), 7.45-7.29 (m, 5H), 5.60 (d, J=6.4 Hz, 1H), 5.57 (s, 1H), 5.16 (dd, J=10.8, 3.6 Hz, 1H), 4.63-4.53 (m, 1H), 4.49 (d, J=3.2 Hz, 1H), 4.38 (s, 2H), 4.16-4.01 (m, 2H), 3.91-3.78 (m, 2H).

1-{3-{4,6-O-Benzylidene-3-deoxy-3-[4-(2-thiazolyl)-1H-1,2,3-triazol-1-yl]β-D-galactopyranosyl}-5-methyl-4H-1,2,4-triazol-4-yl}-5-chloro-2-(trifluoromethyl)benzene

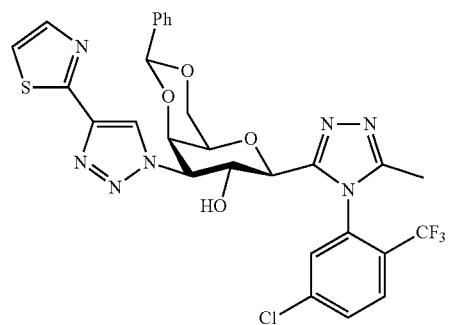

To a solution of 2,6-anhydro-5,7-O-benzylidene-4-deoxy-4-[4-(2-thiazolyl)-1H-1,2,3-triazol-1-yl]-D-glycero-L-manno-heptonohydrazide (300 mg, 0.68 mmol) and methyl-N-[5-chloro-2-(trifluoromethyl)phenyl]ethanimidothioate (217 mg, 0.81 mmol) in DMF (5.0 mL) and p-toluenesulfonic acid monohydrate (23.2 mg, 0.14 mmol) was added and the mixture was stirred 2 h at 160° C. The mixture was cooled to rt, evaporated and purified by column chromatography (PE/EA=1/1~0/1, Silica-CS 12 g, 20 mL/min, silica gel, UV 254) to afford the product (65 mg, 15%). ESI-MS m/z calcd for [$C_{28}H_{23}ClF_3N_7O_4S$] [M+H]$^+$: 646.1; found: 646.1. $^1$H NMR (400 MHz, DMSO-$d_6$) δ 8.34 (s, 1H), 7.99-7.88 (m, 3H), 7.78 (d, J=3.2 Hz, 1H), 7.56 (dd, J=8.8, 1.2 Hz, 1H), 7.41-7.34 (m, 3H), 7.27-7.20 (m, 2H), 5.73 (d, J=6.0 Hz, 1H), 5.46 (s, 1H), 5.23 (dd, J=10.4, 3.2 Hz, 1H), 4.77-4.68 (m, 1H), 4.57 (d, J=9.2 Hz, 1H), 4.43 (d, J=3.2 Hz, 1H), 4.01 (d, J=11.2 Hz, 1H), 3.83 (d, J=12.0 Hz, 1H), 3.73 (s, 1H), 2.15 (s, 3H).

Intermediate 21

6-{3-{4,6-O-Benzylidene-3-deoxy-3-[4-(2-thiazolyl)-1H-1,2,3-triazol-1-yl]β-D-galactopyranosyl}-4H-1,2,4-triazol-4-yl}-2-methylbenzothiazole

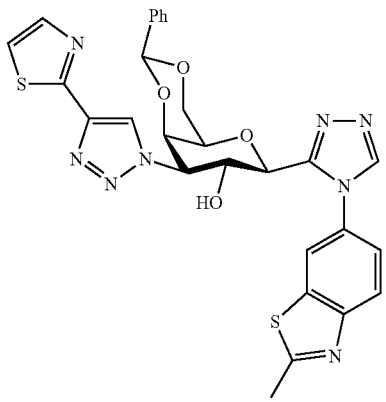

To a solution of 6-[3-(3-azido-4,6-O-benzylidene-3-deoxy-β-D-galactopyranosyl)-4H-1,2,4-triazol-4-yl]-2-methylbenzothiazole (100 mg, 0.20 mmol) in DMF (3 mL) trimethyl(2-thiazol-2-ylethynyl)silane (69.7 mg, 0.38 mmol), copper(II) sulfate pentahydrate (25.4 mg, 0.10 mmol) and (+)-sodium L-ascorbate (40.3 mg, 0.20 mmol) were added and the mixture was stirred 3 h at rt. The mixture was evaporated and purified by column chromatography (EA/MeOH=50/1~20/1, Silica-CS 4 g, 20 mL/min, silica gel, UV 254) to afford the product (87 mg, 71%). ESI-MS m/z calcd for [$C_{28}H_{24}N_8O_4S_2$] [M+H]$^+$: 600.1; found: 600.1. $^1$H NMR (400 MHz, DMSO-$d_6$) δ 8.90 (s, 1H), 8.34 (s, 1H), 8.27 (d, J=2.0 Hz, 1H), 8.02 (d, J=8.8 Hz, 1H), 7.89 (d, J=3.2 Hz, 1H), 7.74 (d, J=3.2 Hz, 1H), 7.66 (dd, J=8.8, 2.0 Hz, 1H), 7.36-7.28 (m, 5H), 5.74 (d, J=5.2 Hz, 1H), 5.55 (s, 1H), 5.27-5.24 (m, 1H), 4.89-4.83 (m, 1H), 4.70 (d, J=9.6 Hz, 1H), 4.50 (d, J=2.8 Hz, 1H), 4.23-3.92 (m, 3H), 2.83 (s, 3H).

Intermediate 22

6-{3-{4,6-O-Benzylidene-3-deoxy-3-[4-(2-thiazolyl)-1H-1,2,3-triazol-1-yl]β-D-galactopyranosyl}-4H-1,2,4-triazol-4-yl}-2-methylbenzothiazole

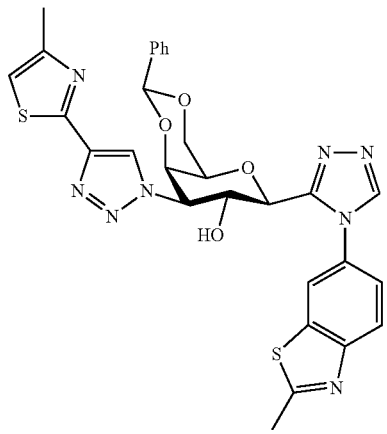

To a solution of 6-[3-(3-azido-4,6-O-benzylidene-3-deoxy-β-D-galactopyranosyl)-4H-1,2,4-triazol-4-yl]-2-methylbenzothiazole (120 mg, 0.24 mmol) in DMF (6 mL) trimethyl-[2-(4-methylthiazol-2-yl)ethynyl]silane (102 mg, 0.37 mmol), copper(II) sulfate pentahydrate (30 mg, 0.12 mmol) and (+)-sodium L-ascorbate (24 mg, 0.12 mmol) were added and the mixture was stirred 3 h at rt. The mixture was evaporated and purified by column chromatography (EA/MeOH=50/1~20/1, Silica-CS 20 g, 20 mL/min, silica gel, UV 254) to afford the product (70 mg, 42%). ESI-MS m/z calcd for [$C_{29}H_{26}N_8O_4S_2$] [M+H]$^+$: 615.2; found: 615.1. $^1$H NMR (400 MHz, DMSO-$d_6$) δ 8.90 (s, 1H), 8.32 (s, 1H), 8.27 (d, J=2.0 Hz, 1H), 8.01 (d, J=8.8 Hz, 1H), 7.66 (dd, J=8.4, 2.0 Hz, 1H), 7.38-7.27 (m, 6H), 5.74 (d, J=6.4 Hz, 1H), 5.55 (s, 1H), 5.23 (dd, J=10.4, 3.2 Hz, 1H), 4.90-4.84 (m, 1H), 4.70 (d, J=9.6 Hz, 1H), 4.50 (d, J=2.8 Hz, 1H) 4.17-4.06 (m, 2H), 3.92 (s, 1H), 2.83 (s, 3H), 2.37 (d, J=1.2 Hz, 3H).

Intermediate 23

6-{5-{4,6-O-Benzylidene-3-[4-(4-chlorothiazol-2-yl)-1H-1,2,3-triazol-1-yl]-3-deoxy-β-D-galactopyranosyl}-3-methyl-1H-1,2,4-triazol-1-yl}-2-methylbenzothiazole

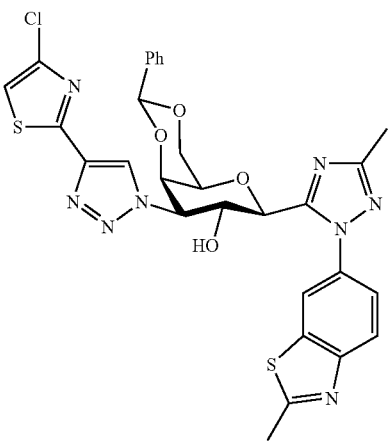

To a solution of 6-[5-(3-azido-4,6-O-benzylidene-3-deoxy-β-D-galactopyranosyl)-3-methyl-1H-1,2,4-triazol-1-yl]-2-methylbenzothiazole (150 mg, 0.30 mmol) in DMF (8 mL) 2-(4-chlorothiazol-2-yl)ethynyltrimethylsilane (96 mg, 0.45 mmol), copper(II) sulfate pentahydrate (37.0 mg, 0.18 mmol) and (+)-sodium L-ascorbate (29.4 mg, 0.18 mmol) were added and the mixture was stirred 3 h at rt. The mixture was partitioned between water (50 mL) and DCM (50 mL) and the aqueous phase was extracted with DCM (2×50 mL). The combined organic phases were washed with water (50 mL) and brine (50 mL), dried over $Na_2SO_4$, evaporated and purified by column chromatography (PE/EA=10/1~1/1, Silica-CS 20 g, 20 mL/min, silica gel, UV 254) to afford the product (95 mg, 49%). ESI-MS m/z calcd for $[C_{29}H_{25}ClN_8O_4S_2]$ [M+H]$^+$: 649.1; found: 649.2. $^1$H NMR (400 MHz, CDCl$_3$) δ 8.40 (s, 1H), 7.95 (dd, J=7.2, 2.0 Hz, 2H), 7.56 (dd, J=8.8, 2.4 Hz, 1H), 7.30-7.25 (m, 5H), 7.01 (s, 1H), 5.38 (s, 1H), 5.06 (t, J=2.4 Hz, 2H), 4.59 (d, J=8.4 Hz, 1H), 4.47 (s, 1H), 4.06-3.93 (m, 2H), 3.61 (s, 1H), 2.81 (s, 3H), 2.37 (s, 3H).

Intermediate 24

6-{5-{4,6-O-Benzylidene-3-{4-[2-(di-ta-butoxycarbonylamino)thiazol-4-yl]-1H-1,2,3-triazol-1-yl}-3-deoxy-β-D-galactopyranosyl}-3-methyl-1H-1,2,4-triazol-1-yl}-2-methylbenzothiazole

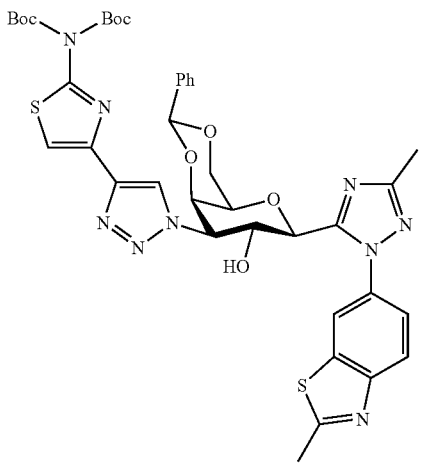

To a solution of 6-[5-(3-azido-4,6-O-benzylidene-3-deoxy-β-D-galactopyranosyl)-3-methyl-1H-1,2,4-triazol-1-yl]-2-methylbenzothiazole (200 mg, 0.40 mmol) in DMF (8 mL) tert-butyl N-tert-butoxycarbonyl-N-[4-(2-trimethylsilylethynyl)thiazol-2-yl]carbamate (188 mg, 0.48 mmol), copper(II) sulfate pentahydrate (49.4 mg, 0.20 mmol) and (+)-sodium L-ascorbate (39.2 mg, 0.20 mmol) were added and the mixture was stirred 3 h at rt. The mixture was partitioned between water (50 mL) and DCM (50 mL) and the aqueous phase was extracted with DCM (2×50 mL). The combined organic phases were washed with water (50 mL) and brine (50 mL), dried over $Na_2SO_4$, evaporated and purified by column chromatography (EA/MeOH=50/1~20/1, Silica-CS 20 g, 20 mL/min, silica gel, UV 254) to afford the product (220 mg, 67%). ESI-MS m/z calcd for $[C_{39}H_{43}N_9O_8S_2]$ [M+H]$^+$: 830.3; found: 830.7. $^1$H NMR (400 MHz, CDCl$_3$) δ 8.10-7.92 (m, 3H), 7.62-7.57 (m, 2H), 7.28-7.22 (m, 5H), 5.39 (s, 1H), 5.06 (s, 2H), 4.55-4.45 (m, 2H), 4.08-3.94 (m, 2H), 3.78-3.74 (m, 1H), 3.60 (s, 1H), 2.81 (s, 3H), 2.39 (s, 3H), 1.41 (s, 18H).

Intermediate 25

N-(2-Methyl-1,3-benzothiazol-6-yl)acetamide

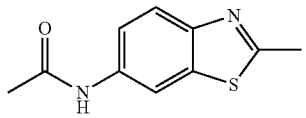

To a solution of 2-methyl-1,3-benzothiazol-6-amine (1.0 g, 6.09 mmol) in DCM (50 mL) acetyl chloride (526 mg, 6.70 mmol) and pyridine (1.48 mL) were added and the mixture was stirred 5 h under nitrogen atmosphere at 0° C. The mixture was partitioned between water (50 mL) and DCM (50 mL) and the aqueous phase was extracted with DCM (2×50 mL). The combined organic phases were washed with water (50 mL) and brine (3×50 mL), dried over $Na_2SO_4$, evaporated and purified by column chromatography (PE/EA=10/1~1/2, Silica-CS 40 g, 40 mL/min, silica gel, UV 254) to afford the product (750 mg, 60%). ESI-MS m/z calcd for $[C_{10}H_{10}N_2OS]$ [M+H]$^+$: 207.1; found: 207.1. $^1$H NMR (400 MHz, CDCl$_3$) δ 8.33 (d, J=1.6 Hz, 1H), 7.77 (d, J=8.8 Hz, 1H), 7.48 (s, 1H), 7.20-7.15 (m, 1H), 2.75 (s, 3H), 2.15 (s, 3H).

N-(2-Methyl-1,3-benzothiazol-6-yl)thioacetamide

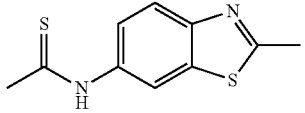

To a solution of N-(2-methyl-1,3-benzothiazol-6-yl)acetamide (640 mg, 3.1 mmol) in THF (30 mL) Lawesson's Reagent (690 mg, 1.71 mmol) was added and the mixture was stirred 2 h under nitrogen atmosphere at 65° C. The mixture was partitioned between water (50 mL) and DCM (50 mL) and the aqueous phase was extracted with DCM (2×50 mL). The combined organic phases were washed with water (50 mL) and brine (3×50 mL), dried over $Na_2SO_4$, evaporated and purified by column chromatography (PE/EA=10/1~1/2, Silica-CS 40 g, 40 mL/min, silica gel, UV 254) to afford the product (400 mg, 58%). ESI-MS m/z calcd for $[C_{10}H_{10}N_2S_2]$ [M+H]$^+$: 223.0; found: 223.1. $^1$H NMR (400 MHz, CD$_3$OD) δ 8.63 (d, J=2.0 Hz, 1H), 7.87 (d, J=8.8 Hz, 1H), 7.66-7.63 (m, 1H), 2.82 (s, 3H), 2.68 (s, 3H).

Methyl N-(2-methyl-1,3-benzothiazol-6-yl)ethanimidothioate

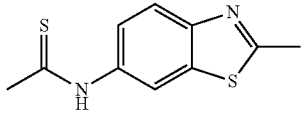

To a solution of N-(2-methyl-1,3-benzothiazol-6-yl)thio-acetamide (400 mg, 1.80 mmol) in DMF (10 mL) iodomethane (766 mg, 5.4 mmol) and cesium carbonate (1170 mg, 3.6 mmol) were added and the mixture was stirred 3 h under nitrogen atmosphere at rt. The mixture was partitioned between water (50 mL) and DCM (50 mL) and the aqueous phase was extracted with DCM (2×50 mL). The combined organic phases were washed with water (50 mL) and brine (50 mL), dried over $Na_2SO_4$, evaporated and purified by column chromatography (PE/EA=10/1~1/3, Silica-CS 40 g, 40 mL/min, silica gel, UV 254) to afford the product (300 mg, 71%). ESI-MS m/z calcd for $[C_{11}H_{12}N_2S_2]$ $[M+H]^+$: 237.0; found: 237.1. $^1$H NMR (400 MHz, CDCl$_3$) δ 7.80 (d, J=8.4 Hz, 1H), 7.09 (d, J=2.0 Hz, 1H), 6.79-6.76 (m, 1H), 2.74 (s, 3H), 2.37 (s, 3H), 1.97 (s, 3H).

6-{3-{4,6-O-Benzylidene-3-[4-(4-chlorothiazol-2-yl)-1H-1,2,3-triazol-1-yl]-3-deoxy-2-O-methyl-β-D-galactopyranosyl}-5-methyl-4H-1,2,4-triazol-4-yl}-2-methylbenzothiazole

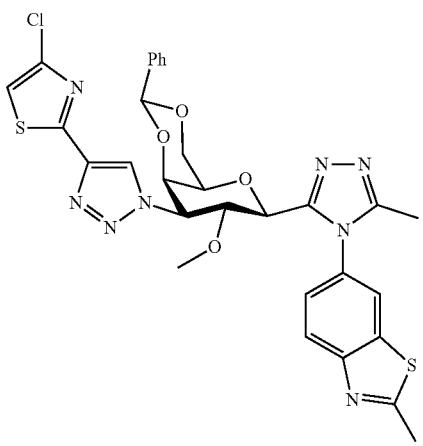

To a Solution of 2,6-anhydro-5,7-O-benzylidene-4-[4-(4-chlorothiazol-2-yl)-1H-1,2,3-triazol-1-yl]-4-deoxy-3-O-methyl-D-glycero-L-manno-heptonohydrazide (210 mg, 0.43 mmol) in DMF (5 mL) methyl N-(2-methyl-1,3-benzothiazol-6-yl)ethanimidothioate (101 mg, 0.43 mmol) and p-toluenesulfonic acid monohydrate (8.1 mg, 0.043 mmol) were added and the mixture was stirred 90 min at 120° C. The mixture was cooled to rt and purified by prep HPLC (MeCN/H$_2$O (10 mmol/L NH$_4$HCO$_3$), X-Select 10 μm 19*250 mm, 20 mL/min, UV 254) to afford the product (150 mg, 53%). ESI-MS m/z calcd for $[C_{30}H_{27}ClN_8O_4S_2]$ $[M+H]^+$: 663.1; found: 663.1. $^1$H NMR (400 MHz, Methanol-d$_4$) δ 8.59 (s, 1H), 8.14 (s, 1H), 8.07 (d, J=8.4 Hz, 1H), 7.59 (d, J=8.8 Hz, 1H), 7.45 (d, J=8.4 Hz, 1H), 7.37-7.33 (m, 5H), 5.49 (s, 1H), 5.21 (dd, J=10.0, 3.2 Hz, 1H), 4.62-4.60 (m, 2H), 4.45 (d, J=2.8 Hz, 1H), 4.23-4.07 (m, 2H), 3.71 (s, 1H), 3.0 (s, 3H), 2.85 (s, 3H), 2.32 (s, 3H).

Intermediate 26

Methyl 2,6-anhydro-5,7-O-benzylidene-4-[4-(4-chlorothiazol-2-yl)-1H-1,2,3-triazol-1-yl]-4-deoxy-D-glycero-L-manno-heptonate

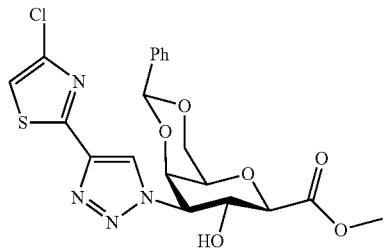

To a solution of methyl 2,6-anhydro-4-azido-5,7-O-benzylidene-4-deoxy-D-glycero-L-manno-heptonate (500 mg, 1.49 mmol) in DMF (10 mL) copper(II) sulfate pentahydrate (186 mg, 0.75 mmol), 2-(4-chlorothiazol-2-yl)ethynyltrimethylsilane (483 mg, 2.24 mmol) and (+)-sodium L-ascorbate (148 mg, 0.75 mmol) were added and the mixture was stirred 3 h at rt. The mixture was partitioned between water (50 mL) and DCM (50 mL) and the aqueous phase was extracted with DCM (2×50 mL). The combined organic phases were washed with water (50 mL) and brine (50 mL), dried over Na$_2$SO$_4$, evaporated and purified by column chromatography (PE/EA=10/1~1/1, Silica-CS 20 g, 20 mL/min, silica gel, UV 254) to afford the product (650 mg, 91%). ESI-MS m/z calcd for $[C_{20}H_{19}ClN_4O_6S]$ $[M+H]^+$: 479.1; found: 479.0. $^1$H NMR (400 MHz, CDCl$_3$) δ 8.31 (s, 1H), 7.33-7.28 (m, 5H), 7.03 (s, 1H), 5.41 (s, 1H), 4.98 (dd, J=10.8, 2.4 Hz, 1H), 4.64 (t, J=10.0 Hz, 1H), 4.47 (d, J=2.8 Hz, 1H), 4.39 (d, J=13.6 Hz, 1H), 4.06-4.02 (m, 2H), 3.81 (s, 3H), 3.72 (s, 1H).

Methyl 2,6-anhydro-5,7-O-benzylidene-4-[4-(4-chlorothiazol-2-yl)-1H-1,2,3-triazol-1-yl]-4-deoxy-D-glycero-L-manno-heptonohydrazide

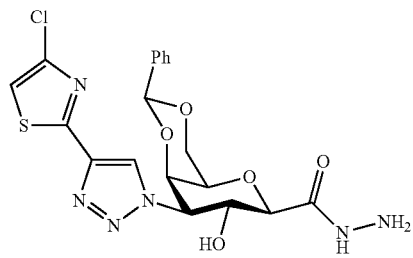

To a solution of methyl methyl 2,6-anhydro-5,7-O-benzylidene-4-[4-(4-chlorothiazol-2-yl)-1H-1,2,3-triazol-1-yl]-4-deoxy-D-glycero-L-manno-heptonate (650 mg, 1.36 mmol) in EtOH (30 mL) hydrazine hydrate (0.33 mL, 6.79 mmol) was added and the mixture was stirred overnight at 80° C. The mixture was concentrated purified by prep HPLC (MeCN/H$_2$O (10 mmol/L NH$_4$HCO$_3$), X-Select 10 μm 19*250 mm, 20 mL/min, UV 254) to afford the product (500 mg, 77%). ESI-MS m/z calcd for $[C_{19}H_{19}ClN_6O_5S]$ $[M+H]^+$: 479.1; found: 479.1. $^1$H NMR (400 MHz, DMSO-d$_6$) δ 9.45 (s, 1H), 8.58 (s, 1H), 7.78 (s, 1H), 7.38-7.34 (m, 5H), 5.59-5.56 (m, 2H), 5.17 (dd, J=10.8, 3.2 Hz, 1H), 4.63-4.57 (m, 1H), 4.49 (d, J=3.2 Hz, 1H), 4.37 (s, 2H), 4.15-4.06 (m, 2H), 3.87-3.84 (m, 2H).

6-{3-{4,6-O-Benzylidene-3-[4-(4-chlorothiazol-2-yl)-1H-1,2,3-triazol-1-yl]-3-deoxy-β-D-galactopyranosyl}-5-methyl-4H-1,2,4-triazol-4-yl}-2-methylbenzothiazole

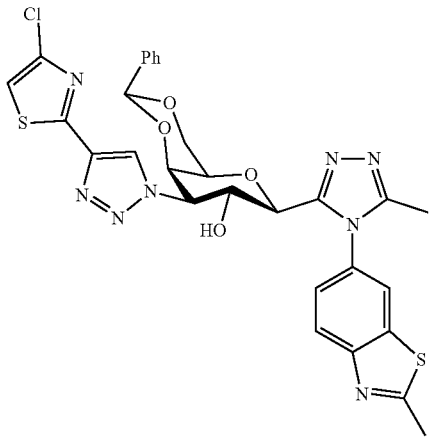

To a solution of 2,6-anhydro-5,7-O-benzylidene-4-[4-(4-chlorothiazol-2-yl)-1H-1,2,3-triazol-1-yl]-4-deoxy-D-glycero-L-manno-heptonohydrazide (200 mg, 0.42 mmol) in DMF (5 mL) methyl N-(2-methyl-1,3-benzothiazol-6-yl)ethanimidothioate (98.7 mg, 0.42 mmol) and p-toluenesulfonic acid monohydrate (7.9 mg, 0.042 mmol) were added and the mixture was stirred 90 min at 125° C. The mixture was cooled to rt and purified by prep HPLC (MeCN/H$_2$O (10 mmol/L NH$_4$HCO$_3$), X-Select 10 μm 19*250 mm, 20 mL/min, UV 254) to afford the product (170 mg, 63%). ESI-MS m/z calcd for [C$_{29}$H$_{25}$ClN$_8$O$_4$S$_2$] [M+H]$^+$: 649.1; found: 649.2. $^1$H NMR (400 MHz, Methanol-d$_4$) δ 8.38 (s, 1H), 8.12 (d, J=1.6 Hz, 1H), 8.06-8.03 (m, 1H), 7.60 (dd, J=8.4, 2.0 Hz, 1H), 7.43 (s, 1H), 7.36-7.24 (m, 5H), 5.46 (s, 1H), 5.13 (dd, J=10.4, 3.2 Hz, 1H), 4.79 (t, J=9.6 Hz, 1H), 4.62 (d, J=10.0 Hz, 1H), 4.46 (d, J=2.8 Hz, 1H), 4.22-4.07 (m, 2H), 3.76 (s, 1H), 2.85 (s, 3H), 2.30 (s, 3H).

Intermediate 27

N-(3-Methylbenzimidazol-5-yl)acetamide

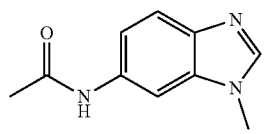

To a solution of 3-methylbenzimidazol-5-amine (750 g, 5.1 mmol) in DCM (50 mL) and pyridine (5 mL) acetyl chloride (800 mg, 10.0 mmol) was added at 0° C. and the mixture was stirred 12 h at rt under a nitrogen atmosphere. The mixture was partitioned between water (50 mL) and DCM (50 mL) and the aqueous phase was extracted with DCM (2×50 mL). The combined organic layers were washed with water (50 mL) and brine (50 mL), dried over Na$_2$SO$_4$, concentrated and purified by column chromatography (DCM/MeOH=1/0~0/1, Silica-CS 40 g, 40 mL/min, silica gel, UV 254) to afford the product (400 mg, 41%). ESI-MS m/z calcd for [C$_{10}$H$_{11}$N$_3$O] [M+H]$^+$: 190.1; found: 190.1. $^1$H NMR (400 MHz, DMSO-d$_6$) δ 10.01 (s, 1H), 8.09 (s, 1H), 8.03 (d, J=1.6 Hz, 1H), 7.54 (d, J=4.8 Hz, 1H), 7.18 (dd, J=8.4, 1.6 Hz, 1H), 3.77 (s, 3H), 2.07 (s, 3H).

N-(3-Methylbenzimidazol-5-yl)thioacetamide

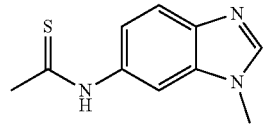

To a solution of N-(3-methylbenzimidazol-5-yl)acetamide (320 mg, 1.7 mmol) in THF (30 mL) Lawesson's reagent (1.37 g, 3.40 mmol) was added and the mixture was stirred 12 h at 65° C. The mixture was partitioned between water (50 mL) and DCM (50 mL) and the aqueous phase was extracted with DCM (2×50 mL). The combined organic layers were washed with water (50 mL) and brine (3×50 mL), dried over Na$_2$SO$_4$, concentrated and purified by column chromatography (DCM/MeOH=1/0~1/1, Silica-CS 20 g, 20 mL/min, silica gel, UV 254) to afford the product (200 mg, 58%). ESI-MS m/z calcd for [C$_{10}$H$_{11}$N$_3$S] [M+H]$^+$: 206.1; found: 206.3. $^1$H NMR (400 MHz, DMSO-d$_6$) δ 11.68 (s, 1H), 8.25 (d, J=1.6 Hz, 1H), 8.21 (s, 1H), 7.64 (d, J=8.8 Hz, 1H), 7.36 (dd, J=8.8, 2.0 Hz, 1H), 3.81 (s, 3H), 2.63 (s, 3H).

Methyl N-(3-methylbenzimidazol-5-yl)ethanimidothioate

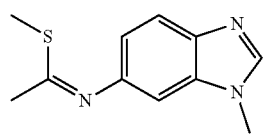

To a solution of N-(3-methylbenzimidazol-5-yl)thioacetamide (65 mg, 0.32 mmol) in MeCN (5 mL) K$_2$CO$_3$ (88 mg, 0.63 mmol) and iodomethane (0.06 mL, 0.95 mmol) were added and the mixture was stirred 3 h at rt under a nitrogen atmosphere. The mixture was partitioned between water (50 mL) and DCM (50 mL) and the aqueous phase was extracted with DCM (2×50 mL). The combined organic layers were washed with water (50 mL) and brine (3×50 mL), dried over Na$_2$SO$_4$, concentrated and purified by column chromatography (DCM/MeOH=10/1~1/1, Silica-CS 20 g, 20 mL/min, silica gel, UV 254) to afford the product (48 mg, 69%). ESI-MS m/z calcd for [C$_{11}$H$_{13}$N$_3$S][M+H]$^+$: 220.1; found: 220.1. $^1$H NMR (400 MHz, Methanol-d$_4$) δ 8.04 (d, J=6.8 Hz, 1H), 7.59 (d, J=8.4 Hz, 1H), 6.91 (d, J=1.2 Hz, 1H), 6.71 (dd, J=8.4, 2.0 Hz, 1H), 3.85 (s, 3H), 2.43 (s, 3H), 2.03 (s, 3H).

5-{3-{4,6-O-Benzylidene-3-[4-(4-chlorothiazol-2-yl)-1H-1,2,3-triazol-1-yl]-3-deoxy-β-D-galactopyranosyl}-5-methyl-4H-1,2,4-triazol-4-yl}-N-3-methyl-benzimidazole

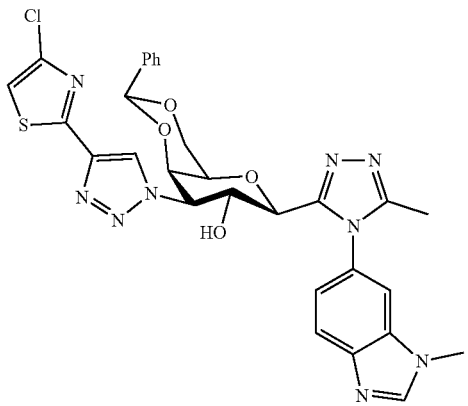

To a solution of 2,6-anhydro-5,7-O-benzylidene-4-[4-(4-chlorothiazol-2-yl)-1H-1,2,3-triazol-1-yl]-4-deoxy-D-glycero-L-manno-heptonohydrazide (100 mg, 0.21 mmol) in DMF (3 mL) methyl N-(3-methylbenzimidazol-5-yl)ethanimidothioate (48 mg, 0.22 mmol) and p-toluenesulfonic acid monohydrate (4.0 mg, 0.021 mmol) were added and the mixture was stirred 90 min at 125° C. The mixture was cooled to rt and purified by prep HPLC (MeCN/H$_2$O (10 mmol/L NH$_4$HCO$_3$), X-Select 10 μm 19*250 mm, 20 mL/min, UV 254) to afford the product (65 mg, 49%). ESI-MS m/z calcd for [C$_{29}$H$_{26}$ClN$_9$O$_4$S] [M+H]$^+$: 632.2; found: 632.2. $^1$H NMR (400 MHz, Methanol-d$_4$) δ 8.23-8.20 (m, 1H), 7.87-7.77 (m, 3H), 7.44-7.28 (m, 6H), 7.01-7.00 (m, 1H), 5.42 (s, 1H), 5.12 (dd, J=10.4, 3.6 Hz, 1H), 4.76-4.72 (m, 1H), 4.60-4.44 (m, 2H), 4.29-4.26 (m, 1H), 4.13 (d, J=12.4 Hz, 1H), 3.88-3.76 (m, 1H), 3.65 (s, 3H), 2.28 (s, 3H).

Intermediate 28

2,6-Anhydro-4-azido-5,7-O-benzylidene-4-deoxy-D-glycero-L-manno-heptonic Acid

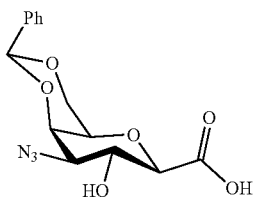

To a solution of methyl 2,6-anhydro-4-azido-5,7-O-benzylidene-4-deoxy-D-glycero-L-manno-heptonate (1.10 g, 3.28 mmol) in THF (50 mL) and water (10 mL) lithium hydroxide monohydrate (688 mg, 16.4 mmol) was added and the mixture was stirred overnight at rt. The mixture was concentrated, and the residue was diluted with water (50 mL). The pH was adjusted to 2-3 using HCl (1 M) and the solids were filtered off, washed with water and dried to give the product (880 mg, 84%). ESI-MS m/z calcd for [C$_{14}$H$_{15}$N$_3$O$_6$] [M+NH$_4$]$^+$: 339.1; found: 339.3. $^1$H NMR (400 MHz, DMSO-d$_6$) δ 12.93 (s, 1H), 7.68-7.20 (m, 5H), 5.65 (s, 1H), 4.34 (d, J=3.2 Hz, 1H), 4.14-4.01 (m, 2H), 3.94 (t, J=9.6 Hz, 1H), 3.76 (d, J=9.2 Hz, 1H), 3.62 (s, 1H), 3.51 (dd, J=10.0, 3.2 Hz, 1H).

2,6-Anhydro-4-azido-5,7-O-benzylidene-4-deoxy-1-C—(N-methoxy-N-methyl)-aldehydo-D-glycero-L-manno-heptose

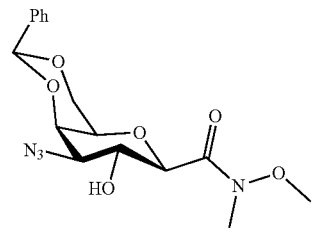

To a stirred solution of 2,6-anhydro-4-azido-5,7-O-benzylidene-4-deoxy-D-glycero-L-manno-heptonic acid (880 mg, 2.74 mmol) in DMF (15.0 mL), N,O-dimethylhydroxylamine hydrochloride (321 mg, 3.29 mmol), HATU (1562 mg, 4.11 mmol) and DIPEA (1.41 mL, 8.22 mmol) were added sequentially and the mixture was stirred 1 h at rt. The mixture was extracted with EA (2×100 mL) and washed with brine (50 mL). The organic phases were evaporated and purified by column chromatography (PE/EA=0-100%, Silica-CS 20 g, 30 mL/min, silica gel, UV 254) to give the product (990 mg, 99%). ESI-MS m/z calcd for [C$_{16}$H$_{20}$N$_4$O$_6$] [M+H]$^+$: 365.1; found: 365.3. $^1$H NMR (400 MHz, Chloroform-d) δ 7.48-7.40 (m, 2H), 7.34-7.26 (m, 3H), 5.53 (d, J=1.6 Hz, 1H), 4.39 (t, J=9.6 Hz, 1H), 4.27-4.17 (m, 3H), 4.11-4.02 (m, 1H), 3.72 (d, J=1.6 Hz, 3H), 3.52 (s, 1H), 3.43-3.36 (m, 1H), 2.81-2.67 (m, 3H).

2,6-Anhydro-4-azido-5,7-O-benzylidene-4-deoxy-3-O-methoxymethyl-1-C—(N-methoxy-N-methyl)-aldehydo-D-glycero-L-manno-heptose

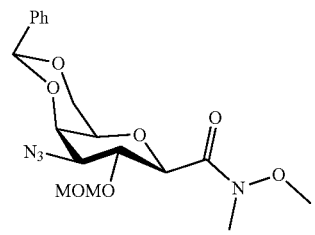

To a solution of 2,6-anhydro-4-azido-5,7-O-benzylidene-4-deoxy-1-C—(N-methoxy-N-methyl)-aldehydo-D-glycero-L-manno-heptose (790 mg, 2.17 mmol) and bromo(methoxy)methane (2.71 g, 21.7 mmol) in DMF (10.0 mL) silver(I) oxide (1005 mg, 4.34 mmol) and sodium iodide (650 mg, 4.34 mmol) were added and the mixture was stirred 60 h at rt under a nitrogen atmosphere. The mixture was concentrated and purified by column chromatography (PE/EA=0-100%, Silica-CS 20 g, 30 mL/min, silica gel, UV 254) to give the product (400 mg, 45%). ESI-MS m/z calcd for [C$_{18}$H$_{24}$N$_4$O$_7$] [M+H]$^+$: 409.2; found: 409.3. $^1$H NMR (400 MHz, Chloroform-d) δ 7.49-7.43 (m, 2H), 7.33-7.25

(m, 3H), 5.54 (s, 1H), 4.88-4.79 (m, 1H), 4.77-4.70 (m, 1H), 4.68-4.63 (m, 1H), 4.49 (t, J=9.6 Hz, 1H), 4.31-4.15 (m, 3H), 4.00 (dd, J=12.4, 1.6 Hz, 1H), 3.68 (s, 3H), 3.35 (s, 3H), 3.24 (dd, J=10.0, 3.2 Hz, 1H), 3.16 (s, 3H).

3,7-Anhydro-5-azido-6,8-O-benzylidene-5-deoxy-4-O-methoxymethyl-D-glycero-L-manno-2-octulose

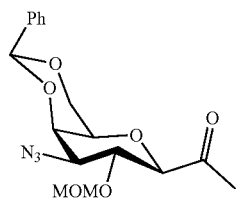

To a stirred solution of 2,6-anhydro-4-azido-5,7-O-benzylidene-4-deoxy-3-O-methoxymethyl-1-C—(N-methoxy-N-methyl)-aldehydo-D-glycero-L-manno-heptose (400 mg, 0.98 mmol) in THF (5.0 mL) methylmagnesium bromide solution (0.65 mL, 3 M in diethyl ether, 1.96 mmol) was added dropwise at 0° C. under argon and the mixture was stirred 30 min. The reaction was quenched with saturated NH$_4$Cl and extracted with EtOAc (30 mL). The organic phase was evaporated and purified by column chromatography (PE/EA=0-60%, Silica-CS 20 g, 30 ml/min, silica gel, UV 254) to give the product (310 mg, 87%). ESI-MS m/z calcd for [C$_{17}$H$_{21}$N$_3$O$_6$][M+NH$_4$]$^+$: 381.1; found: 381.3. $^1$H NMR (400 MHz, Chloroform-d) δ 7.51-7.42 (m, 2H), 7.37-7.26 (m, 3H), 5.53 (s, 1H), 4.71 (d, J=6.8 Hz, 1H), 4.57 (d, J=6.8 Hz, 1H), 4.32-4.20 (m, 2H), 4.13-3.93 (m, 2H), 3.67 (d, J=9.6 Hz, 1H), 3.42 (d, J=1.2 Hz, 1H), 3.35-3.31 (m, 1H), 3.28 (s, 3H), 2.28 (s, 3H).

3,7-Anhydro-6,8-O-benzylidene-5-[4-(4-chlorothiazol-2-yl)-1H-1,2,3-triazol-1-yl]-5-deoxy-4-O-methoxymethyl-D-glycero-L-manno-2-octulose

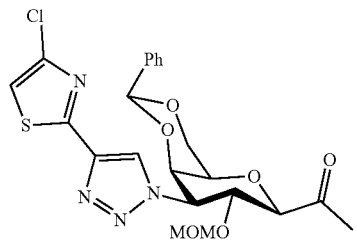

To a solution of 3,7-anhydro-5-azido-6,8-O-benzylidene-5-deoxy-4-O-methoxymethyl-D-glycero-L-manno-2-octulose (310 mg, 0.85 mmol) and 2-(4-chlorothiazol-2-yl)ethynyl-trimethyl-silane (221 mg, 1.02 mmol) in DMF (4.0 mL) was added (+)-sodium L-ascorbate (254 mg, 1.28 mmol) and copper(II) sulfate pentahydrate (107 mg, 0.43 mmol) were added and the mixture was stirred 4 h at rt. The mixture was evaporated and purified by column chromatography (PE/EA=2/1~1/2, Silica-CS 20 g, 30 mL/min, silica gel, UV 254) to give the product (330 mg, 76%). ESI-MS m/z calcd for [C$_{22}$H$_{23}$C$_1$N$_4$O$_6$S] [M+H]$^+$: 507.1; found: 507.1. $^1$H NMR (400 MHz, Chloroform-d) δ 8.32 (s, 1H), 7.43-7.30 (m, 5H), 7.02 (s, 1H), 5.42 (s, 1H), 5.06 (dd, J=10.4, 3.2 Hz, 1H), 4.40-4.25 (m, 4H), 4.12 (d, J=7.2 Hz, 1H), 4.07-3.99 (m, 1H), 3.91 (d, J=9.2 Hz, 1H), 3.73-3.64 (m, 1H), 2.72 (s, 3H), 2.33 (s, 3H).

REFERENCES

Aits S, Kricker J, Liu B, Ellegaard A M, Hamalisto S, Tvingsholm S, Corcelle-Termeau E, Høgh S, Farkas T, Holm Jonassen A, Gromova I, Mortensen M, Jäättelä M. (2015) Sensitive detection of lysosomal membrane permeabilization by lysosomal galectin puncta assay Autophagy. 2015; 11(8):1408-24.

Almkvist, J., Fäldt, J., Dahlgren, C., Leffler, H., and Karlsson, A. (2001) Lipopolysaccharide-induced gelatinase granule mobilization primes neutrophils for activation by galectin-3 and f-Met-Leu-Phe. Infect. Immun. Vol. 69: 832-837.

Arthur C M, Baruffi M D, Cummings R D, Stowell S R. (2015) Evolving mechanistic insights into galectin functions. Methods Mol Biol. 1207:1-35.

Helen Blanchard, Khuchtumur Bum-Erdene, Mohammad Hussaini Bohari & Xing Yu (2016) Galectin-1 inhibitors and their potential therapeutic applications: a patent review, Expert Opinion on Therapeutic Patents, 26:5, 537-554, DOI: 10.1517/13543776.2016.1163338

Blidner A G, Méndez-Huergo S P, Cagnoni A J, Rabinovich G A. (2015) Re-wiring regulatory cell networks in immunity by galectin-glycan interactions. FEBS Lett. 2015 Sep. 6. pii: S0014-5793(15)00807-8.

Chen, W.-S., Leffler H., Nilsson, U. J., Panjwani, N. (2012). Targeting Galectin-1 and Galectin-3 Attenuates VEGF-A-induced Angiogenesis; Mol. Biol. Cell (suppl), Abstract No. 2695.

Cooper, D. N.; Massa, S. M.; Barondes, S. H. (1991) Endogenous muscle lectin inhibits myoblast adhesion to laminin. The Journal of Cell Biology 115, 1437-1448.

Cumpstey, I., Carlsson, S., Leffler, H. and Nilsson, U. J. (2005) Synthesis of a phenyl thio-β-D-galactopyranoside library from 1,5-difluoro-2,4-dinitrobenzene: discovery of efficient and selective monosaccharide inhibitors of galectin-7. Org. Biomol. Chem. 3: 1922-1932.

Cumpstey, I., Sundin, A., Leffler, H. and Nilsson, U. J. (2005) C$_2$-Symmetrical thiodigalactoside bis-benzamido derivatives as high-affinity inhibitors of galectin-3: Efficient lectin inhibition through double argininarene interactions. Angew. Chem. Int. Ed. 44: 5110-5112.

Cumpstey, I., Salomonsson, E., Sundin, A., Leffler, H. and Nilsson, U. J. (2008) Double affinity amplification of galectin-ligand interactions through arginine-arene interactions: Synthetic, thermodynamic, and computational studies with aromatic diamido-thiodigalactosides. Chem. Eur. J. 14: 4233-4245.

Delaine, T., Cumpstey, I., Ingrassia, L., Le Mercier, M., Okechukwu, P., Leffler, H., Kiss, R., and Nilsson, U. J. (2008). Galectin-Inhibitory Thiodigalactoside Ester Derivatives Have Anti-Migratory Effects in Cultured Lung and Prostate Cancer Cells. J Med Chem 51; 8109-8114.

Demotte, N., Wieers, G., van der Smissen, P., Moser, M., Schmidt, C., Thielemans, K., et al., (2010). Cancer Res. 70; 7476-7488.

Dings, R. P. M.; Miller, M. C.; Nesmelova, I.; Astorgues-Xerri, L.; Kumar, N.; Serova, M.; Chen, X.; Raymond, E.; Hoye, T. R.; Mayo, K. H. Journal of medicinal . . . 2012, 55, 5121-5129.

Ebrahim A H, Alalawi Z, Mirandola L, Rakhshanda R, Dahlbeck S, Nguyen D, Jenkins M1, Grizzi F, Cobos E, Figueroa J A, Chiriva-Internati M (2014Galectins in cancer: carcinogenesis, diagnosis and therapy. Ann Transl Med. 2014 September; 2(9):88.

Elola M T, Blidner A G, Ferragut F, Bracalente C, Rabinovich G A. (2015) Assembly, organization and regulation of cell-surface receptors by lectin-glycan complexes.Biochem J. 2015 Jul. 1; 469(1):1-16.

Farkas, I.; Szabó, I. F.; Bognár, R.; Anderle, D. Carbohydr. Res. 1976, 48, 136-138.

Giguère, D.; Bonin, M.-A.; Cloutier, P.; Patnam, R.; St-Pierre, C.; Sato, S.; Roy, R. Bioorganic & Medicinal Chemistry 2008, 16, 7811-7823.

Gigure, D.; André, S.; Bonin, M.-A.; Bellefleur, M.-A.; Provencal, A.; Cloutier, P.; Pucci, B.; Roy, R.; Gabius, H.-J. Bioorganic & Medicinal Chemistry 2011, 19, 3280-3287.

Giguere, D., Patnam, R., Bellefleur, M.-A., St.-Pierre, C., Sato, S., and Roy, R. (2006). Carbohydrate triazoles and isoxazoles as inhibitors of galectins-1 and -3. *Chem Commun:* 2379-2381.

Glinsky, G. V., Price, J. E., Glinsky, V. V., Mossine, V. V., Kiriakova, G., and Metcalf, J. B. (1996). *Cancer Res* 56: 5319-5324.

Glinsky, V. V., Kiriakova, G., Glinskii, O. V., Mossine, V. V., Mawhinney, T. P., Turk, J. R., Glinskii, A. B., Huxley, V. H., Price, J. E., and Glinsky, G. V. (2009). Synthetic Galectin-3 Inhibitor Increases Metastatic Cancer Cell Sensitivity to Taxol-Induced Apoptosis In Vitro and In Vivo. Neoplasia 11; 901-909.

van Hattum, H.; Branderhorst, H. M.; Moret, E. E.; Nilsson, U. J.; Leffler, H.; Pieters, R. J. J. Med. Chem. 2013, 56, 1350-1354.Huflejt, M. E. and Leffler, H. (2004) Galectin-4 in normal tissues and cancer. *Glycoconj. J.* 20: 247-255.

Hockl P F, Wolosiuk A, Pérez-Sáez JM1, Bordoni AV2, Croci D03, Toum-Terrones Y2, Soler-Illia GJ4, Rabinovich GA5. Glyco-nano-oncology: Novel therapeutic opportunities by combining small and sweet. Treatment of cancer Pharmacol Res. 2016 Feb. 4. pii: S1043-6618(16) 00042-6. doi: 10.1016/j.phrs.2016.02.005. [Epub ahead of print]

Ingrassia et al. (2006) A Lactosylated Steroid Contributes in Vivo Therapeutic Benefits in Experimental Models of Mouse Lymphoma and Human Glioblastoma. *J. Med. CHem.* 49: 1800-1807.

John, C. M., Leffler, H., Kahl-Knutsson, B., Svensson, I., and Jarvis, G. A. (2003) Truncated Galectin-3 Inhibits Tumor Growth and Metastasis in Orthotopic Nude Mouse Model of Human Breast *Cancer. Clin. Cancer Res.* 9: 2374-2383.

Kathiriya, J. J. et al. Galectin-1 inhibition attenuates profibrotic signaling in hypoxia-induced pulmonary fibrosis. Cell Death Discovery 3, 17010-13 (2017).

Kouo, T., Huang, L., Pucsek, A. B., Cao, M., Solt, S., Armstrong, T., Jaffee, E. (2015) *Cancer Immonol. Res.* 3: 412-23

Leffler, H. and Barondes, S. H. (1986) Specificity of binding of three soluble rat lung lectins to substituted and unsubstituted mammalian beta-galactosides. J. Biol. Chem. 261:10119-10126.

Leffler, H. Galectins Structure and Function—A Synopsis in Mammalian Carbohydrate Recognition Systems (Crocker, P. ed.) Springer Verlag, Heidelberg, 2001 pp. 57-83.

Leffler, H., Carlsson, S., Hedlund, M., Qian, Y. and Poirier, F. (2004) Introduction to galectins. *Glycoconj. J.* 19: 433-440.

Leffler, H., editor, (2004b) Special Issue on Galectins. *Glycoconj. J.* 19: 433-638.

Lepur A, Salomonsson E, Nilsson U J, Leffler H. (2012) Ligand induced galectin-3 protein self-association. J Biol Chem. 2012 Jun. 22; 287(26):21751-6.

Lin, C.-I., Whang, E. E., Donner, D. B., Jiang, X., Price, B. D., Carothers, A. M., Delaine, T., Leffler, H., Nilsson, U. J., Nose, V., et al. (2009). Galectin-3 Targeted Therapy with a Small Molecule Inhibitor Activates Apoptosis and Enhances Both Chemosensitivity and Radiosensitivity in Papillary Thyroid Cancer. *Mol Cancer Res* 7: 1655-1662.

MacKinnon, A. C., Farnworth, S. L., Henderson, N. C., Hodkinson, P. S., Kipari, T., Leffler, H., Nilsson, U. J., Haslett, C., Hughes, J., and Sethi T. (2008). Regulation of alternative macrophage activation by Galectin-3. *J. Immun.* 180; 2650-2658.

Mackinnon, A., Gibbons, M., Farnworth, S., Leffler, H., Nilsson, U. J., Delaine, T., Simpson, A., Forbes, S., Hirani, N., Gauldie, J., and Sethi T. (2012). Regulation of TGF-β1 driven lung fibrosis by Galectin-3. *Am. J. Resp. Crit. Care Med.*, in press.

Massa, S. M., Cooper, D. N. W., Leffler, H., Barondes, S. H. (1993) L-29, an endogenous lectin, binds to glycoconjugate ligands with positive cooperativity. *Biochemistry* 32: 260-267.

Melero, I., Berman, D. M., Aznar, M. A., Korman, A. J., Gracia, J. L. P., Haanen, J. (2015) *Nature Reviews Cancer,* 15: 457-472

Partridge, E. A., Le Roy, C., Di Guglielmo, G. M., Pawling, J., Cheung, P., Granovsky, M., Nabi, I. R., Wrana, J. L., and Dennis, J. W. (2004). Regulation of cytokine receptors by Golgi N-glycan processing and endocytosis. *Science* 306: 120-124.

Perillo, N. L.; Pace, K. E.; Seilhamer, J. J.; Baum, L. G. Nature 1995, 378, 736-739.

Pienta, K. J., Naik, H., Akhtar, A., Yamazaki, K., Reploge, T. S., Lehr, J., Donat, T. L., Tait, L., Hogan, V., and Raz, A. (1995). Inhibition of spontaneous metastasis in a rat prostate cancer model by oral administration of modified citrus pectin. *J Natl Cancer Inst* 87, 348-353.

Poirier, F. Roles of galectins in vivo. Biochem. Soc. Symp. 2002:95-103.

Ramos-Soriano, J.; Niss, U.; Angulo, J.; Angulo, M.; Moreno-Vargas, A. J.; Carmona, A. T.; Ohlson, S.; Robina, I. Chem. Eur. J. 2013, 19, 17989-18003.

Ruvolo, P. P. *Biochim. Biophys Acta*.Molecular cell research (2015) E-pub ahead of print, title: Galectin-3 as a guardian of the tumor microenvironment, published on-line 8 Apr. 2015: (http://www.sciencedirect.com/science/article/pii/S016748891500270 0), Salameh, B. A., Leffler, H. and Nilsson, U. J. (2005) *Bioorg. Med. Chem. Lett.* 15: 3344-3346.

Salameh, B. A., Cumpstey, I., Sundin, A., Leffler, H., and Nilsson, U. J. (2010). 1H-1,2,3-Triazol-1-yl thiodigalactoside derivatives as high affinity galectin-3 inhibitors. *Bioorg Med Chem* 18: 5367-5378.

Salomonsson, E., Larumbe, A., Tejler, J., Tullberg, E., Rydberg, H., Sundin, A., Khabut, A., Frejd, T., Lobsanov, Y. D., Rini, J. M., Nilsson, U. J., and Leffler, H (2010). Monovalent interactions of galectin-1. *Biochemistry* 49: 9518-9532.

Sörme P., Qian, Y., Nyholm, P.-G., Leffler, H., Nilsson, U. J. (2002) Low micromolar inhibitors of galectin-3 based on 3'-derivatization of N-acetyllactosamine. *ChemBioChem* 3:183-189.

Sörme, P., Kahl-Knutsson, B., Wellmar, U., Nilsson, U. J., and Leffler H. (2003a) Fluorescence polarization to study galectin-ligand interactions. *Meth. Enzymol.*362: 504-512.

Sörme, P., Kahl-Knutsson, B., Wellmar, U., Magnusson, B.-G., Leffler H., and Nilsson, U. J. (2003b) Design and synthesis of galectin inhibitors. *Meth. Enzymol.*363: 157-169.

Sörme P., Kahl-Knutsson, B., Huflejt, M., Nilsson, U. J., and Leffler H. (2004) Fluorescence polarization as an analytical tool to evaluate galectin-ligand interactions. *Anal. Biochem.* 334: 36-47.

Tejler, J.; Tullberg, E.; Frejd, T.; Leffler, H.; Nilsson, U. J. Carbohydrate Research 2006, 341, 1353-1362.

Tejler, J.; Salameh, B.; Leffler, H.; Nilsson, U. J. Org. Biomol. Chem. 2009, 7, 3982.Thijssen, V. L., Poirer, F., Baum, L. G., and Griffioen, A. W. (2007). Galectins in the tumor endothelium: opportunities for combined cancer therapy. *Blood* 110: 2819-2827.

Toscano, M. A., Bianco, G. A., Ilarregui, J. M., Croci, D. O., Correale, J., Hernandez, J. D., Zwirner, N. W., Poirier, F., Riley, E. M., Baum, L. G., et al. (2007). Differential glycosylation of TH1, TH2 and TH-17 effector cells selectively regulates susceptibility to cell death. *Nat Immunol* 8: 825-834.

I claim:

1. A D-galactopyranose compound of formula (1)

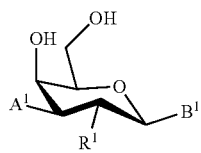

wherein
the pyranose ring is β-D-galactopyranose,
A1 is

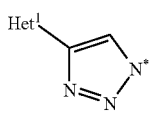

wherein the asterix * indicates the nitrogen atom of the triazole ring that is covalently attached to the galactopyranose;
wherein $Het^1$ is a five or six membered heteroaromatic ring selected from the group consisting of formulas 2 to 10, wherein the asterix * indicates the carbon atom of the heteroaromatic ring that is covalently attached to the triazole group in formula $A^1$:

2

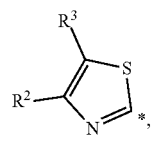

3

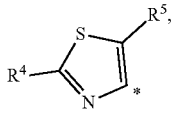

4

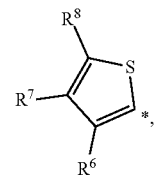

5

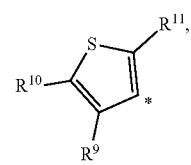

7

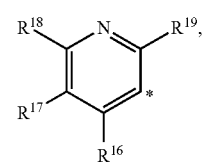

8

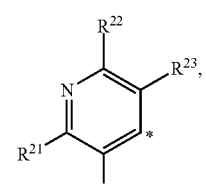

9

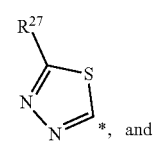

, and

10

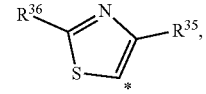

wherein $R^2$ to $R^{11}$, $R^{16}$ to $R^{23}$, $R^{27}$, $R^{35}$ and $R^{36}$ are independently selected from H; halogen; OH; CN; SH; S—$C_{1-6}$ alkyl; $C_{1-6}$ alkyl, optionally substituted with a F; cyclopropyl, optionally substituted with a F; isopropyl, optionally substituted with a F; O-cyclopropyl optionally substituted with a F; O-isopropyl optionally substituted with a F; $OC_{1-6}$ alkyl optionally substituted with a F; and $NR^{24}R^{25}$, wherein $R^{24}$ is selected from H and $C_{1-6}$ alkyl, and $R^{25}$ is selected from H, $C_{1-3}$ alkyl, and $COR^{26}$, wherein $R^{26}$ is selected from H, and $C_{1-6}$ alkyl;

wherein B1 is selected from the group consisting of a heteroaryl, an aryl and a heterocycloalkyl, optionally substituted with one or more groups selected from a) $C_{1-6}$ alkyl optionally substituted with one or more of $C_{1-6}$ alkyl, amino, CN, halogen, hydroxy, $C_{1-6}$ alkoxy, carboxy, alkoxycarbonyl, or $H_2NCO$, b) $R^{28}$—$C_{1-6}$ alkyl, c) $C_{3-6}$ cycloalkyl optionally substituted with one or more of $C_{1-6}$ alkyl, amino, CN, halogen, or hydroxy, d) $C_{1-6}$ alkenyl, e) $C_{1-6}$ alkoxy, f) $C_{1-6}$ alkylthio, g) $C_{1-6}$ alkylsulfonyl, h) carbonyl substituted with any one of hydroxy, $C_{1-6}$ alkoxy, $C_{1-6}$ alkylNH, (($R^{29}$)($R^{30}$)N)$C_{1-6}$ alkylNH, or (pyridinyl)$C_{1-6}$ alkylNH, i) ($R^{31}$)($R^{32}$)N, j) $C_2$-alkynyl, and k) $R^{28}$;

wherein $R^{28}$ is selected from any one of a) phenyl, naphthalinyl, biphenyl, pyridinyl, pyridazinyl, pyrimidinyl, pyrazinyl, quinolinyl, isoquinolinyl, quinoxainyl, indolyl, indazolyl, benzimidazolyl, benzisoxazolyl, benzisothiazolyl, benzoxazolyl, benzothiazolyl, benzodioxolyl, dihydrobenzodioxinyl, dihydroquinolinonyl, dihydrobenzothiophene-2,2-dioxide, pyrrolyl, furanyl, thienyl, pyrazolyl, isoxazolyl, isothiazolyl, imidazolyl, oxazolyl, thiazolyl, triazolyl, oxadiazolyl, or thiadiazolyl; optionally substituted with one or more substituents selected from the group consisting of cyano, nitro, OH, $C_2$-alkynyl, halogen, $C_{1-6}$ alkyl, halo-$C_{1-6}$ alkyl, $C_{3-6}$ cycloalkyl, $C_{1-6}$ alkoxy, halo-$C_{1-6}$ alkoxy, $C_{1-6}$ alkylthio, carboxy, $C_{1-6}$ alkoxycarbonyl, $CONH_2$, and $(R^{33})(R^{34})N$; or b) $(C_{1-6}$ alkyl-$SO_2$)phenyl, $(C_{1-6}$ alkyl $SO_2)$ (halo)phenyl, (amino$SO_2$)phenyl, (di-$C_{1-6}$ alkylamino$SO_2$)phenyl, $(((C_{1-6}$ alkyl-$NHSO_2$)—$C_{1-6}$ alkyl)phenyl, (pyrrolyl)phenyl, (imidazolyl)phenyl, (oxazolyl)phenyl, (tetrazolyl)phenyl, ((pyridinyl) methyl)phenyl, phenoxyphenyl, (benzyloxy)phenyl, ((methyl) thiazolyl)-phenyl, (thiazolyl)-benzenesulfamido, ((methyl) thiadiazolyl) benzenesulfamido, (methyl)-benzothiazolonyl, or fluoropyrazolopyrimidinyl;
wherein
$R^{29}$ is hydrogen or $C_{1-6}$ alkyl;
$R^{30}$ is hydrogen or $C_{1-6}$ alkyl; or
$(R^{29})(R^{30})N$ taken together is any one of azetidinyl, pyrrolidinyl, piperidinyl, piperazinyl, or morpholinyl, optionally substituted with one or more substituents selected from halogen, $C_{1-6}$ alkyl, and hydroxy;
$R^{31}$ is hydrogen, $C_{1-6}$ alkyl, $C_{1-6}$ alkylcarbonyl, or $C_{1-6}$ alkylsulfonyl;
$R^{32}$ is hydrogen or $C_{1-6}$ alkyl; or
$(R^{31})(R^{32})N$ taken together is any one of azetidinyl, pyrrolidinyl, piperidinyl, piperazinyl, or morpholinyl, optionally substituted with one or more substituents selected from halogen, $C_{1-6}$ alkyl, and $C_{1-6}$ alkylcarbonyl;
$R^{33}$ is hydrogen, $C_{1-6}$ alkyl, $C_{1-6}$ alkylcarbonyl, or $C_{1-6}$ alkylsulfonyl;
$R^{34}$ is hydrogen or $C_{1-6}$ alkyl; or
$(R^{33})(R^{34})N$ taken together is any one of azetidinyl, pyrrolidinyl, piperidinyl, piperazinyl, or morpholinyl, optionally substituted with one or more substituents selected from halogen, $C_{1-6}$ alkyl, and $C_{1-6}$ alkylcarbonyl;
$R^1$ is selected from the group consisting of a) H, b) OH, c) $OC_{1-6}$ alkyl optionally substituted with one or more halogen, phenyl, phenyl substituted with one or more groups selected form OH and halogen, CN, $OR^{17}$, $NR^{18}R^{19}$, and $CONH_2$, wherein $R^{17}$ is selected from the group consisting of H, CN, a halogen, methyl optionally substituted with a F, $OCH_3$ optionally substituted with a F, $OCH_2CH_3$ optionally substituted with a F, OH, and $R^{20}$—CONH— wherein $R^{20}$ is selected from $C_{1-3}$ alkyl and cyclopropyl, $R^{18}$ is selected from the group consisting of H, CN, a halogen, methyl optionally substituted with a F, $OCH_3$ optionally substituted with a F, $OCH_2CH_3$ optionally substituted with a F, OH, and $R^{21}$—CONH— wherein $R^{21}$ is selected from $C_{1-3}$ alkyl and cyclopropyl, and $R^{19}$ is selected from the group consisting of H, CN, a halogen, methyl optionally substituted with a F, $OCH_3$ optionally substituted with a F, $OCH_2CH_3$ optionally substituted with a F, OH, and $R^{22}$—CONH— wherein $R^{22}$ is selected from $C_{1-3}$ alkyl and cyclopropyl, d) branched $OC_{3-6}$ alkyl optionally substituted with one or more halogen, CN, $OR^{23}$, $NR^{24}R^{25}$, and $CONH_2$, wherein $R^{23}$ is selected from the group consisting of H, CN, a halogen, methyl optionally substituted with a F, $OCH_3$ optionally substituted with a F, $OCH_2CH_3$ optionally substituted with a F, OH, and $R^{26}$—CONH— wherein $R^{26}$ is selected from $C_{1-3}$ alkyl and cyclopropyl, $R^{24}$ is selected from the group consisting of H, CN, a halogen, methyl optionally substituted with a F, $OCH_3$ optionally substituted with a F, $OCH_2CH_3$ optionally substituted with a F, OH, and $R^{27}$—CONH— wherein $R^{27}$ is selected from $C_{1-3}$ alkyl and cyclopropyl, and $R^{25}$ is selected from the group consisting of H, CN, a halogen, methyl optionally substituted with a F, $OCH_3$ optionally substituted with a F, $OCH_2CH_3$ optionally substituted with a F, OH, and $R^{28}$—CONH— wherein $R^{28}$ is selected from $C_{1-3}$ alkyl and cyclopropyl, e) cyclic $OC_{3-6}$ alkyl optionally substituted with one or more halogen, CN, $OR^{29}$, $NR^{30}R^{31}$, and $CONH_2$, wherein $R^{29}$ is selected from the group consisting of H, CN, a halogen, methyl optionally substituted with a F, $OCH_3$ optionally substituted with a F, $OCH_2CH_3$ optionally substituted with a F, OH, and $R^{32}$—CONH— wherein $R^{32}$ is selected from $C_{1-3}$ alkyl and cyclopropyl, $R^{30}$ is selected from the group consisting of H, CN, a halogen, methyl optionally substituted with a F, $OCH_3$ optionally substituted with a F, $OCH_2CH_3$ optionally substituted with a F, OH, and $R^{33}$—CONH— wherein $R^{33}$ is selected from $C_{1-3}$ alkyl and cyclopropyl, and $R^{31}$ is selected from the group consisting of H, CN, a halogen, methyl optionally substituted with a F, $OCH_3$ optionally substituted with a F, $OCH_2CH_3$ optionally substituted with a F, OH, and $R^{34}$—CONH— wherein $R^{34}$ is selected from $C_{1-3}$ alkyl and cyclopropyl, and f) a fluorine (F); or a pharmaceutically acceptable salt or solvate thereof.

2. The compound of claim 1 wherein Het1 is selected from the group consisting of

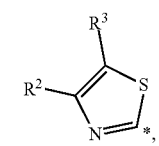

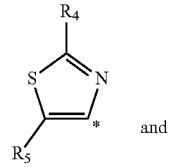 and

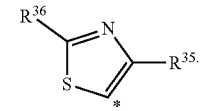

wherein $R^2$ is selected from the group consisting of hydrogen, methyl, OH and halogen;
$R^3$ is selected from the group consisting of hydrogen, $C_{1-6}$ alkyl and halogen;
$R^4$ is selected from the group consisting of OH, $C_{1-6}$ alkyl, halogen and amino;
$R^5$ is selected from the group consisting of hydrogen, $C_{1-6}$ alkyl and halogen;

$R^{35}$ and $R^{36}$ are independently selected from hydrogen, $C_{1-6}$ alkyl, amino and halogen.

3. The compound of claim 1 wherein Het1 is selected from the group consisting of

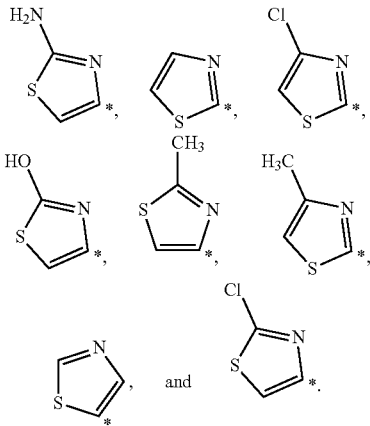

4. The compound of claim 1 wherein B1 is selected from the group consisting of pyrrolyl, furanyl, thienyl, pyrazolyl, isoxazolyl, isothiazolyl, imidazolyl, oxazolyl, thiazolyl, triazolyl, oxadiazolyl, thiadiazolyl, phenyl, and indolyl; optionally substituted with a group selected from a) $C_{1-6}$ alkyl optionally substituted with one or more of $C_{1-6}$ alkyl, halogen, hydroxy, $C_{1-6}$ alkoxy, carboxy, alkoxycarbonyl, or $H_2NCO$, b) $R^{28}$—$C_{1-6}$ alkyl, c) $C_{3-6}$ cycloalkyl optionally substituted with one or more of $C_{1-6}$ alkyl, halogen, or hydroxy, d) $C_{1-6}$ alkenyl, e) $C_{1-6}$ alkoxy, f) $C_{1-6}$ alkylthio, g) $C_{1-6}$ alkylsulfonyl, h) carbonyl substituted with any one of hydroxy, $C_{1-6}$ alkoxy, $C_{1-6}$ alkylNH, $((R^{29})(R^{30})N)C_{1-6}$ alkylNH, or (pyridinyl) $C_{1-6}$ alkylNH, i) $(R^{31})(R^{32})N$, and k) $R^{28}$.

5. The compound of claim 1 wherein B1 is selected from the group consisting of pyrrolyl, furanyl, thienyl, pyrazolyl, isoxazolyl, isothiazolyl, imidazolyl, oxazolyl, thiazolyl, triazolyl, oxadiazolyl, thiadiazolyl, phenyl and indolyl; optionally substituted with a group selected from a) $C_{1-6}$ alkyl optionally substituted with one or more of halogen, and j) $R^{28}$; wherein $R^{28}$ is selected from the group consisting of phenyl, naphthalinyl, biphenyl, pyridinyl, pyridazinyl, pyrimidinyl, pyrazinyl, quinolinyl, isoquinolinyl, quinoxainyl, indolyl, indazolyl, benzimidazolyl, benzisoxazolyl, benzisothiazolyl, benzoxazolyl, benzothiazolyl, benzodioxolyl, dihydrobenzodioxinyl, dihydroquinolinonyl, dihydrobenzothiophene-2,2-dioxide, pyrrolyl, furanyl, thienyl, pyrazolyl, isoxazolyl, isothiazolyl, imidazolyl, oxazolyl, thiazolyl, triazolyl, oxadiazolyl, and thiadiazolyl; optionally substituted with one or more substituents selected from the group consisting of cyano, nitro, OH, $C_2$-alkynyl, halogen, $C_{1-6}$ alkyl, halo-$C_{1-6}$ alkyl, $C_{3-6}$ cycloalkyl, $C_{1-6}$ alkoxy, halo-$C_{1-6}$ alkoxy, $C_{1-6}$ alkylthio, carboxy, $C_{1-6}$ alkoxycarbonyl, and $CONH_2$.

6. The compound of claim 1 wherein B1 is selected from pyrazolyl or triazolyl; optionally substituted with a group selected from methyl, $CF_3$, and $R^{28}$; wherein $R^{28}$ is selected form the group consisting of phenyl, pyridyl, benzimidazolyl, and benzothiazolyl, optionally substituted with one or more substituents selected from the group consisting of halogen, $C_{1-6}$ alkyl, halo-$C_{1-6}$ alkyl, and $C_{3-6}$ cycloalkyl.

7. The compound of claim 1 wherein $R^1$ is selected from H, OH, $OC_{1-4}$ alkyl, or $OC_{1-4}$ alkyl substituted with at least one from the group consisting of phenyl and phenyl substituted with one or more groups selected form OH and halogen.

8. The compound of claim 1 wherein $R^1$ is selected from OH and $OC_{1-3}$ alkyl.

9. The compound of claim 1 selected from the group consisting of:

6-{3-{3-[4-(4-Chlorothiazol-2-yl)-1H-1,2,3-triazol-1-yl]-3-deoxy-β-D-galactopyranosyl}-4H-1,2,4-triazol-4-yl}-2-methylbenzothiazole, 3-Chloro-1-{3-{3-deoxy-3-[4-(2-hydroxythiazol-4-yl)-1H-1,2,3-triazol-1-yl]-β-D-galactopyranosyl}-4H-1,2,4-triazol-4-yl} benzene, 5-Chloro-1-{3-{3-deoxy-3-[4-(2-hydroxythiazol-4-yl)-1H-1,2,3-triazol-1-yl]-2-O-methyl-β-D-galactopyranosyl}-5-trifluoromethyl-4H-1,2,4-triazol-4-yl}-2-methylbenzene, 2,5-Dichloro-1-{3-{3-deoxy-3-[4-(4-methylthiazol-2-yl)-1H-1,2,3-triazol-1-yl]-β-D-galactopyranosyl}-4H-1,2,4-triazol-4-yl} benzene, 2-Bromo-5-chloro-1-{3-{3-Deoxy-3-[4-(2-thiazolyl)-1H-1,2,3-triazol-1-yl]-β-D-galactopyranosyl}-5-methyl-1H-1,2,4-triazol-4-yl} benzene, 6-{3-{3-[4-(2-Aminothiazol-4-yl)-1H-1,2,3-triazol-1-yl]-3-deoxy-β-D-galactopyranosyl}-4H-1,2,4-triazol-4-yl}-2-methylbenzothiazole, 2-Bromo-5-chloro-1-{3-{3-Deoxy-3-[4-(4-thiazolyl)-1H-1,2,3-triazol-1-yl]-β-D-galactopyranosyl}-5-methyl-1H-1,2,4-triazol-4-yl} benzene, 6-{3-{3-Deoxy-3-[4-(2-hydroxythiazol-4-yl)-1H-1,2,3-triazol-1-yl]-β-D-galactopyranosyl}-4H-1,2,4-triazol-4-yl}-2-methylbenzothiazole, 1-{3-{3-[4-(4-Chlorothiazol-2-yl)-1H-1,2,3-triazol-1-yl]-3-deoxy-β-D-galactopyranosyl}-5-methyl-4H-1,2,4-triazol-4-yl}-5-chloro-2-(trifluoromethyl) benzene, 6-{5-{3-Deoxy-3-[4-(2-thiazolyl)-1H-1,2,3-triazol-1-yl]-β-D-galactopyranosyl}-3-methyl-1H-1,2,4-triazol-1-yl}-2-methylbenzothiazole, 5-Chloro-1-{3-{3-deoxy-3-[4-(4-methylthiazol-2-yl)-1H-1,2,3-triazol-1-yl]-β-D-galactopyranosyl}-5-methyl-4H-1,2,4-triazol-4-yl}-2-(trifluoromethyl) benzene, 5-Chloro-1-{3-{3-deoxy-3-[4-(2-hydroxythiazol-4-yl)-1H-1,2,3-triazol-1-yl]-β-D-galactopyranosyl}-5-methyl-4H-1,2,4-triazol-4-yl}-2-(trifluoromethyl) benzene, 6-{5-{3-Deoxy-3-[4-(2-methylthiazol-4-yl)-1H-1,2,3-triazol-1-yl]-β-D-galactopyranosyl}-3-methyl-1H-1,2,4-triazol-1-yl}-2-methylbenzothiazole, 6-{5-{3-Deoxy-3-[4-(5-thiazolyl)-1H-1,2,3-triazol-1-yl]-β-D-galactopyranosyl}-3-methyl-1H-1,2,4-triazol-1-yl}-2-methylbenzothiazole, 1-{3-{3-[4-(2-Aminothiazol-4-yl)-1H-1,2,3-triazol-1-yl]-3-deoxy-β-D-galactopyranosyl}-5-methyl-1H-1,2,4-triazol-4-yl}-5-chloro-2-(trifluoromethyl) benzene, 1-{3-{3-[4-(4-Chlorothiazol-2-yl)-1H-1,2,3-triazol-1-yl]-3-deoxy-β-D-galactopyranosyl}-5-methyl-1H-1,2,4-triazol-4-yl}-5-chloro-2-(trifluoromethyl) benzene, 1-{3-{3-[4-(4-Chlorothiazol-2-yl)-1H-1,2,3-triazol-1-yl]-3-deoxy-2-O-methyl-β-D-galactopyranosyl}-5-methyl-4H-1,2,4-triazol-4-yl}-5-chloro-2-(trifluoromethyl) benzene, 3-{5-{3-[4-(4-Chlorothiazol-2-yl)-1H-1,2,3-triazol-1-yl]-3-deoxy-β-D-galactopyranosyl}-3-methyl-1H-1,2,4-triazol-1-yl}-5-chloro-2-cyclopropylpyridine, 1-{3-{3-[4-(2-Aminothiazol-4-yl)-1H-1,2,3-triazol-1-yl]-3-deoxy-β-D-galactopyranosyl}-5-methyl-4H-1,2,4-triazol-4-yl}-5-chloro-2-(trifluoromethyl) benzene, 5-Chloro-1-{3-{3-deoxy-3-[4-(2-thiazolyl)-1H-1,2,3-triazol-1-yl]-β-D-galactopyranosyl}-5-methyl-4H-1,2,4-triazol-4-yl}-2-(trifluoromethyl) benzene, 6-{3-{3-Deoxy-3-[4-(2-thiazolyl)-1H-1,2,3-triazol-1-yl]-β-D-galactopyranosyl}-4H-1,2,4-triazol-4-yl}-2-methylbenzothiazole, 6-{3-{3-Deoxy-3-[4-(4-methylthiazol-2-yl)-1H-1,2,3-triazol-1-yl]-β-D-galactopyranosyl}-4H-1,2,4-triazol-4-yl}-2-methylbenzothiazole, 6-{5-{3-[4-(4-Chlorothiazol-2-yl)-1H-1,2,3-triazol-1-yl]-3-deoxy-β-D-galactopyranosyl}-3-methyl-1H-1,2,4-triazol-1-yl}-2-methylbenzothiazole, 6-{5-{3-[4-(2-Aminothiazol-4-yl)-1H-1,2,3-triazol-1-yl]-3-deoxy-β-D-galactopyranosyl}-3-methyl-1H-1,2,4-triazol-1-yl}-2-methylbenzothiazole, 6-{3-{3-[4-(4-Chlorothiazol-2-yl)-1H-1,2,3-triazol-1-yl]-3-deoxy-2-O-methyl-β-D-galactopyranosyl}-5-methyl-4H-1,2,4-triazol-4-yl}-2-methylbenzothiazole, 6-{3-{3-[4-(4-Chlorothiazol-2-yl)-1H-1,2,3-triazol-1-yl]-3-deoxy-β-D-galactopyranosyl}-5-methyl-4H-1,2,4-triazol-4-yl}-2-methylbenzothiazole, 5-{3-{3-[4-(4-Chlorothiazol-2-yl)-1H-1,2,3-triazol-1-yl]-3-deoxy-β-D-galactopyranosyl}-5-methyl-4H-1,2,4-triazol-4-yl}-N-3-methylbenzimidazole, 1-{5-{3-[4-(4-Chlorothiazol-2-yl)-1H-1,2,3-triazol-1-yl]-3-deoxy-β-D-galactopyranosyl}-1H-1,2-pyrazol-1-yl}-5-chloro-2-(trifluoromethyl) benzene, and 6-{3-{3-[4-(4-Chlorothiazol-2-yl)-1H-1,2,3-triazol-1-yl]-3-deoxy-β-D-galactopyranosyl}-1H-1,2-pyrazol-1-yl}-2-methylbenzothiazole; or a pharmaceutically acceptable salt or solvate thereof.

10. A pharmaceutical composition comprising the compound of claim 1 and optionally a pharmaceutically acceptable additive.

11. A method for treatment of a disorder relating to the binding of a galectin-1 and/or -3 to a ligand in a mammal, wherein a therapeutically effective amount of at least one compound according to claim 1 is administered to a mammal in need of said treatment, wherein said disorder is selected from the group consisting of inflammation; inflammation induced thrombosis; atopic dermatitis; acute coronary syndrome; fibrosis selected from the group consisting of pulmonary fibrosis, liver fibrosis, kidney fibrosis, ophthalmological fibrosis and fibrosis of the skin and heart; local fibrosis selected from Dupuytren's disease and Peyronie's disease; fibrotic complications of other therapies selected from the group consisting of coronary stents, bile duct stents, cerebral artery stents, and ureter stents; scleroderma; scarring; keloid formation; covid-19; acute lung injury; ARDS; viral pneumonitis, aberrant scar formation; surgical adhesions; septic shock; colorectal cancer; gastrointestinal carcinomas selected from the group consisting of pancreatic cancer, gastric cancer, and biliary tract cancer; lung cancers, mesothelioma; female cancers selected from the group consisting of breast cancer, ovarian cancer, uterine cancer, cancer of the cervix uteri, and cancer of the salpingx; cerebral cancers selected from the group consisting of medulloblastomao, glioma, and meningioma; sarcomas of the bones and muscles; leukemias; lymphomas; transplant rejection; metastasising cancers; ageing; Dementia; Alzheimers; TGFbeta driven bone disease; Pulmonary hypertension; autoimmune diseases selected from the group consisting of psoriasis, rheumatoid arthritis, and Rheumatoid lung; Crohn's disease; ulcerative colitis; ankylosing spondylitis; systemic lupus erythematosus; viral infections selected from the group consisting of influenza virus, HIV, Herpes virus, Coronaviruses, and Hepatitis C; metabolic disorders; heart disease; heart failure; pathological angiogenesis selected from ocular angiogenesis or a disease or condition associated with ocular angiogenesis, and eye diseases selected from age-related macular degeneration and corneal neovascularization; atherosclerosis; metabolic diseases; diabetes; type I diabetes; type 2 diabetes; insulin resistens; obesity; Marfans syndrome; Loeys-Dietz syndrome; nephropathy; Diastolic HF; fibrotic lung complications of aPD1 and other CPI therapies; asthma and other interstitial lung diseases; liver disorders selected from non-alcoholic steatohepatitis and non-alcoholic fatty liver disease; and uterine disease selected from uterine fibroids and uterine or cervical fibrosis.

* * * * *